(12) United States Patent
Kanazawa et al.

(10) Patent No.: US 6,467,267 B2
(45) Date of Patent: Oct. 22, 2002

(54) FLUID PRESSURE BOOSTING DEVICE AND BRAKE SYSTEM EMPLOYING THE SAME

(75) Inventors: Osamu Kanazawa, Higashimatsuyama (JP); Michio Kobayashi, Higashimatsuyama (JP); Hiroshi Ohsaki, Higashimatsuyama (JP); Yoshiyasu Takasaki, Higashimatsuyama (JP); Hiroyuki Oka, Higashimatsuyama (JP); Hiroyuki Yamaga, Higashimatsuyama (JP); Mitsuru Kakuda, Higashimatsuyama (JP); Hiroaki Niino, Kariya (JP); Kazuya Maki, Kariya (JP); Mamoru Sawada, Kariya (JP)

(73) Assignees: Bosch Braking Systems Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/881,201

(22) Filed: Jun. 15, 2001

(65) Prior Publication Data

US 2002/0023437 A1 Feb. 28, 2002

Related U.S. Application Data

(63) Continuation-in-part of application No. 09/599,270, filed on Jun. 22, 2000.

(30) Foreign Application Priority Data

| | | | |
|---|---|---|---|
| Jul. 14, 1999 | (JP) | | 11-200196 |
| Aug. 4, 1999 | (JP) | | 11-221332 |
| Feb. 7, 2000 | (JP) | | 2000-029061 |
| Jul. 14, 2000 | (JP) | | 2000-214150 |
| Jul. 27, 2000 | (JP) | | 2000-226956 |

(51) Int. Cl.$^7$ ............................................... B60T 13/20
(52) U.S. Cl. ......................................... 60/552; 91/373
(58) Field of Search ............................... 60/552, 547.1; 91/372, 373, 370; 303/138

(56) References Cited

U.S. PATENT DOCUMENTS 3,877,227 A * 4/1975 Demido ...................... 60/548

* cited by examiner

Primary Examiner—Edward K. Look
Assistant Examiner—Michael Leslie
(74) Attorney, Agent, or Firm—Kanesaka & Takeuchi

(57) ABSTRACT

In a brake fluid pressure boosting device 1 of the present invention, by operation, an input shaft 4 is moves forward to rotate a lever 27 to actuate a control valve 8 so that the control valve 8 produce working fluid pressure corresponding to the input. The working fluid pressure is introduced into the power chamber 6. By this working fluid pressure, the primary piston 37 is actuated to develop master cylinder pressure. On the other hand, the fluid pressure of the power chamber 6 is introduced into the first annular groove 25 of the valve spool 10. By the difference between pressure receiving areas of the first annular groove 25, the valve spool 10 is subjected to rightward force. The position of the pivot of the lever 27 is fixed and the valve spool 10 is controlled in such a manner that the force applied to the valve spool 10 and the spring force of the spool return spring 32 balances with the input, thereby exhibiting the function as a stroke simulator. Because of this function as a stroke simulator, the stroke characteristic on the input side can be changed without affecting the output side.

21 Claims, 26 Drawing Sheets

TO BOOSTER RESERVOIR

TO BOOSTER RESERVOIR

FLUID PRESSURE BOOSTING DEVICE AND BRAKE SYSTEM EMPLOYING THE SAME

This application is a continuation-in-part of application Ser. No. 09/599,272, filed Jun. 22, 2000.

BACKGROUND OF THE INVENTION

The present invention relates to a fluid pressure boosting device, which boosts operating force exerted on an operating means with working fluid pressure, controlled by a control valve, into predetermined magnitude to output the boosted force and a brake system employing the fluid pressure boosting device. More particularly, the present invention relates to a fluid pressure boosting device which can set the input stroke into various values without being affected by the operation of a working unit of a master cylinder and the like operated with the output of the fluid pressure boosting device and can control the output of the fluid pressure boosting device during its operation regardless of the operating force exerted on the operating means and a brake system employing the fluid pressure boosting device.

For example, in a conventional brake system of an automobile, a brake fluid pressure boosting device has been employed which intensifies pedal pressure on a brake pedal by fluid pressure of hydraulic fluid into predetermined magnitude to develop large brake fluid pressures. The brake fluid pressure boosting device functions to obtain large braking force from small pedal pressure on the brake pedal, thereby securing the braking action and reducing the fatigue of a driver.

In the conventional brake fluid pressure boosting device, a control valve is actuated by an input based on the pedal pressure on the brake pedal to develop working fluid pressure of hydraulic fluid and the developed working fluid pressure is introduced into a power chamber, thereby intensifying the input at a predetermined ratio to output intensified pressure. A piston of a master cylinder is moved by the output of the brake fluid pressure boosting device so that the master cylinder outputs master cylinder pressure. The master cylinder pressure is introduced as braking pressure of hydraulic fluid into wheel cylinders, thus carrying out the braking action.

By the way, conventional brake systems employ various brake controls such as for controlling the braking force during the braking operation, for example, Anti-Lock Control (ABS), Brake Assist Control to be typically used for starting or stopping in the middle of a slope, and Regenerative Brake Coordination Control to be performed for controlling the braking pressure produced by a service braking system when a regenerative brake system is used to develop braking pressure during the braking operation by the service brake system, and automatic brake controls, for example, a brake control for controlling the distance from another vehicle, a brake control for avoiding a collision with an obstacle object, and Traction Control (TRC).

Most of such brake controls are normally conducted in a brake circuit between the master cylinder and the wheel cylinders. However, when the brake control is conducted in the brake circuit after the master cylinder, it is required to prevent the input stroke of the hydraulic boosting from being affected by such brake controls, for instance, for obtaining better operational feeling.

However, in a brake system in which a conventional brake fluid pressure boosting device and a brake master cylinder are combined, the stroke of a piston of the master cylinder is fixed by the relation between the master cylinder and wheel cylinders so that the stroke of an input shaft of the brake fluid pressure boosting device, i.e. the pedal stroke of a brake pedal, depends on the stroke of the piston of the master cylinder. That is, the stroke for input is affected by the brake controls conducted in the brake circuit after the master cylinder. In the combination between the conventional brake fluid pressure boosting device and the brake master cylinder, the aforementioned requirement can not be securely and sufficiently satisfied.

For changing the stroke characteristic of the brake pedal as the input side to obtain better operational feeling, the brake master cylinder and the brake circuit after the brake master cylinder are also affected so that some change on the output side, for instance a size change on the master cylinder, should be required. By the change on the output side, the output characteristic of the brake system is affected. This means that the overall change on the brake system is required, i.e. large-scale change is required.

It is further desired that the input side is affected as little as possible by brake circuit which may differ according to the type or size of vehicle.

If the input side and the output side are just separated from each other to produce outputs regardless of the travel of the input side, the input side does not travel so that the stroke of the input side can not be ensured.

For this, it has been conventionally proposed that a stroke simulator is provided on the brake circuit after the master cylinder to prevent the travel of the input side from being affected by the brake control after the master cylinder and to ensure the stroke of the input side.

However, to add specially the stroke simulator, many parts such as a stroke cylinder and an electromagnetic switching valve used for the stroke simulator are required, making the structure complex and increasing the cost.

There is still a problem that brakes must be securely operated in case of a fluid pressure source failure even when a stroke simulator is provided.

In an anti-lock control system, it is desired that when a braked wheel or braked wheels are in locking tendency, the braking force is controlled to cancel the locking tendency of the wheel(s). Further, in a regenerative coordination brake system composed of a combination of a service brake system and a regenerative brake system, when the regenerative brake system is operated during the operation of the brake fluid pressure boosting device, the braking force produced by the brake fluid pressure boosting device should be reduced for the braking force produced by the regenerative brake system. In this case, it is desired to reduce the output of the brake fluid pressure boosting device to a value obtained by subtracting the output of the regenerative brake system from the output of the fluid pressure boosting device. In a brake system composed of a combination of a service brake system and a brake assist system, it is desired to facilitate starting at a slope by controlling the cancellation of braking operation and also desired to increase the output of the brake fluid pressure boosting device to intensify the braking force produced by the brake fluid pressure boosting device in such case that brake assist operation is needed, for example, a case that a driver can not depress a brake pedal enough during the operation of the brake fluid pressure boosting device so as not to develop predetermined braking force.

As mentioned above, when the brake control is performed during the operation, the brake pedal is not affected even when the stroke simulator is provided.

Further, in a brake system for controlling the distance from a front vehicle, it is desired to hold the distance constant by automatically actuating brakes when the distance becomes short during running. In a brake system for avoiding a collision, it is desired to avoid a collision with an obstacle object by automatically actuating brakes when there is a possibility of collision with the obstacle object. Furthermore, in a traction control system, it is desired to cancel a slipping tendency to ensure the secure starting by automatically braking driving wheels when the driving wheel(s) is in slipping tendency at the starting.

As mentioned above, it is desired that the brake pedal is not affected when the automatic braking is conducted even when the stroke simulator is provided.

Further, it is desired that such a system for controlling the braking force during braking operation or controlling the automatic braking can be manufactured with a simple structure.

Moreover, it is desired that the input-stroke characteristic, the input-brake pressure characteristic, or the stroke-brake pressure characteristic is allowed to be changed according to the condition of a vehicle or the like with a simple structure.

SUMMARY OF THE INVENTION

It is an object of the present invention to provide a fluid pressure boosting device of which the stroke characteristic at the input side can be freely changed without being affected by the output side and without significant modification.

It is another object of the present invention to provide a fluid pressure boosting device which can securely operate even in case of the fluid pressure source failure and which can be manufactured to be compact at a low cost.

It is still another object of the present invention to provide a fluid pressure boosting device of which the output can be controlled regardless of the input of an input member during operation, and to provide a brake system employing the fluid pressure boosting device of which the output can be controlled in response to a request signal requesting an increase or decrease in the output regardless of the input of the input member during operation.

To achieve the aforementioned objects, a fluid pressure boosting device of the present invention comprises at least an input member which is moved by input applied during operation and a control valve which is operated by the input member for controlling fluid pressure of a fluid pressure source according to the travel of said input member to develop working fluid pressure for operating an working unit, and is characterized in that said working fluid pressure acts on said control valve in the inoperative direction, an elastic member is disposed between said control valve and said input member, force of the elastic member corresponding to the travel of said input member acts on said control valve in the operative direction, and said control valve is controlled according to said travel such that the force generated by said working fluid pressure balances with the force generated by said elastic member.

The fluid pressure boosting device of the present invention is further characterized in that in case of said fluid pressure source failure, said working unit is operated by the travel of said input member.

The fluid pressure boosting device of the present invention is further characterized in that said control valve is composed of a spool valve, said spool valve has a valve spool of which operation is controlled by the force of said elastic member acting in the operative direction and by said working fluid pressure acting in the inoperative direction, and the operation of said valve spool is controlled according to the input of said input member in such a manner that force by said working fluid pressure acting on the valve spool balances with force of said elastic member.

The fluid pressure boosting device of the present invention is further characterized in that said spool valve comprises a first throttle valve and a second throttle valve, the flow of hydraulic fluid is first throttled by said first throttle valve and then throttled by said second throttle valve, that is, the flow is throttled at two stages.

The fluid pressure boosting device of the present invention is further characterized in that said control valve is a ball valve or cone valve, the force of said elastic member acts on said ball valve or cone valve in the operative direction and said working fluid pressure acts on said ball valve or cone valve in the inoperative direction, and the operation of said ball valve or cone valve is controlled according to the input of said input member in such a manner that the force generated by said working fluid pressure balances with the force generated by said elastic member.

The fluid pressure boosting device of the present invention is further characterized in that said elastic member is disposed coaxially with said input member, said control valve is disposed to have a predetermined space relative to said input shaft, and further comprising a lever disposed between said elastic member and said control valve wherein said lever being rotated by force of said elastic member corresponding to the travel of said input member to act on said control valve in the operative direction, the position of the pivotal point of said lever is fixed regardless of the travel of said input member, and the operation of said control valve is controlled according to the input of said input member in such a manner that the force generated by said working fluid pressure balances with the force generated by the rotation of said lever.

The fluid pressure boosting device of the present invention is further characterized in that said input member is slidable relative to said lever and a slide lubricating member is provided at a sliding portion between said input member and said lever.

The fluid pressure boosting device of the present invention is further characterized in that said slide lubricating member is a bush or a linear bearing.

The fluid pressure boosting device of the present invention is further characterized in that the pivot point of said lever is positioned on either said input member side or said control valve side.

The fluid pressure boosting device of the present invention is further characterized in that said elastic member is a plurality of springs or a non-linear spring.

The fluid pressure boosting device of the present invention is further characterized in that during the operation when said fluid pressure source is in the normal state, the position of said control valve is fixed regardless of the travel of said input member, and by further comprising a fluid pressure control means for controlling said working fluid pressure regardless of the input of said input member.

The fluid pressure boosting device of the present invention is further characterized by further comprising a power chamber into which the working fluid pressure is introduced to produce an output for actuating said working unit, and a reaction chamber into which said working fluid pressure is introduced to apply reaction force to said input member, wherein said fluid pressure control means is a pressure control valve for controlling the working fluid pressure of at least one of said power chamber and said reaction chamber.

The fluid pressure boosting device of the present invention is further characterized in that said pressure control valve controls said working fluid pressure or the fluid pressure of said fluid pressure source and supplies it into at least one of said power chamber and said reaction chamber.

The fluid pressure boosting device of the present invention is further characterized by further comprising a power chamber into which the working fluid pressure is introduced to produce an output for actuating said working unit, and a pressure control chamber into which said working fluid pressure is introduced to control said output, wherein said fluid pressure control means is a pressure control valve for controlling the working fluid pressure of at least one of said power chamber and said pressure control chamber.

The fluid pressure boosting device of the present invention is further characterized in that said pressure control valve controls said working fluid pressure or the fluid pressure of said fluid pressure source and supplies it into at least one of said power chamber and said pressure control chamber.

The fluid pressure boosting device of the present invention is further characterized in that said fluid pressure control means is an electromagnetic solenoid which generates biasing force biasing said control valve in at least one of an operative direction and an inoperative direction.

The fluid pressure boosting device of the present invention is further characterized in that said control valve comprises a valve spool of which operation is controlled by the force of said elastic member acting in the operative direction and by said working fluid pressure acting in the inoperative direction and a valve sleeve fixed to the housing of said fluid pressure boosting device, and wherein said valve spool is moved relative to said valve sleeve according to the input of said input member in such a manner that force by said working fluid pressure acting on the valve spool balances with force of said elastic member.

The fluid pressure boosting device of the present invention is further characterized in that said valve spool is formed with an annular groove into which said working fluid pressure is introduced during its operation, wherein the pressure receiving area of the pressure receiving surface of said annular groove which receives said working fluid pressure in the inoperative direction of said valve spool is set larger than the pressure receiving area of the pressure receiving surface of said annular groove which receives said working fluid pressure in the operative direction of said valve spool.

The fluid pressure boosting device of the present invention is further characterized by further comprising a lever disposed between said elastic member and said control valve wherein said lever being rotated by force of said elastic member corresponding to the travel of said input member to act on said control valve in the operative direction, the position of the pivotal point of said lever is fixed regardless of the travel of said input member, and the operation of said control valve is controlled according to the input of said input member in such a manner that the force generated by said working fluid pressure balances with the force generated by the rotation of said lever.

A brake system of the present invention comprises a brake fluid pressure boosting device to intensify an input, a master cylinder which is operated with the output of said brake fluid pressure boosting device to develop master cylinder pressure, and brakes which are operated with braking force generated by the master cylinder pressure, wherein said brake fluid pressure boosting device is the aforementioned fluid pressure boosting device, said brake system being characterized in that the operation of said working fluid pressure control means of the brake fluid pressure boosting device is controlled by a controller and that said controller controls the output of said brake fluid pressure boosting device to obtain a requested increase or decrease in the braking force by controlling the operation of said working fluid pressure control means wherein said requested increase or decrease in the braking force is requested by one of other controllers than said controller.

Further, the brake system of the present invention is characterized in that said working fluid pressure control means has an electromagnetic solenoid for its operation, and that said controller for controlling the operation of said working fluid pressure control means supplies electric current to said electromagnetic solenoid wherein said electric current corresponds to the amount of said requested increase or decrease in the braking force requested by said one of the other controllers.

In the fluid pressure boosting device of the present invention structured as described above, the elastic member produces force corresponding to the travel of the input member by the input applied to the input member. The force of the elastic member acts on the control valve in the operative direction to operate the control valve. By the operation of the control valve, the fluid pressure of the fluid pressure source is controlled to a value corresponding to the travel of the input member. The working fluid pressure controlled by the control valve is produced as an output and the working unit is directly operated by the fluid pressure of this output. At the same time, the working fluid pressure also acts on the control valve in the inoperative direction. At this point, the control valve is operated according to the travel of the input member in such a manner that the force produced by the working fluid pressure balances with the force produced by the elastic member.

Accordingly, the position of the control valve is fixed regardless of the travel of the input member when the fluid pressure source is in the normal state. Then, the input side and the output side of the fluid pressure boosting device can be separately operated. Even when the input side and the output side are separated, the control valve is controlled according to the travel of the input member in such a manner that the force produced by the working fluid pressure balances with the force produced by the elastic member, thereby exhibiting the function as a stroke simulator.

In this manner, since the fluid pressure boosting device of the present invention can exhibit the function as a stroke simulator even when the input side and the output side of the fluid pressure boosting device are separately operated, the travel of the input member can be ensured and the input travel of the input member can be freely set without affecting the output side after the working unit.

Further, the working fluid pressure for operating the working unit is controlled by the working fluid pressure control means regardless of the working fluid pressure for operating the working unit or the input of the input member during the operation of the fluid pressure boosting device. Therefore, when the fluid pressure boosting device of the present invention is applied to a brake fluid pressure boosting device, the brake fluid pressure boosting device can easily and flexibly cope with such a system requiring to control the working fluid pressure regardless of the input of the input member during the operation of the fluid pressure boosting device. Therefore, for example, the working fluid pressure can be controlled or decreased for the regenerative braking operation by such a regenerative coordination brake system as mentioned above and the working fluid pressure can be controlled or increased for the brake assisting operation by a brake assist system also as mentioned above.

Further, when the input member is not operated, the working fluid pressure for operating the working unit can be controlled by the fluid pressure control means regardless of the operation of the input member, the fluid pressure boosting device can easily and flexibly cope with such a system requiring automatic brake controls, for example, a brake control for controlling the distance from another vehicle, a brake control for avoiding a collision with an obstacle object, and a brake control for Traction Control.

Since a control valve and a lever of a conventional fluid pressure boosting device can be used as the control valve and the lever of the present invention without significant change, the fluid pressure boosting device of the present invention can be manufactured with easy structure and at a low cost without using special parts.

Since the working unit can be operated by forward movement of the input member in case of the fluid pressure source failure, the working unit can be securely operated even in case of the fluid pressure source failure.

In the brake system of the present invention, when braking force larger than that for the normal braking (service braking) is required, for example, for brake assist control, brake control during running on a downward slope, or brake control during running with a full load capacity, or when braking force smaller than that for the normal braking (service braking) is required, for example, for regenerative brake coordination control, engine brake control, or exhaust brake control, one of the other controllers (control ECUs) for conducting the respective controls outputs a request signal requesting an increase or decrease in the braking force at the wheel cylinders. Then, the controller for the working fluid pressure control means controls the output of the brake fluid pressure boosting device according to the amount of increase or decrease in the braking force requested by one of the other controllers regardless of the input or pedal force on the brake pedal.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, embodiments of the present invention will now be described with reference to drawings.

Figure 1:
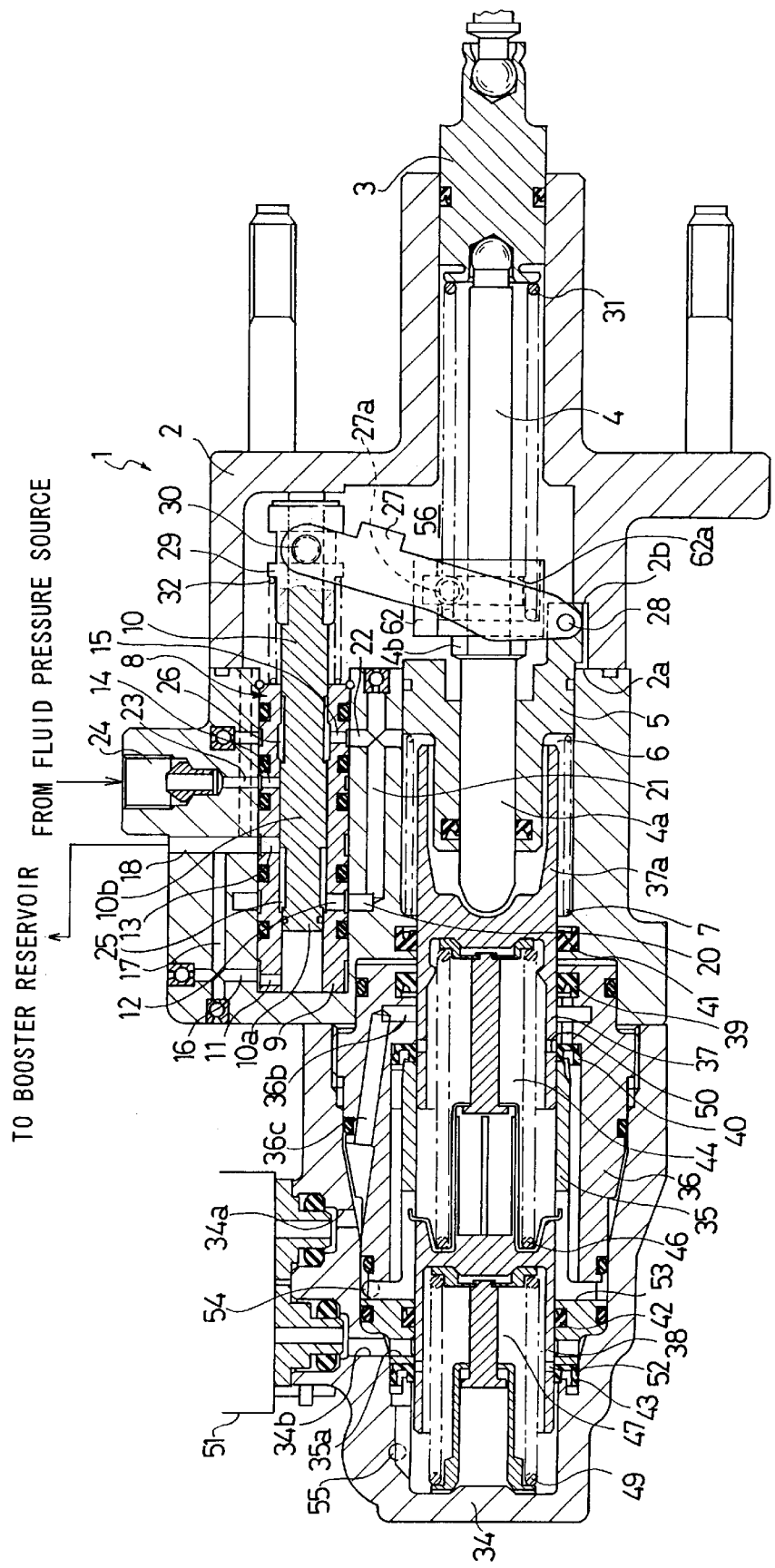
FIG. 1 is a sectional view showing a brake fluid pressure boosting device to which a first embodiment of the fluid pressure boosting device of the present invention is applied.
Figure 2:
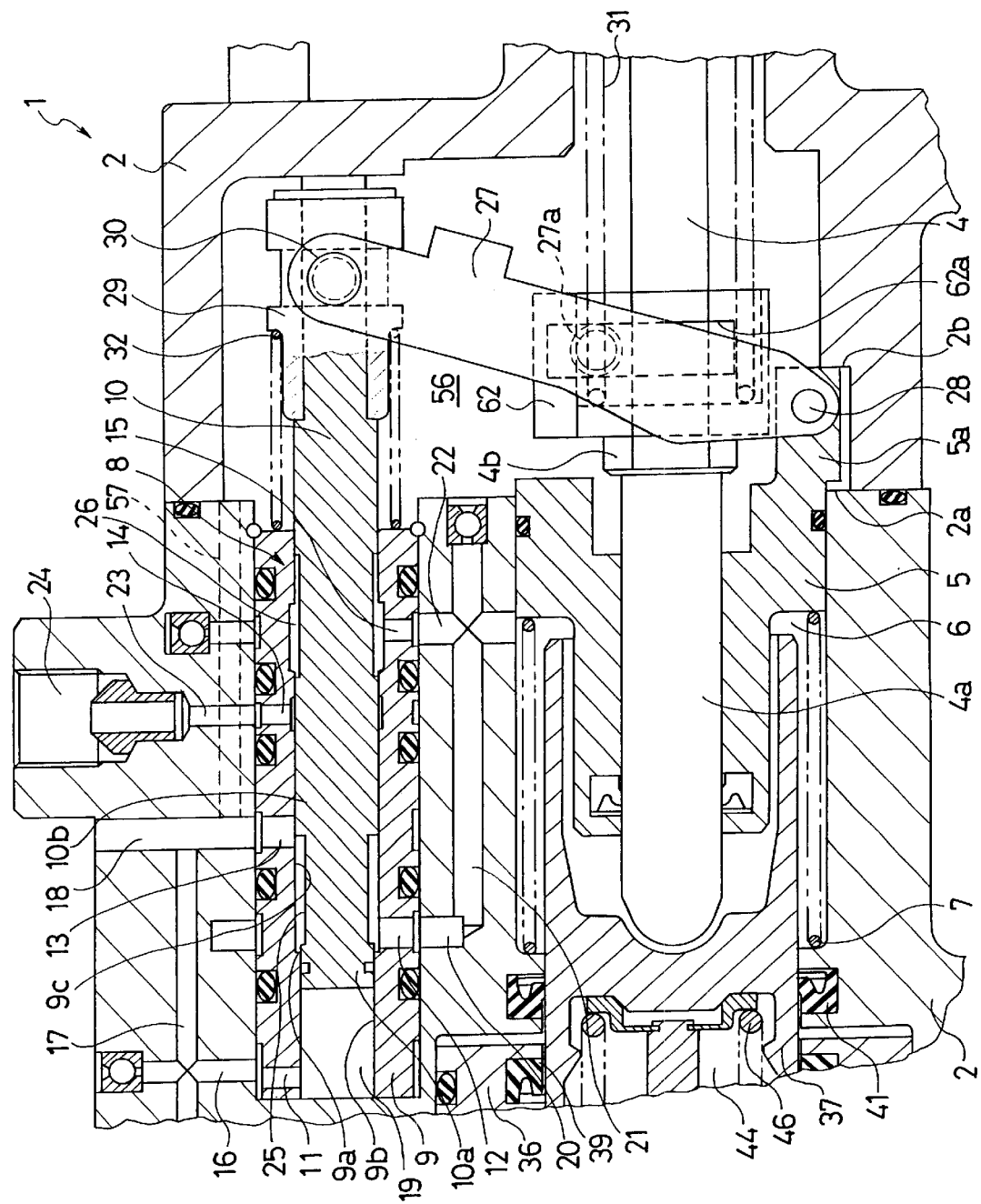
FIG. 2 is a partially enlarged sectional view showing a section around a control valve and a lever of the brake fluid pressure boosting device shown in FIG. 1.
Figure 3:
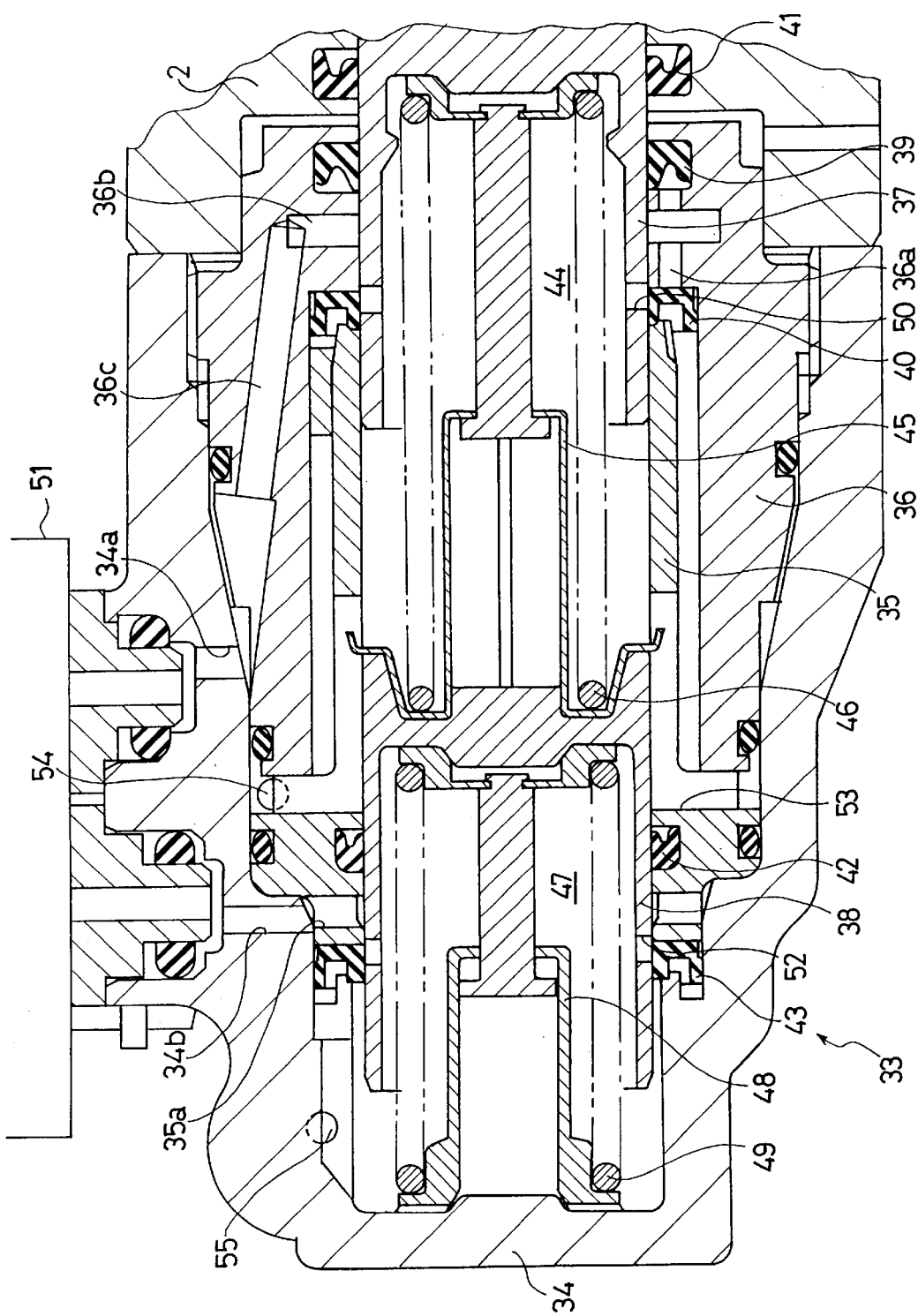
FIG. 3 is a partially enlarged sectional view showing a section around a master cylinder shown in FIG. 1.

FIG. 1 is a sectional view showing a brake fluid pressure boosting device to which the first embodiment of the fluid pressure boosting device of the present invention is applied, FIG. 2 is a partially enlarged sectional view showing a section around a control valve and a lever of the brake fluid pressure boosting device shown in FIG. 1, and FIG. 3 is a partially enlarged sectional view showing a section around a master cylinder shown in FIG. 1. In the following description, "the vertical direction" correspond to the upper and lower direction in any of drawings, and "the front and the rear" correspond to the left and the right in any of the drawings.

As shown in FIG. 1, a brake fluid pressure boosting device 1 of the first embodiment is integrally connected to a master cylinder so that the master cylinder is actuated by the output of the brake fluid pressure boosting device 1.

As shown in FIG. 1 and FIG. 2, the brake fluid pressure boosting device 1 comprises a booster housing 2. Fluid-tightly and slidably fitted into the booster housing 2 is an input piston 3 which is connected to a brake pedal (only shown in FIG. 26 with a reference numeral 130) and is connected to an input shaft 4 (corresponding to the input member of the present invention). In the booster housing 2, a power piston 5 is arranged fluid-tightly and coaxially with the input shaft 4 and defines a power chamber 6 in front of the power piston 5. In the brake fluid pressure boosting device 1 of this embodiment, the power piston 5 functions as a plug for defining the power chamber 6 as mentioned above and does not function for generating outputs of the brake fluid pressure boosting device 1. The power piston 5 has a lever-supporting portion 5a at its rear end. The lever-supporting portion 5a is positioned between first and second stepped portions 2a, 2b of the booster housing 2 and is fixed in position to be in contact with the second stepped portion 2b by a spring 7 compressed in the power chamber 6. Further, an end portion 4a of the input shaft 4 fluid-tightly and slidably extends through the power piston 5 to face the power chamber 6.

Further, a control valve 8 is arranged parallel to the input shaft 4 and spaced a predetermined interval apart from the input shaft 4. The control valve 8 is a spool valve comprising a valve sleeve 9 fluid-tightly secured in the booster housing 2 and a valve spool 10 slidably inserted in the valve sleeve 9. The valve sleeve 9 is formed with a stepped portion 9a in its inner surface so that the cylinder hole is composed of a small-diameter cylinder portion 9b at the front side and a large-diameter cylinder portion 9c from the middle to the rear end. The valve sleeve 9 is formed with first through fifth radial holes 11, 12, 13, 14, and 15 in the order from the front end. In this case, the first radial hole 11 is formed in the small-diameter cylinder portion 9b and the second through fifth radial holes 12, 13, 14, 15 are formed in the large diameter cylinder portion 9c.

The first radial hole 11 always communicates with a booster reservoir not shown through passages 16, 17, 18 of the booster housing 2. Therefore, a space 19 in the valve sleeve 9 positioned in front of the valve spool 10 always communicates with the booster reservoir. The second radial hole 12 always communicates with the power chamber 6 through passages 20, 21, 22 of the booster housing 2 and the third radial hole 13 always communicates with the booster reservoir through the passage 18. Further, the fourth radial hole 14 always communicates with an accumulator as a fluid pressure source not shown through a passage 23 and a fluid pressure inlet 24 of the booster housing 2 so that the fluid pressure stored in the accumulator by a pump not shown is introduced into the fourth radial hole 14. Furthermore, the fifth radial hole 15 always communicates with the power chamber 6 through the passage 22 of the booster housing 2.

The valve spool 10 is formed with a stepped portion so as to comprise a small-diameter spool portion 10a at the front side and a large-diameter spool portion 10b from the middle to the rear end. In this case, the small-diameter spool portion 10a is fluid-tightly and slidably fitted into the small-diameter cylinder portion 9b of the valve sleeve 9 and the large-diameter spool portion 10b is slidably fitted into the large-diameter cylinder portion 9c. The valve spool 10 is provided with a first annular groove 25 formed between the small-diameter spool portion 10a and the large-diameter spool portion 10b and with a second annular groove 26 in the large-diameter spool portion 10b.

The first annular groove 25 is always connected to the second radial hole 12. When the valve spool 10 is inoperative as shown in FIGS. 1, 2, the first annular groove 25 is connected to the third radial hole 13 so as to connect the power chamber 6 to the booster reservoir, thereby setting the fluid pressure of the power chamber 6 at atmospheric pressure. On the other hand, when the valve spool 10 is actuated and moves forward, the first annular groove 25 is shut off from the third radial hole 13 so as to shut off the power chamber 6 from the booster reservoir. The third radial hole 13 and the first annular groove 25 compose a fluid pressure discharge valve. On the other hand, the second annular groove 26 is always connected to the fifth radial hole 15. When the valve spool 10 is inoperative, the second annular groove 26 is shut off from the fourth radial hole 14 so as to shut off the power chamber 6 from the accumulator as the fluid pressure source. When the valve spool 10 is actuated and moves forward, the second annular groove 26 is connected to the fourth radial hole 14 to connect the power chamber 6 to the accumulator whereby the fluid pressure of the accumulator is introduced into the power chamber 6. The fourth radial hole 14 and the second annular groove 26 compose a fluid pressure supply valve.

When the fluid pressure discharge valve is closed and the fluid pressure supply valve is opened to introduce the fluid pressure into the power chamber 6, the fluid pressure introduced into the power chamber 6 is also introduced into the first annular groove 25. Accordingly, the fluid pressure in the first annular groove 25 acts on the small-diameter spool portion 10a and the large-diameter spool portion 10b so as to bias the valve spool 10 toward the right, i.e. into the inoperative position, because the pressure receiving areas of the small-diameter and large-diameter spool portions 10a, 10b are different from each other.

At the lever supporting portion 5a of the power piston 5, one end of the lever 27 is pivotally supported by a first supporting pin 28. The other end of the lever 27 is pivotally supported by a second supporting pin 30 at a valve actuating member 29.

A retainer 62 is slidably fitted to the input shaft 4 and a return spring 31 (corresponding to the elastic member of the present invention) is disposed coaxially with the input shaft 4 and compressed between the retainer 62 and the input piston 3. The return spring 31 always biases the input piston 3 and the input shaft 4 backwards relative to the retainer 62. When the input shaft 3 is inoperative as shown, a flange 4b of the input shaft 4 is in contact with the retainer 62 to define the rear-most position of the input shaft 4. The retainer 62 is formed with an elongated hole 62a extending in the vertical direction. An engaging pin 27a projecting inwardly from the lever 27 is fitted into the elongated hole 62a in such a manner that the engaging pin 27a is fixed in the forward and backward direction (the rightward and leftward direction in the drawings, hereinafter, sometimes referred to as "the longitudinal direction") and is slidable in the vertical direction. The distance between the first supporting pin 28 and the engaging pin 27a is set to be always smaller than the distance between the engaging pin 27a and the second supporting pin 30 regardless of when the brake fluid pressure boosting device 1 is operative or inoperative.

The valve actuating member 29 is fitted and fixed to the valve spool 10 and is always biased by a spool return spring 32 backwards. When it is inoperative, the valve actuating member 29 and the valve spool 10 are set in the inoperative position as shown where the rear end of the valve spool 10 is in contact with the housing 2.

Hereinafter, the master cylinder will be described. As shown in FIG. 1 and FIG. 3, the master cylinder 33 is provided with a master cylinder housing 34 formed in a tubular shape having a rear end opening. A sleeve 35 is disposed inside the master cylinder housing 34. Fluid-tightly threaded into the master cylinder housing 34 is a tubular cap 36 axially supporting the sleeve 35 with the master cylinder housing 34. The cap 36 is fluid-tightly fitted to the booster housing 2. The master cylinder 33 is a tandem master cylinder having a primary piston 37 and a secondary piston 38 which are designed to have the same effective pressure receiving area.

The primary piston 37 is arranged to extend in the power chamber 6 in the booster housing 2 and in the respective holes of the cap 36 and the sleeve 35. The primary piston 37 is fluid-tightly and slidably arranged by a first cup sealing member 39 disposed around the inner surface of the cap 36 and a second cup sealing member 40 disposed between the sleeve 35 and the cap 36 and around the inner surface of the hole of the cap 36. The second cap sealing member 40 blocks the flow from the front side to the rear side while allowing the inverse flow. Further, the primary piston 37 is fluid-tightly and slidably supported to the booster housing 2 by a third cup sealing member 41 and the rear end portion 37a of the primary piston 37 faces the power chamber 6.

The secondary piston 38 is arranged to extend in the hole of the sleeve 35 and in the master cylinder housing 34. The secondary piston 38 is fluid-tightly and slidably arranged by a fourth cup sealing member 42 disposed around the inner surface of the hole of the sleeve 35 and a fifth cup sealing member 43 disposed between the master cylinder housing 34 and the sleeve 35 and around the inner surface of the hole of the master cylinder housing 34. The fifth cup sealing member 43 blocks the flow from the front side to the rear side while allowing the inverse flow.

Between the primary piston 37 and the secondary piston 38, a primary chamber 44 is formed and a primary return spring 46 is disposed and compressed. The maximum length of the primary return spring 46 is defined by a primary spring retainer 45. In a space between the master cylinder housing 34 and the secondary piston 38, a secondary chamber 47 is formed and a secondary return spring 49 is disposed and compressed. The maximum length of the secondary return spring 49 is defined by a secondary spring retainer 48. In this case, the spring force of the secondary return spring 49 is set to be larger than the spring force of the primary return spring 46.

The primary piston 37 is formed with a radial hole 50. When the primary piston 37 is in the inoperative position as shown, the position of the radial hole 50 is slightly behind the cup sealing member 40. At this point, the primary chamber 44 communicates with a master cylinder reservoir 51 through the radial hole 50, a space between the rear surface of the cup sealing member 40 and the cap 36, an axial hole 36a formed in the cap 36, a circumferential groove 36b formed in the cap 36 between the cup sealing members 39, 40, an inclined hole 36c axially extending continuously from the circumferential groove 36b, and a radial hole 34a of the master cylinder housing 34.

Therefore, in this state, no master cylinder pressure is developed in the primary chamber 44. When the radial hole 50 is moved to be positioned slightly in front of the cup sealing member 40 by forward movement of the primary piston 37, the flow of fluid from the primary chamber 44 toward the reservoir 51 is blocked, thereby developing master cylinder pressure in the primary chamber 44.

The secondary piston 38 is formed with a radial hole 52. When the secondary piston 38 is in the inoperative position as shown, the position of the radial hole 52 is slightly behind the cup sealing member 43. At this point, the secondary chamber 47 communicates with a master cylinder reservoir 51 through the radial hole 52, a space between the inner surface of the sleeve 35 and the secondary piston 38, a radial hole 35a formed in the sleeve 35, and a radial hole 34b of the master cylinder housing 34.

Therefore, in this state, no master cylinder pressure is developed in the secondary chamber 47. When the radial hole 52 is moved to be positioned slightly in front of the cup sealing member 43 by forward movement of the secondary piston 38, the flow of fluid from the secondary chamber 47 toward the reservoir 51 is blocked, thereby developing master cylinder pressure in the secondary chamber 47.

The primary chamber 44 is connected to wheel cylinders (only shown in FIG. 26 with reference numeral 131) of one of two brake circuits through a hole 53 formed in the sleeve 35, a primary output port 54 formed in the master cylinder housing 34, while the secondary chamber 47 is connected to wheel cylinders (only shown in FIG. 26 with reference numeral 131) of the other brake circuit through a secondary output port 55 formed in the master cylinder housing 34.

In the housing 2 of the brake fluid pressure boosting device 1, a chamber 56 is formed and accommodates the lever 27 and the like. The chamber 56 is always connected to the booster reservoir through a passage 57 and the passage 18 so that the chamber 56 is held at atmospheric pressure.

In the brake fluid pressure boosting device 1 of the first embodiment as structured above, when the brakes are not working, the input piston 3 and the input shaft 4 are in the rear-most position as shown in FIG. 1 and FIG. 2 and the lever 27 is in the inoperative position so that the control valve 8 is in the inoperative state as shown and mentioned above. In this state, the fluid pressure supply valve is closed and the fluid pressure discharge valve is opened. Therefore, the power chamber 6 is shut off from the accumulator and is allowed to communicate with the booster reservoir so that the fluid pressure in the accumulator is not supplied to the power chamber 6.

The master cylinder 33 is also not actuated. In this state, as shown in FIG. 3, the radial hole 50 of the primary piston 37 is positioned behind the second cup sealing member 40 so that the primary chamber 44 communicates with the master cylinder reservoir 51 through the radial hole 50, the axial hole 36a, the circumferential groove 36b, the inclined hole 36c, the radial hole 34a of the master cylinder housing 34. The radial hole 52 of the secondary piston 38 is positioned behind the fifth cup sealing member 43 so that the secondary chamber 47 communicates with the reservoir 51 through the radial hole 52 and two radial passage 35a, 34b. Therefore, no master cylinder pressure is not developed in the primary chamber 44 and the secondary chamber 47.

When the brakes are working, an input based on the pedal pressure developed by depressing the brake pedal is applied to the input piston 3 and the input shaft 4 so that the input piston 3 and the input shaft 4 move forward. At this point, the retainer 62 does not follow the forward movement of the input piston 3 and the input shaft 4 because the engaging pin 27 is engaged with the elongated hole 62a of the retainer 62 in the longitudinal direction. Therefore, the return spring 31 is compressed so as to increase the biasing force thereof. The increased biasing force of the return spring 31 is transmitted to the lever 27 through the engagement between the elongated hole 62a and the engaging pin 27a, whereby the lever 27 rotates about the first supporting pin 28 in the counter-clockwise direction. Because of the counterclockwise rotation of the lever 27, the valve spool 10 moves forward via the valve actuating member 29. Then, the first annular groove 25 is shut off from the third radial hole 13 so that the fluid pressure discharge valve is closed, while the second annular groove 26 is connected to the fourth radial hole 14 so that the fluid pressure supply valve is opened, thereby supplying the fluid pressure from the accumulator into the power chamber 6.

The fluid pressure introduced into the power chamber 6 acts on the rear end of the primary piston 37 so as to move the primary piston 37 forward. The fluid pressure in the power chamber 6 is further introduced into the first annular groove 25 through the passages 21, 20, and the second radial hole 12. The fluid pressure introduced into the first annular groove 25 acts on the small-diameter and large-diameter spool portions 10a, 10b of which pressure receiving areas are different. Accordingly, the valve spool 10 is biased in such a direction as to close the fluid pressure supply valve and open the fluid pressure discharge valve. The valve spool 10 is controlled in such a manner as to balance the spring force of the return spring 31 or the input applied to the input piston 3, the spring force of the spool return spring 32, and the biasing force of the valve spool 10 by the fluid pressure of the first annular groove 25. By this balance control of the valve spool 10, the fluid pressure in the power chamber 6 becomes a pressure corresponding to the input of the input shaft 4 or the pedal pressure so that the brake fluid pressure boosting device 1 becomes in the medium-loaded state. Accordingly, the output of the brake fluid pressure boosting device 1 becomes to correspond to a value obtained by amplifying the input or the pedal pressure on the brake pedal. That is, the fluid pressure in the power chamber 6 or the output of the brake fluid pressure boosting device 1 is controlled according to the travel of the input shaft 4 or the travel of the brake pedal. The fluid pressure in the power chamber 6 also acts on the front end of the input shaft 4 in the backward direction and is transmitted as a reaction force to a driver via the brake pedal.

The primary piston 37 is moved forward so that the radial hole 50 of the primary piston 37 passes the second cup sealing member 40, thereby developing master cylinder pressure in the primary chamber 44. By the master cylinder pressure developed in the primary chamber 44 and the spring force of the primary return spring 46, the secondary piston 38 is moved forward so that the radial hole 52 of the secondary piston 38 passes the fifth cup sealing member 43, thereby developing master cylinder pressure also in the secondary chamber 47. Then, the master cylinder pressure developed in the primary chamber 44 is introduced into the wheel cylinders of the one circuit through the primary output port 54 and the master cylinder pressure developed in the secondary chamber 47 is introduced into the wheel cylinders of the other circuit through the secondary output port 55, thereby actuating the brakes of a two-circuit braking system. At this point, the master cylinder pressure in the primary chamber 44 and the master cylinder pressure in the secondary chamber 47 are equal to each other so as to supply fluid at the same pressure into the respective wheel cylinders of the two-circuit braking system whereby the fluid pressures in the two circuits are equal to each other. The fluid pressure corresponds to a value obtained by amplifying the input or the pedal pressure on the brake pedal.

At this point, the primary piston 37 travels in correspondence with the amount of consumed fluid in the two-circuit braking system. On the other hand, the input shaft 4 travels in such a manner that the spring force of the return spring 31 having a balance of the force applied to the valve spool 10 by the fluid pressure in the power chamber 6, the force applied to the input shaft 4 by the fluid pressure of the power chamber 6, and the input of the brake pedal acting on the input shaft 3 balance. Therefore, the input shaft 4 and the primary piston 37 separate from each other. That is, the input shaft 4 at the input side travels in correspondence with the input of the brake pedal regardless of the amount of consumed fluid in the two-circuit braking system at the output side.

As the brake pedal is released to cancel the braking action, the input shaft 4 move backward. Then, the spring force of the return spring 31 is reduced so as to rotate the lever 27 about the first supporting pin 28 in the clockwise direction and the valve actuating member 29 moves backwards. Therefore, the second annular groove 26 is shut off from the fourth radial hole 14 to close the fluid pressure supply valve, while the first annular groove 25 is connected to the third radial hole 13 to open the fluid pressure discharge valve. Accordingly, the pressurized fluid in the power chamber 6 is discharged to the booster reservoir through the fluid pressure discharge valve, thereby decreasing the fluid pressure in the power chamber 6.

As the fluid pressure in the power chamber 6 is decreased, the primary piston 37 is moved backwards by the master cylinder pressure in the primary chamber 44 and the spring force of the primary return spring 46. By the backward movement of the power piston 5, the lever 27 is rotated about the second supporting pin 30 in the counterclockwise direction. By the backward movement of the primary piston 37, the master cylinder pressure in the primary chamber 44 is decreased, so the secondary piston 38 is also moved backwards by the master cylinder pressure in the secondary chamber 47 and the spring force of the secondary return spring 49. By the backward movement of the primary piston 37 and the secondary piston38, the radial hole 50 and the radial hole 52 pass the second cup sealing member 40 and the fifth cup sealing member 43 and are returned to be positioned behind the second cup sealing member 40 and the fifth cup sealing member 43, respectively, so that the primary chamber 44 and the secondary chamber 47 are returned to communicate with the master cylinder reservoir 51. Therefore, the pressurized fluid in the wheel cylinders of both circuits is discharged to the master cylinder reservoir 51 through the primary chamber 44 and the secondary chamber 47, respectively.

As the input applied to the input shaft 4 is canceled and the fluid pressure in the power chamber 6 becomes thus equal to the atmospheric pressure, the primary piston 37 is returned to the inoperative position and the secondary piston 38 is also returned to the inoperative position so that the master cylinder 33 does not develop master cylinder pressure any more, thereby quickly canceling the brakes of both circuits.

During the brakes are working, as the pedal pressure on the brake pedal is largely increased to largely move the valve actuating member 29 and the valve spool 10 of the control valve 8 forward so that the open area of the fluid pressure supply valve is maximum, the fluid pressure in the power chamber 6 becomes equal to the pressure of the accumulator and is not further increased any more. In this state, the brake fluid pressure boosting device 1 is in the fully loaded state. In this fully loaded state of the brake fluid pressure boosting device 1, the fluid pressure in the power chamber 6 is fixed so that the primary piston 37 is stopped from further movement by the fluid pressure of the power chamber 6. However, even in the fully loaded state, as the input shaft 4 moves forward, the lever 27 further rotates about the first supporting pin 28 in the counterclockwise direction to further move the valve actuating member 29 and the valve spool 10 forward. As the front end of the valve spool 10 comes in contact with the facing wall of the housing 2, the valve spool 10 and the valve actuating member 29 are stopped from further movement.

As the pedal pressure on the brake pedal is further increased, only the input shaft 4 further moves forward. The travel of the input shaft 4 for this further movement corresponds to the insufficient travel in the aforementioned medium loaded state. As the input shaft 4 relatively moves this travel, the front end of the input shaft 4 comes in contact with the primary piston 37 whereby the primary piston 37 is directly pressed by the input shaft 4. Therefore, when the brake fluid pressure boosting device 1 is in the fully loaded state, the master cylinder pressure is increased only by the increase in the input of the input shaft 4 or the increase in the pedal pressure.

During the operation, since the fluid pressure introduced into the power chamber 6 also acts on the power piston 5, the power piston 5 is held in contact with the second stepped portion 2b of the housing 2 and thus does not move. Therefore, the position of the pivot of the lever 27 is fixed because the lever 27 is pivotally supported by the first supporting pin 28 on the lever supporting portion 5a of the power piston 5. The position of the pivot of the lever 27 is fixed regardless of the travel of the input shaft 4.

In case of that a pump or the fluid pressure source of the accumulator is broken or troubled and fluid pressure therefore can not be introduced from the accumulator into the power chamber 6 during the braking operation, as the input shaft 4 is moved forward by pedal pressure on the brake pedal, the front end of the input shaft 4 comes in contact with the primary piston 37 and the primary piston 37 is directly pressed by the input shaft 4 in the same manner as the case of the fully loaded state. Therefore, since the primary piston 37 can be moved forward, even in case of the fluid pressure source failure, the master cylinder 33 can develop master cylinder pressure, thereby actuating brakes of the two brake circuits.

As described above, according to the brake fluid pressure boosting device 1 of the first embodiment, in the normal case of the fluid pressure source, the primary piston 37 of the master cylinder 33 is directly operated by the working fluid pressure controlled by the control valve 8 to correspond to the input of the input piston 3. On the other hand, the position of the pivot of the lever 27 is fixed and the valve spool 10 is controlled in such a manner that the spring force of the return spring 31 or the input applied to the input piston 3, the spring force of the spool return spring 32, and the biasing force of the valve spool 10 by the fluid pressure of the first annular groove 25 balance, thereby exhibiting the function as a stroke simulator. Therefore, the input side and the output side of the brake fluid pressure boosting device 1 can be separately operated. Moreover, the stroke characteristics of the input side can be changed by changing the setting of the difference between the pressure receiving areas of the small-diameter spool portion 10a and the large-diameter spool portion 10b of the valve spool 10 and the setting of the spring force of the spool return spring 32, without affecting the output side of the brake fluid pressure boosting device 1.

Since the return spring 31, the spool return spring 32, and the small-diameter spool portion 10a and the large-diameter spool portion 10b of the valve spool 10 are built in the brake fluid pressure boosting device 1, not attaching a separately prepared stroke simulator to the brake fluid pressure boosting device 1, the fluid pressure boosting device 1 is allowed to be compact.

Since the brake fluid pressure boosting device 1 of the invention is made by adding the function of a stroke simulator to a conventional lever-type brake fluid pressure boosting device, there is no necessity to provide a specific stroke simulator and only simple modification on the conventional lever-type brake fluid pressure boosting device is required, thereby simplifying the conventional lever-type brake fluid pressure boosting device and also decreasing the cost.

Figure 4:
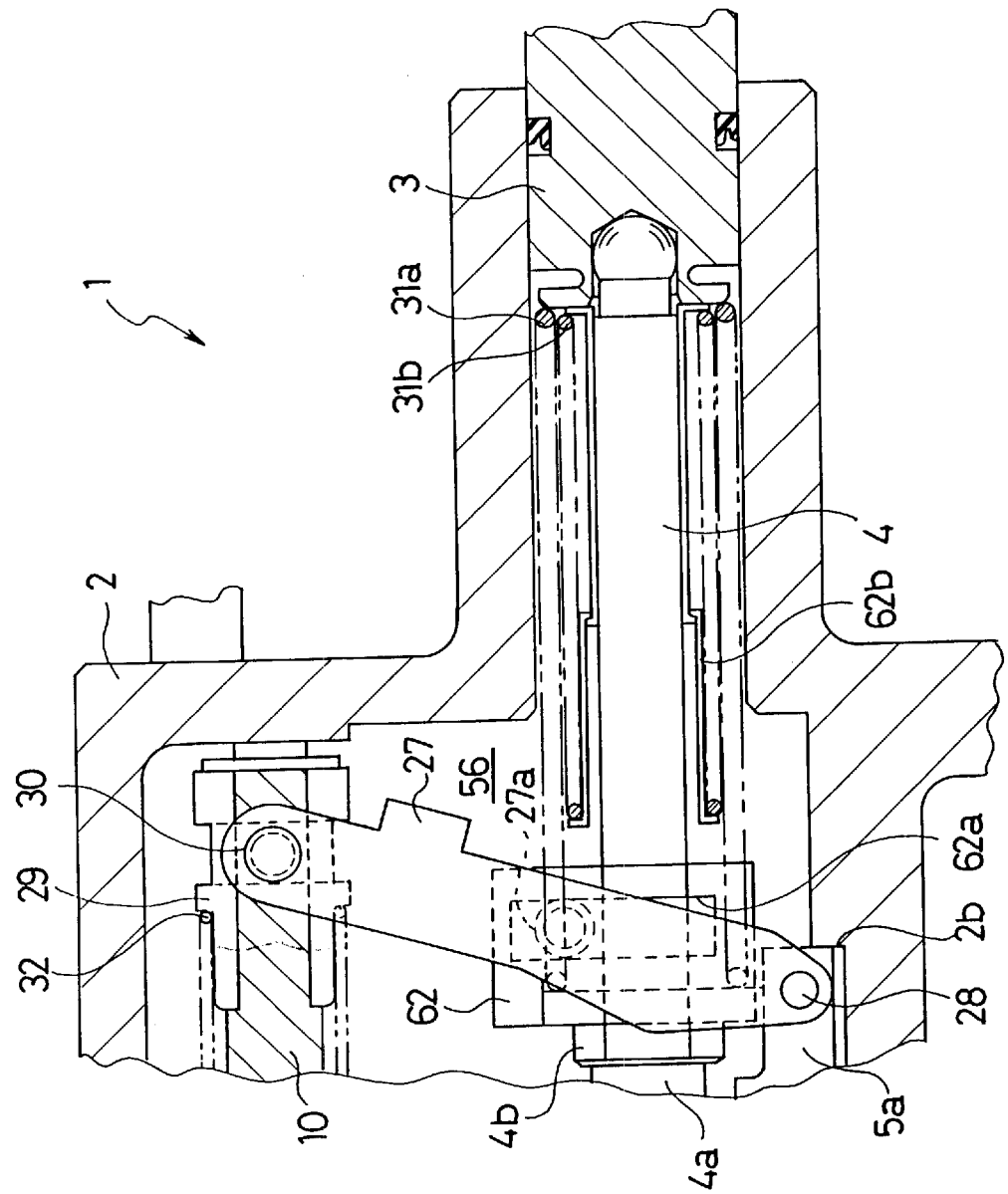
FIG. 4 is a partially sectional view showing a second embodiment of the present invention.

FIG. 4 is a partially sectional view of the second embodiment of the present invention, showing an input piston, an input shaft, and a lever 27. It should be noted that parts similar or corresponding to the parts will be marked by the same reference numerals for the description of the following embodiments.

While only one return spring 31 is used to be disposed and compressed between the input piston 3 and the retainer 62 in the above first embodiment, two return springs 31 i.e. first and second return springs 31a, 31b are used as shown in FIG. 4 in the brake fluid pressure boosting device 1 of the second embodiment. In this second embodiment, the return spring 31a is always compressed between the input piston 3 and the retainer 62 similarly to the return spring 31 of the first embodiment. The second return spring 31b is disposed between the input piston 3 and the retainer 62 in a state that the maximum length thereof is defined by the spring retainer 57. The second return spring 31b is designed not to come in contact with at least one of the input piston 3 and the retainer 62 before the input piston 3 moves a predetermined travel from the inoperative position.

The other structure of the brake fluid pressure boosting device 1 and the structure of the master cylinder 33 of the second embodiment are the same as those of the aforementioned first embodiment.

In the brake fluid pressure boosting device 1 of the second embodiment structured as mentioned above, as the input piston 3 moves forward during the braking operation, the first return spring 31a is deformed to increase the biasing force of the first return spring 31a in the same manner of the return spring 31 of the first embodiment. By the increased biasing force, the lever 27 rotates in the counterclockwise direction so as to close the fluid pressure discharge valve and to open the fluid pressure supply valve of the control valve 8. Therefore the fluid pressure in the accumulator is introduced into the power chamber 6 so that the master cylinder 33 develops master cylinder pressure, thereby actuating the brakes of the two circuits.

Before the input piston 3 moves a predetermined travel, the second return spring 31b does not come in contact with at least one of the input piston 3 and the retainer 62 and is therefore not deformed so that only the first return spring 31a is deformed. At this point, the travel of the input piston 3 is large relative to the input of the input piston 3 corresponding to the pedal pressure. After the input piston 3 moves the predetermined travel, both ends of the second return spring 31b are in contact with the input piston 3 and the retainer 62, respectively, so the second return spring 31b is also deformed as well as the first return spring 31a relative to the input of the input piston 3. Therefore, after that, the travel of the input piston 3 is small relative to the input of the input piston 3. As a result of this, the input-stroke characteristic relative to the input is a two-stage characteristic indicated by a bent line consisting of a straight line with a relatively steep slope for a first period and a straight line with a relatively gentle slope for a period after the second return spring 31b starts to be deformed.

On the other hand, in the brake fluid pressure boosting device 1 of the second embodiment, while the input-input stroke characteristic is the two-stage characteristic, the fluid pressure characteristic of the power chamber 6 relative to the input of the input piston 3 is indicated by one straight line with a predetermined slope just like the case of the aforementioned first embodiment. This is because the spring forces of the first and second return springs 31a, 31b correspond to the input applied to the input piston 3 and the valve spool 10 is controlled such that the spring forces of the first and second return springs 31a, 31b, the spring force of the spool return spring 32, and the biasing force of the valve spool 10 by the fluid pressure of the first annular groove 25 balance, thereby controlling the fluid pressure in the power chamber 6 to a value corresponding to the input of the input piston 3 or the pedal pressure.

The other actions and effects of this brake fluid pressure boosting device 1 and the actions and effects of the master cylinder 33 of the second embodiment are the same as those of the first embodiment.

Figure 5:
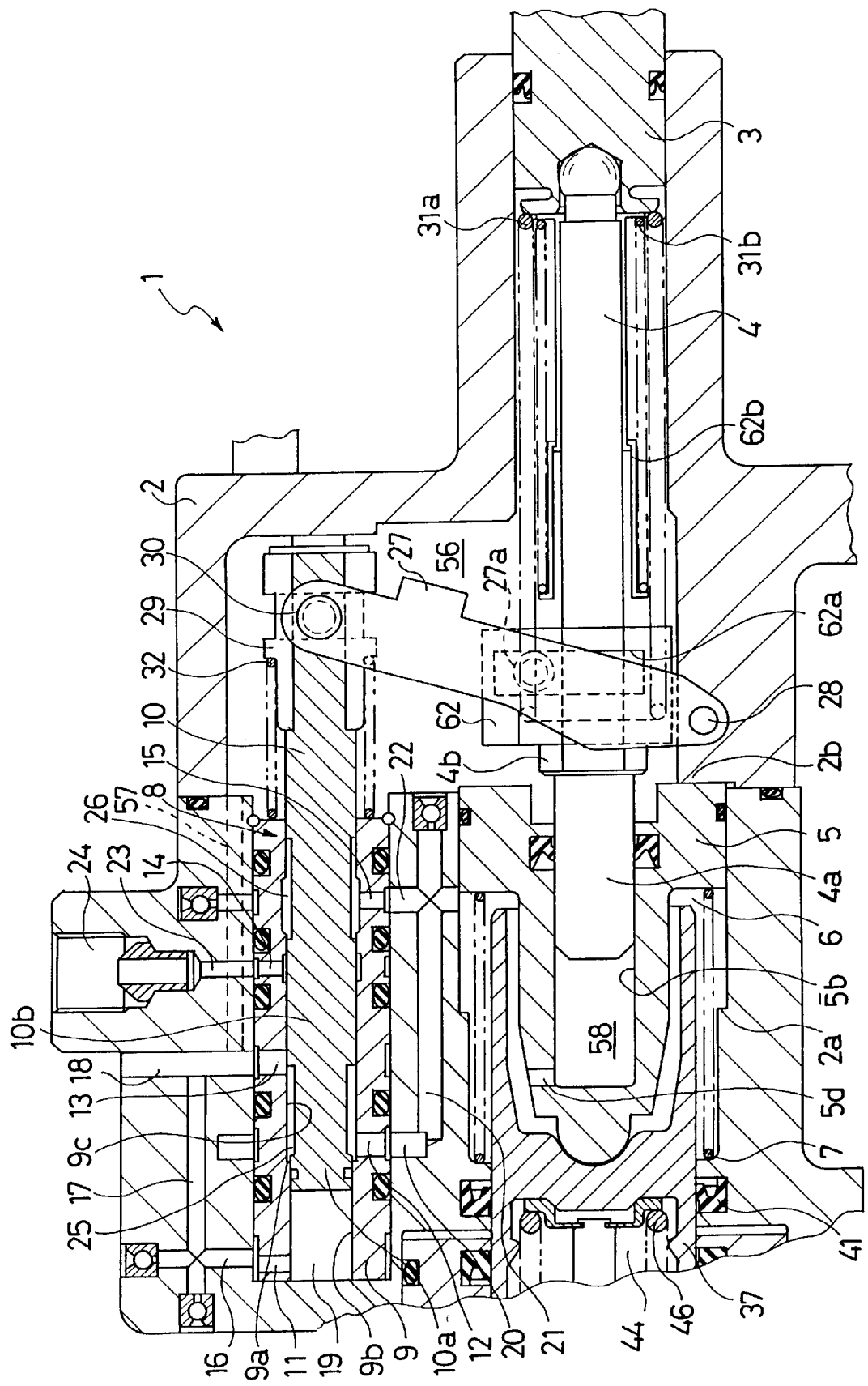
FIG. 5 is a partially sectional view showing a third embodiment of the present invention.

FIG. 5 is a partially sectional view similar to FIG. 2 showing the third embodiment of the present invention.

While the power piston 5 is fixed to the housing 2 in the aforementioned second embodiment, the power piston 5 is arranged to move for a predetermined distance between the first and second stepped portions 2a and 2b of the housing 2 in a brake fluid pressure boosting device 1 of the third embodiment. In the third embodiment, the front end portion 4a of the input shaft 4 does not penetrate the power piston 5 and is just fluid-tightly and slidably inserted into the axial hole 5b of the power piston 5 as shown in FIG. 5. Then, in a bottomed axial hole 5a in front of the front end portion 4a of the input shaft 4, a reaction chamber 58 is defined by the front end portion 4a of the input shaft 4 and is always connected to the power chamber 6 through a radial hole 5d of the power piston 5.

Further, in the third embodiment, the lever 27 is pivotally supported to the housing 2 by the first supporting pin 28.

The other structure of the brake fluid pressure boosting device 1 and the structure of the master cylinder 33 of the third embodiment are the same as those of the aforementioned second embodiment.

The brake fluid pressure boosting device 1 of the third embodiment structured as mentioned above acts as follows.

During the braking operation, the fluid pressure in the accumulator is introduced into the power chamber 6 so that the primary piston 37 moves forward, thereby actuating the brakes similarly to the first and second embodiments. At this point, since the fluid pressure in the power chamber 6 is introduced into the reaction chamber 58 through the radial hole 5d, the fluid pressure in the reaction chamber 58 acts on the front end portion 4a of the input shaft 4 and is transmitted to the driver as a reaction force.

The travels of the respective pistons 37, 38 of the master cylinder 33 vary corresponding to the state of the output side of the master cylinder 33, i.e. the state of a portion from the master cylinder 33 to the wheel cylinders. For example, in a regenerative coordination brake system composed of a combination of a fluid pressure brake system using the brake fluid pressure boosting device 1 of the present invention and a regenerative brake system, during the regenerative braking operation, it is required to reduce the braking force generated by the fluid pressure brake system for the braking force generated by the regenerative brake system. To reduce the braking force of the fluid pressure brake system, the master cylinder pressure must be decreased, that is, the pistons 37, 38 should be returned. In this case, in the third embodiment, the primary piston 37 does not come in directly contact with the front end portion 4a of the input shaft 4 even when returned to the right, thereby preventing the loss of the operation feeling.

In the fully loaded state during the normal fluid pressure operation, the fluid pressure in the power chamber 6 does not exceed the preset maximum fluid pressure. In the third embodiment, however, even when the input shaft 4 further moves forward due to increase in the input in the fully loaded state, the input shaft 4 can not come in contact with the primary piston 37. Therefore, in the fully loaded state, even with further increase in the input, the primary piston 37 does not move forward so that the master cylinder pressure never becomes larger than the fluid pressure in the power chamber 6 in the fully loaded state.

In case of the fluid pressure source failure, the input shaft 4 largely moves forward to come in contact with the power piston 5 and further moves the power piston 5 forward to come in contact with the primary piston 37. Accordingly, in this case, the primary piston 37 is moved forward by the forward movement of the input shaft 4 through the power piston 5, thereby actuating the brakes in the same manner as the aforementioned first and second embodiments.

The other actions and effects of this brake fluid pressure boosting device 1 and the actions and effects of the master cylinder 33 of the third embodiment are the same as those of the second embodiment.

Figure 6:
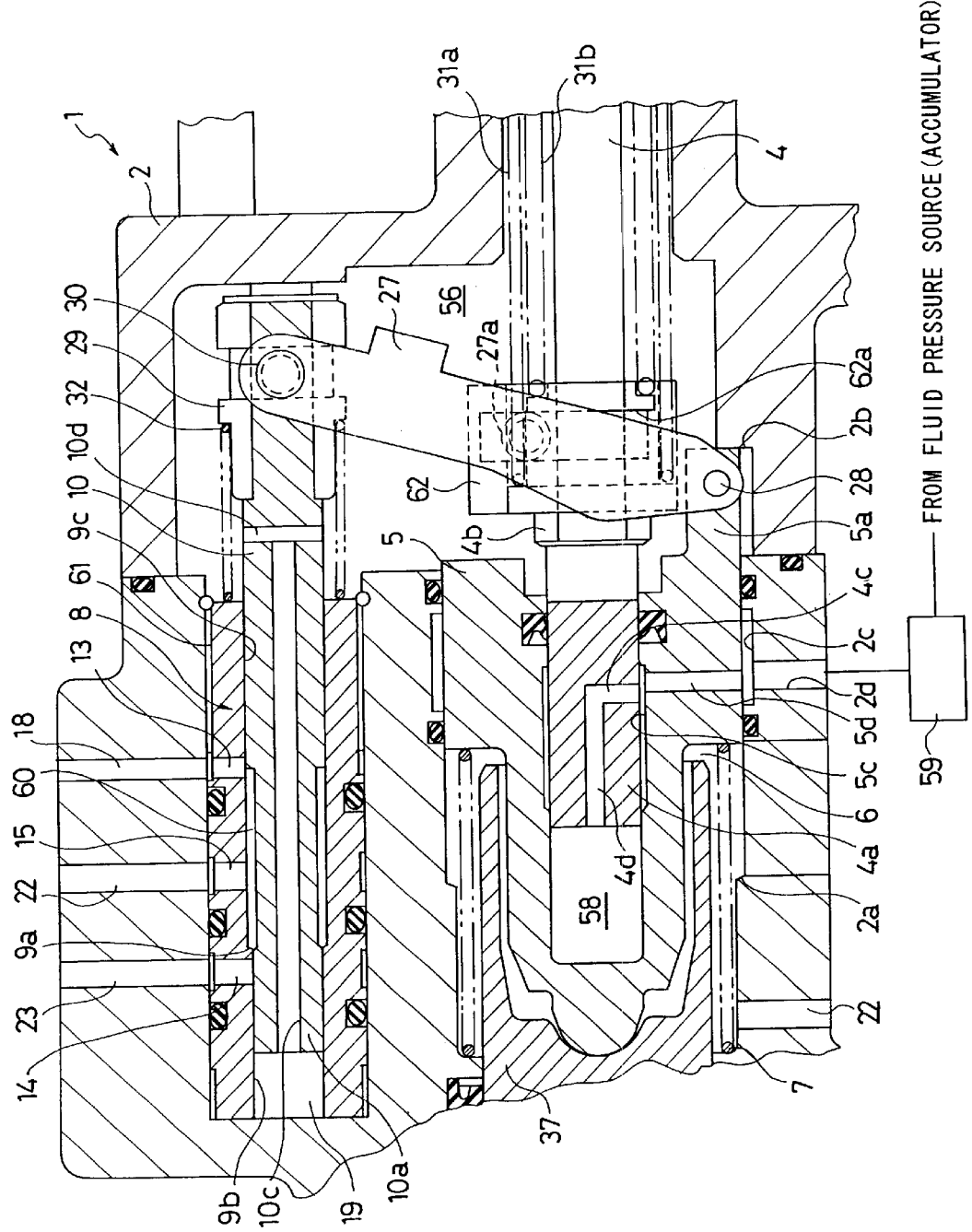
FIG. 6 is a partially sectional view showing a fourth embodiment of the present invention.

FIG. 6 is a partially sectional view similar to FIG. 5 showing the fourth embodiment of the present invention.

While the reaction chamber 58 is connected to the power chamber 6 through the radial hole 5d in the aforementioned third embodiment, the radial hole 5d is omitted so that the reaction chamber 58 is shut off from the power chamber 6 in a brake fluid pressure boosting device 1 of the fourth embodiment. In the fourth embodiment, the reaction chamber 58 is connected to a pressure control valve 59 through an axial hole 4d and a radial hole 4e formed in the front end portion 4a of the input shaft 4, an annular groove 5c and a radial hole 5d formed in the power piston 5, and an annular groove 2c and a radial hole 2d formed in the housing 2. The pressure control valve 59 allows the communication between the reaction chamber 58 and the booster reservoir in its inoperative state and controls the fluid pressure of the accumulator as a fluid pressure source into a predetermined pressure and then introduces the controlled fluid pressure into the reaction chamber 58 in its operative state. The fluid pressure introduced into the reaction chamber 58 acts on the input shaft 4, thereby generating a reaction force.

Further, the structure of the control valve 8 in the brake fluid pressure boosting device 1 of the fourth embodiment is different from that of the other aforementioned embodiments.

While the first and second radial holes 11, 12 of the valve sleeve 9, the passages 16, 17, 20, 21, 57 of the housing 2 in the aforementioned embodiments are omitted in the fourth embodiment. The fourth radial hole 14 of the valve sleeve 9 in the aforementioned embodiments is changed to be positioned at the small-diameter cylinder portion 9b of the valve sleeve 9 in the fourth embodiment.

Further, the first and second annular grooves 25, 26 of the valve spool 10 are omitted in the fourth embodiment. In the fourth embodiment, the valve spool 10 is formed with a third annular groove 60 positioned between the small-diameter spool portion 10a and the large-diameter spool portion 10b. The third annular groove 60 is always connected to the fifth radial hole 15. When the valve spool 10 is inoperative, the third annular groove 60 is shut off from the fourth radial hole 14 and is connected to the third radial hole 13 so that the power chamber 6 is shut off from the accumulator as the fluid pressure source and is connected to the booster reservoir and therefore the power chamber 6 is at the atmospheric pressure. When the valve spool 10 is operative and moves forward, the third annular groove 60 is shut off from the third radial hole 13 and is connected to the fourth radial hole 14 so that the power chamber 6 is shut off from the booster reservoir and is connected to the accumulator as the fluid pressure source whereby the fluid pressure in the accumulator is introduced into the power chamber 6. The fourth radial hole 14 and the third annular groove 60 compose a fluid pressure supply valve. The third radial hole 13 and the third annular groove 60 compose a fluid pressure discharge valve. When the fluid pressure discharge valve is closed, the fluid pressure introduced into the power chamber 6 is supplied to the third annular groove 60 and then acts on the small-diameter spool portion 10a and the large-diameter spool portion 10b. As described above, because of the difference between the pressure receiving areas of the small-diameter spool portion 10a and the large-diameter spool portion 10b, the valve spool 10 is subjected to a rightward force.

Moreover, the space 19 in the valve sleeve 9 is always connected to the chamber 56 through the axial hole 10c and the radial hole 10d formed in the valve spool 10 and the chamber 56 is always connected to the third radial hole 13 through an axial groove 61 formed in the outer surface of the valve sleeve 9.

In the fourth embodiment, the lever 27 is pivotally supported to the lever supporting portion 5a of the power piston 5 by the first supporting pin 28.

The other structure of the brake fluid pressure boosting device 1 and the structure of the master cylinder 33 of the fourth embodiment are the same as those of the aforementioned third embodiment.

In the brake fluid pressure boosting device 1 of the fourth embodiment structured as mentioned above, predetermined fluid pressure controlled by the pressure control valve 59 is introduced into the reaction chamber 58. The predetermined fluid pressure to be introduced into the reaction chamber 58 can be freely set to any desired value by the pressure control valve 59. That is, for instance, the pressure to be introduced into the reaction chamber 58 can be controlled by the pressure control valve according to results of detection of the pedal pressure and the pedaling speed for depressing the brake pedal. Therefore, the reaction to be applied to the input shaft 4 can be freely set to any value. For instance, the characteristics of the brake fluid pressure boosting device 1 including the input-output characteristic and the input-input stroke characteristic can be freely changed, thereby facilitating the setting for the combination with a brake assist system for assisting the braking operation and/or a regenerative coordination brake system.

The other actions and effects of this brake fluid pressure boosting device 1 and the actions and effects of the master cylinder 33 of the fourth embodiment are the same as those of the third embodiment.

Figure 7:
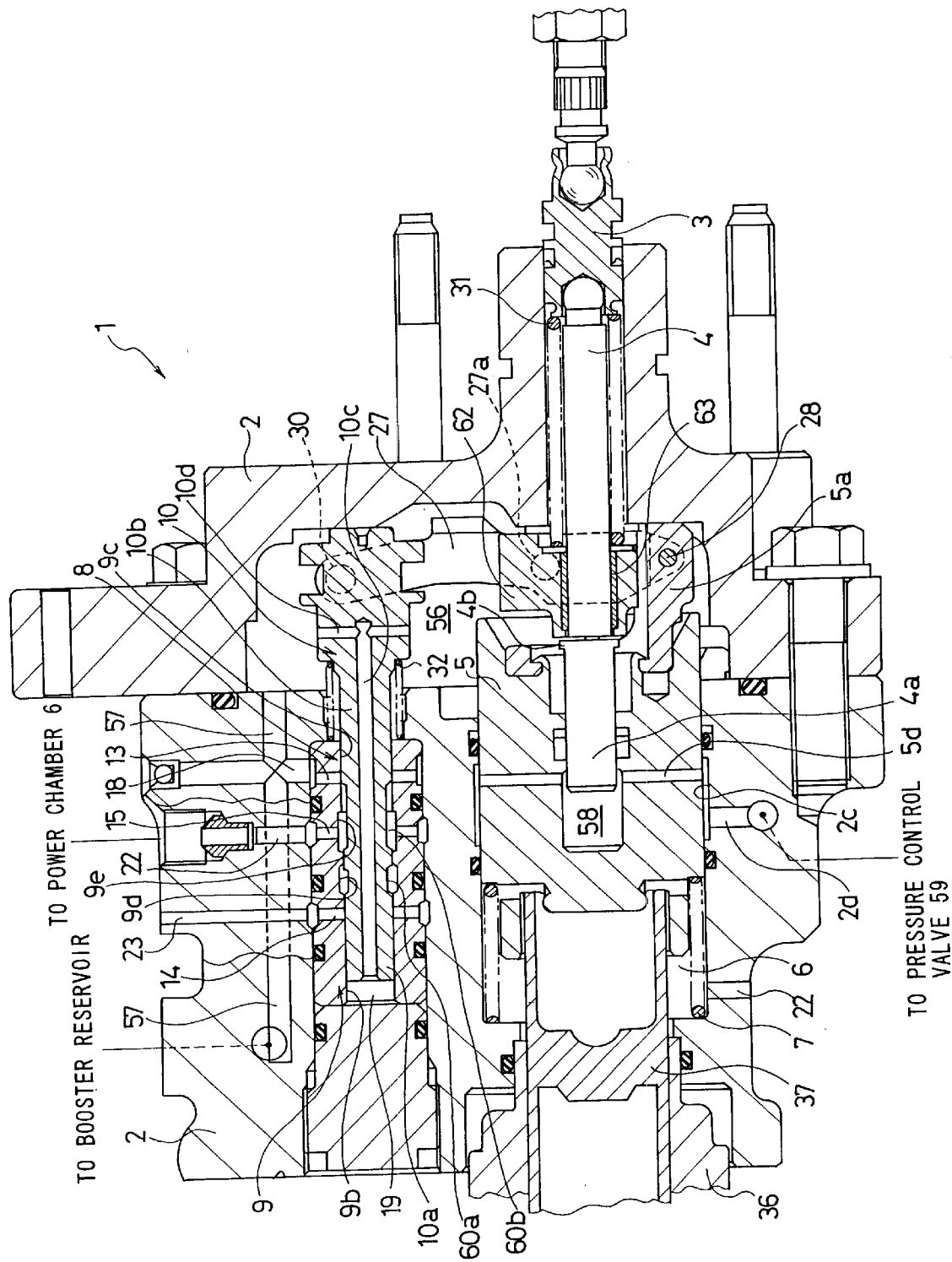
FIG. 7 is a partially sectional view showing a fifth embodiment of the present invention.

FIG. 7 is a partially sectional view similar to FIG. 6 showing the fifth embodiment of the present invention.

While the third annular groove 60 is one groove extending in the axial direction in the fourth embodiment shown in FIG. 6, fourth and fifth annular grooves 60a, 60b are formed to be arranged in the axial direction instead of the third annular groove 60 in a brake fluid pressure boosting device 1 of the fifth embodiment as shown in FIG. 7. In addition, the large-diameter cylinder portion 9c of the valve sleeve 9 is formed with the sixth and seventh annular grooves 9d, 9e. The fourth annular groove 60a always communicates with the sixth annular groove 9d. The communication between the fourth annular groove 60a and the fourth radial hole 14 is blocked when the valve spool 10 is inoperative as shown in FIG. 7 and is allowed when the valve spool 10 is operative. On the other hand, the fifth annular groove 60b always communicates with the seventh annular groove 9e. The fifth annular groove 60b is shut off from the sixth annular groove 9d and communicates with the third radial hole 13 when the valve spool 10 is inoperative as shown and is shut off from the third radial hole 13 and communicates with the sixth annular groove 9d when the valve spool 10 is operative. The seventh annular groove 9e always communicates with the fifth radial hole 15.

While the input stroke characteristic relative to the input is a two-stage characteristic because two return springs i.e. the first and second return springs 31a, 31b are used in the fourth embodiment, one return spring 31 is used in this fifth embodiment, similar to the aforementioned first embodiment.

However, unlike the first embodiment, the return spring 31 of this fifth embodiment is a non-linear spring having such a spring characteristic that the deformed amount is large at the start and, after that, is reduced gradually, thereby providing a spring characteristic similar to the aforementioned two-stage characteristic achieved by the first and second return springs 31a, 31b. The use of this non-linear spring simplifies the structure of this part.

In the fifth embodiment, further, the retainer 62 is provided with a slide lubricating member 63 composed of a bush disposed on a portion sliding relative to the input shaft 4. This slide lubricating member 63 enables the input shaft 4 to be smoothly slidable and minimizes wear of the respective sliding portions of the input shaft 4 and the retainer 62.

The other structure of the brake fluid pressure boosting device 1 and the structure of the master cylinder 33 of the fifth embodiment are the same as those of the aforementioned fourth embodiment.

In the brake fluid pressure boosting device 1 of the fifth embodiment structured as mentioned above, in the inoperative state, the power chamber 6 is connected to the booster reservoir through the passage 22, the fifth radial hole 15, the seventh annular groove 9e, the fifth annular groove 60b, the fifth radial hole 15, the passage 18, and the passage 57 so that the power chamber 6 is held at the atmospheric pressure.

In the operative state of the brake fluid pressure boosting device 1, the input shaft 4 moves forward similarly to the aforementioned embodiments. At this point, the input shaft 4 smoothly moves forward because of the slide lubricating member 63. In addition, the input shaft 4 moves relative to the input to provide the aforementioned two-stage characteristic because of the non-linear characteristic of the return spring 31.

By the forward movement of the input shaft 4, the return spring 31 is deformed to generate a spring force corresponding to the input applied to the input shaft 4 and the spring force is transmitted to the valve spool 10 through the lever 27, thereby moving the valve spool 10 forward. Accordingly, the fifth annular groove 60b is shut off from the third radial hole 13 and allowed to communicate with the sixth annular groove 9d and further the fourth annular groove 60a is allowed to communicate with the fourth radial hole 14. Then, the power chamber 6 is shut off from the booster reservoir and is connected to the accumulator as the fluid pressure source so that the fluid pressure in the accumulator is controlled according to the input of the input shaft 4 by the control valve 8 and is supplied as working fluid pressure to the power chamber 6. After that, the primary piston 37 and the secondary piston 38 of the master cylinder 33 act in the same manner as the aforementioned embodiment.

Since the working fluid pressure which is the fluid pressure of the accumulator controlled by the control valve 8 acts on the stepped portion between the small-diameter spool portion 10a and the large-diameter spool portion 10b of the valve spool 10 in the same manner as the aforementioned embodiment, the working fluid pressure is controlled in such a manner as to balance the working fluid pressure it self and a force corresponding to the input of the input shaft 4 applied to the valve spool 10 through the lever 27. In addition, the hydraulic fluid from the accumulator is first throttled by the fourth radial hole 14 and the fourth annular groove 60a and is then throttled by the sixth annular groove 9d and the fifth annular groove 60b. That is the hydraulic fluid is throttled in two stages. This two-stage throttling of the hydraulic fluid prevents the vibration of the control valve 8 due to pump pulsation and the like.

According to the brake fluid pressure boosting device 1 of the fifth embodiment, the hydraulic fluid is throttled in two stages for controlling the working fluid pressure by the control valve 8, thereby securely preventing the vibration of the control valve 8 due to pump pulsation and the like. Since the retainer 62 is provided with the slide lubricating member 63 on the sliding portion thereof relative to the input shaft 4, the movement of the input shaft 4 can be smooth and the wear of the sliding portions of the input shaft 4 and the retainer 62 can be minimized. Further, the use of one non-linear return spring 31 can provide the aforementioned two-stage characteristic as the stroke characteristic of the input shaft 4, thereby simplifying the structure of the portion where the return spring is mounted.

The other actions and effects of this brake fluid pressure boosting device 1 and the actions and effects of the master cylinder 33 of the fifth embodiment are the same as those of the fourth embodiment.

It should be noted that a linear bearing can be employed as the slide lubricating member 63 disposed on the sliding portion between the retainer 62 and the input shaft 4 in stead of the bush. The linear bearing can exhibit substantially the same action and effect of the slide lubricating member 63.

Figure 8:
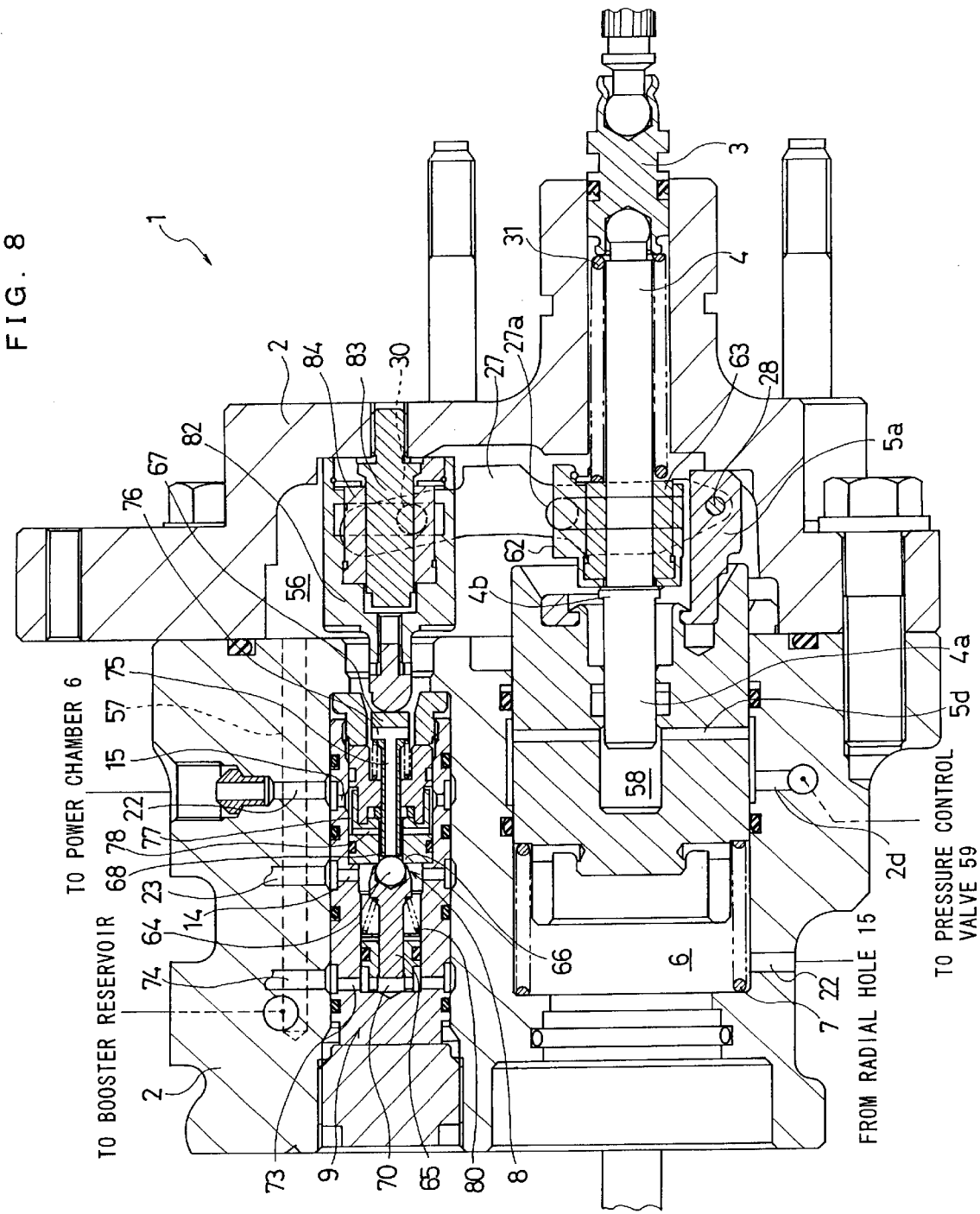
FIG. 8 is a partially sectional view showing a sixth embodiment of the present invention.
Figure 9:
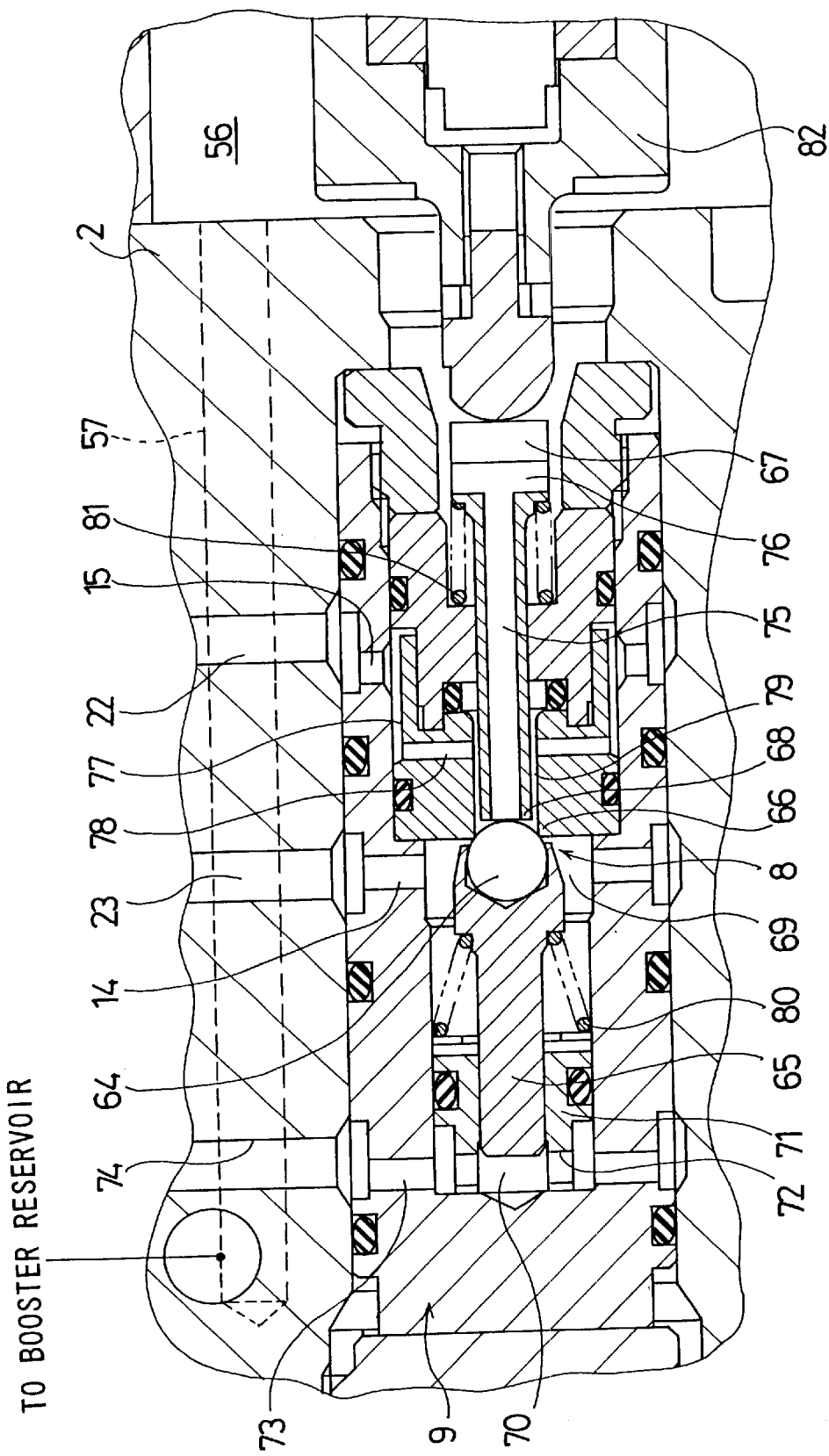
FIG. 9 is a partially enlarged sectional view of a section around a control valve of the sixth embodiment shown in FIG. 8.

FIG. 8 is a partially sectional view similar to FIG. 7 showing the sixth embodiment of the present invention and FIG. 9 is a partially enlarged sectional view of a section around the control valve of the sixth embodiment.

While the control valve 8 is composed of the valve sleeve 9 and the valve spool 10 in the fifth embodiment shown in FIG. 7, the control valve 8 is composed of a valve ball and valve seats on which the valve ball is seated in a brake fluid pressure boosting device 1 of the sixth embodiment. That is, as shown in FIG. 8 and FIG. 9, the control valve 8 is slidably supported by the valve sleeve 9 and comprises a valve body 65 provided at one end thereof with a valve ball 64, a first valve seat 66 fixed to the valve sleeve 9, and a second valve seat 68 disposed on a valve actuating member 67 which can move the valve ball 64 in such a direction as to separate the valve ball 64 from the first valve seat 66.

Formed just at the left of a position where the valve ball 64 is seated on the first valve seat 66 is a chamber 69 which always communicates with the fourth radial hole 14. Therefore, the fluid pressure of the fluid pressure source (accumulator) is always introduced into the chamber 69. The other end of the valve body 65 defines a control chamber 70 which always communicates with the passage 22 through a radial hole 72 formed in a valve supporting member 71 slidably supporting the valve body 65, a radial hole 73 formed in the valve sleeve 9, and a passage 74 formed in the housing 2. Therefore, the fluid pressure in the power chamber 6 is introduced into the control chamber 70.

The valve actuating member 67 has an axial hole 75 opening at an end of the valve actuating member 67 and a radial hole 76 communicating with the axial hole 75. The radial hole 76 always communicates with the chamber 56 held at atmospheric pressure.

When the control valve 8 is inoperative as shown, the valve ball 64 is seated on the first valve seat 66 and is spaced apart from the second valve seat 68. At this point, the power chamber 6 communicates with the booster reservoir through the passage 22, the radial hole 15, an annular space 77 between the first valve seat 66 and the valve sleeve 9, a radial hole 78 formed in the first valve seat 66, an annular space 79 between the first valve seat 66 and the valve actuating member 67, a space between the valve ball 64 and the second valve seat 68, the axial hole 75, the radial hole 76, the chamber 56, and the passage 57 and is shut off from the chamber 69 so that it is set at the atmospheric pressure. When the control valve 8 is operative, the valve actuating member 67 moves forward to bring the second valve seat 68 into contact with the valve ball 64 to close the axial hole 75. Further forward movement of the valve actuating member 67 further moves the valve body 65 forward to space the valve ball 64 apart from the first valve seat 66. At this point, since the axial hole 75 is closed, the power chamber 6 is shut off from the booster reservoir and the annular space 79 is allowed to communicate with the chamber 69. Therefore, the fluid pressure introduced into the chamber 69 is supplied into the power chamber 6 through a space between the valve ball 64 and the first valve seat 66, the space 79, the radial hole 78, the space 77, the radial hole 15, and the passage 22. At the same time, the fluid pressure supplied to the power chamber 6 is introduced into the control chamber 70 through the passage 22, the passage 74, the radial hole 73, and the radial hole 72. The valve body 65 is always biased by the spring force of the valve spring 80 in such a direction as to bring the valve ball 64 into contact with the first valve seat 66. The fluid pressure supplied to the power chamber 6 is controlled by the control valve 8 such that the total of the force acting on the valve body 65 by the fluid pressure of the control chamber 70 and the spring force of the valve spring 80 is balanced against the force applied to the valve actuating member 67. That is, the fluid pressure to be supplied to the power chamber 6 is controlled according to the force applied to the valve actuating member 67.

The valve actuating member 67 is always biased by the spring force of the spring 81 in such a direction as to separate the second valve seat 68 from the valve ball 64 and is pressed by a press member 82 toward the valve ball 64 against the spring force of the spring 81. The press member 82 is slidably supported by a guide shaft 83 projecting from the housing 2 through a slide lubricating member 84 composed of a linear bearing and is connected to the lever 27. Therefore, the input of the input shaft 4 is converted by the lever 27 into a predetermined value to be transmitted to the press member 82 so as to move the press member 82 forward.

While the slide lubricating member 63 disposed between the retainer 62 and the input shaft 4 is composed of a bush in the fifth embodiment, the slide lubricating member 63 is composed of a linear bearing in the sixth embodiment. It should be understood that at least one of the slide lubricating members 63 and 84 may be composed of a bush similarly to the fifth embodiment.

The other structure of the brake fluid pressure boosting device 1 and the structure of the master cylinder 33 of the sixth embodiment are the same as those of the aforementioned fifth embodiment.

In the brake fluid pressure boosting device 1 of the sixth embodiment structured as mentioned above, in the inoperative state, the control valve 8 is in the state shown in FIGS. 8, 9 in which the power chamber 6 is connected to the booster reservoir so that it is held at the atmospheric pressure.

In the operative state of the brake fluid pressure boosting device 1, the input shaft 4 moves forward just like the aforementioned embodiments and the lever 27 is rotated about the first supporting pin 28 by the spring force of the return spring 31 to move the press member 82 forward. At this point, the press member 82 smoothly moves forward because of the slide lubricating member 84. By the forward movement of the press member 82, the valve actuating member 67 moves forward to bring the second valve seat 68 into contact with the valve ball 64 whereby the valve ball 64 is spaced apart from the first valve seat 66. Therefore, the fluid pressure from the fluid pressure source is supplied to the power chamber 6 after controlled by the control valve 8 to correspond to the force of the valve actuating member 67 as mentioned above. That is, the fluid pressure supplied to the power chamber 6 corresponds to the input of the input shaft 4 or the pedal pressure. By the fluid pressure in the power chamber 6, the primary piston 37 of the master cylinder 33 is actuated, thus actuating the brakes in the same manner as the aforementioned embodiments.

As the pressure on the brake pedal is canceled, the input shaft 4 moves backwards so that the press member 82 and the valve actuating member 67 also move backwards. Then, the valve ball 64 is seated on the first valve seat 66 and the second valve seat 68 is spaced apart from the valve ball 64. Therefore, as described above, the power chamber 6 is allowed to communicate with the booster reservoir to discharge the hydraulic fluid from the power chamber 6 to the booster reservoir so that the power chamber 6 becomes at the atmospheric pressure. In this way, the brake fluid pressure boosting device 1 becomes in the inoperative state and the brakes are canceled.

The other actions and effects of this brake fluid pressure boosting device 1 and the actions and effects of the master cylinder 33 of the sixth embodiment are the same as those of the fifth embodiment.

Figure 10:
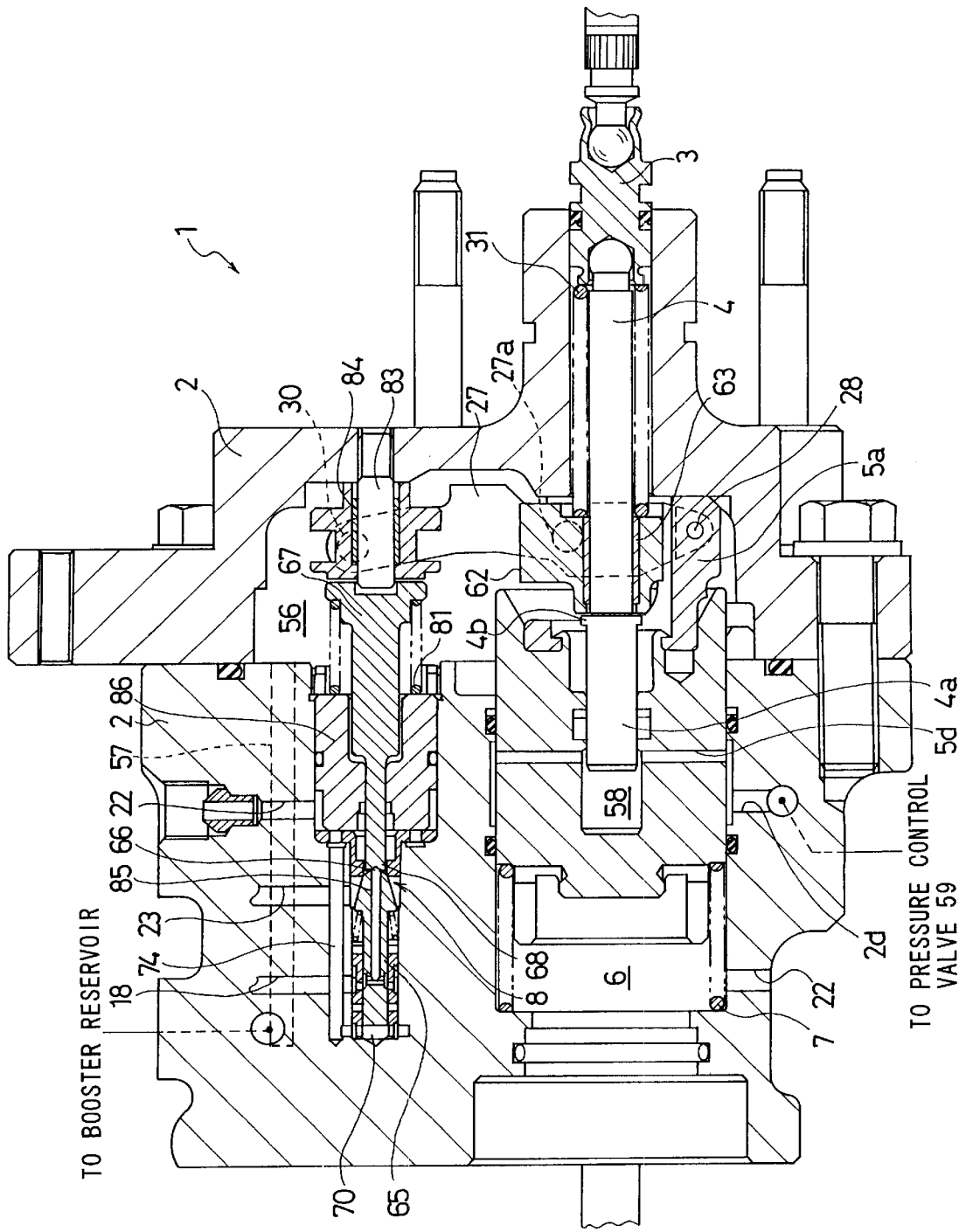
FIG. 10 is a partially sectional view showing a seventh embodiment of the present invention.
Figure 11:
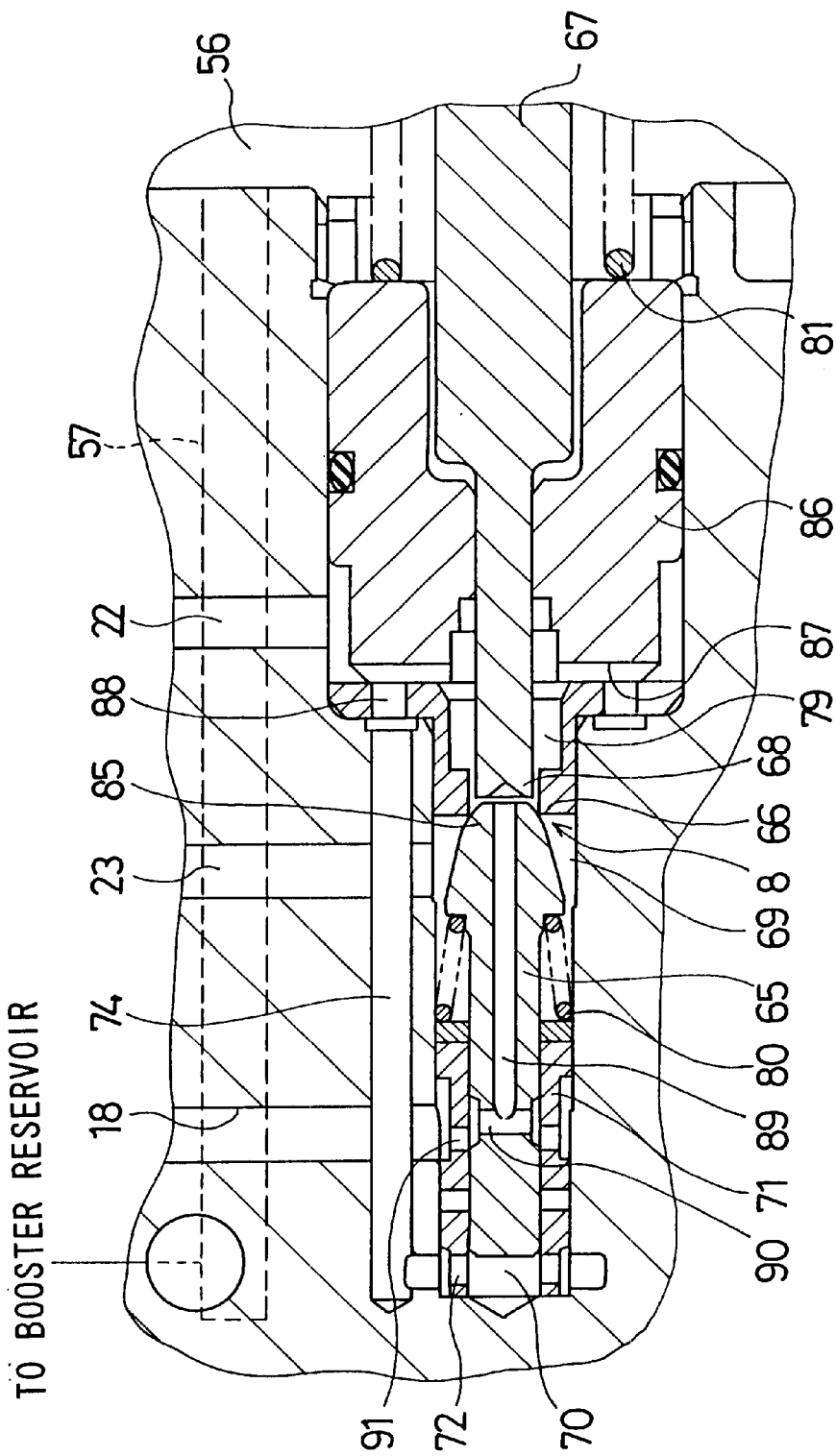
FIG. 11 is a partially enlarged sectional view of a section around a control valve of the seventh embodiment of the present invention.

FIG. 10 is a partially sectional view similar to FIG. 8 showing the seventh embodiment of the present invention and FIG. 11 is a partially enlarged sectional view of a section around the control valve of the seventh embodiment.

While the control valve 8 comprises the valve body 65 having the valve ball 64 in the sixth embodiment shown in FIG. 8 and FIG. 9, the control valve 8 comprises a valve body 65 having a valve cone 85 in a brake fluid pressure boosting device 1 of the seventh embodiment. Further in the seventh embodiment, the valve sleeve 9 of the sixth embodiment is omitted and the valve supporting member 71 slidably supporting the first valve seat 66 and the valve body 65 is supported by the hole of the housing 2.

The annular space 79 between the first valve seat 66 and the valve actuating member 67 always communicates with the passage 22 of the housing 2 through a radial groove 87 formed in a supporting member 86 slidably supporting the valve actuating member 67 fixed to the housing 2. In addition, the annular space 79 always communicates with the control chamber 70 through the radial groove 87, an axial hole 88 formed in the first valve seat 66, the passage 74, and the radial hole 72.

In the seventh embodiment, the valve actuating member 67 is not provided with the axial hole 75 and the radial hole 76 for discharging the hydraulic fluid in the power chamber 6 employed in the sixth embodiment. Instead, the valve body 65 is provided with an axial hole 89 opening at the rear end of the valve body 65 and a radial hole 90 communicating with the axial hole 89. The radial hole 90 always communicates with the passage 18 of the housing 2 through a radial hole 91 formed in the valve supporting member 71 and with the booster reservoir through the passage 18.

When the control valve 8 is inoperative, the valve cone 85 is seated on the first valve seat 66 and is spaced apart from the second valve seat 68. At this point, the power chamber 6 communicates with the booster reservoir through the passage 22, the radial groove 87, the annular space 79, a space between the valve cone 85 and the second valve seat 68, the axial hole 89, the radial hole 90, the radial hole 91, and the passage 18 and is shut off from the chamber 69 so that the power chamber 6 is set at the atmospheric pressure. When the control valve 8 is operative, the valve actuating member 67 moves forward to bring the second valve seat 68 into contact with the valve cone 85 to close the axial hole 89. Further forward movement of the valve actuating member 67 further moves the valve body 65 forward to space the valve cone 85 apart from the first valve seat 66. At this point, since the axial hole 89 is closed, the power chamber 6 is shut off from the booster reservoir and the annular space 79 is allowed to communicate with the chamber 69. Therefore, the fluid pressure introduced into the chamber 69 is supplied into the power chamber 6 through a space between the valve cone 85 and the first valve seat 66, the space 79, the radial hole 87, and the passage 22. At the same time, the fluid pressure supplied to the power chamber 6 is introduced into the control chamber 70 through the radial groove 87, the axial hole 88, the passage 74, and the radial hole 72. The valve body 65 is always biased by the spring force of the valve spring 80 in such a direction as to bring the valve cone 85 into contact with the first valve seat 66. The fluid pressure to be supplied to the power chamber 6 is controlled according to the force applied to the valve actuating member 67 similarly to the sixth embodiment.

Moreover, in the seventh embodiment, the slide lubricating members 63, 84 are composed of bushes similar to the bushes of the fifth embodiment. It should be understood that at least one of the slide lubricating members 63 and 84 of the seventh embodiment may be composed of a linear bearing.

The actions and effects of this brake fluid pressure boosting device 1 are substantially the same as those of the sixth embodiment but using the valve cone 85 instead of the valve ball 64 of the sixth embodiment and providing the fluid discharge passage in the valve body 65 which is formed in the valve actuating member 67 in the sixth embodiment.

Figure 12:
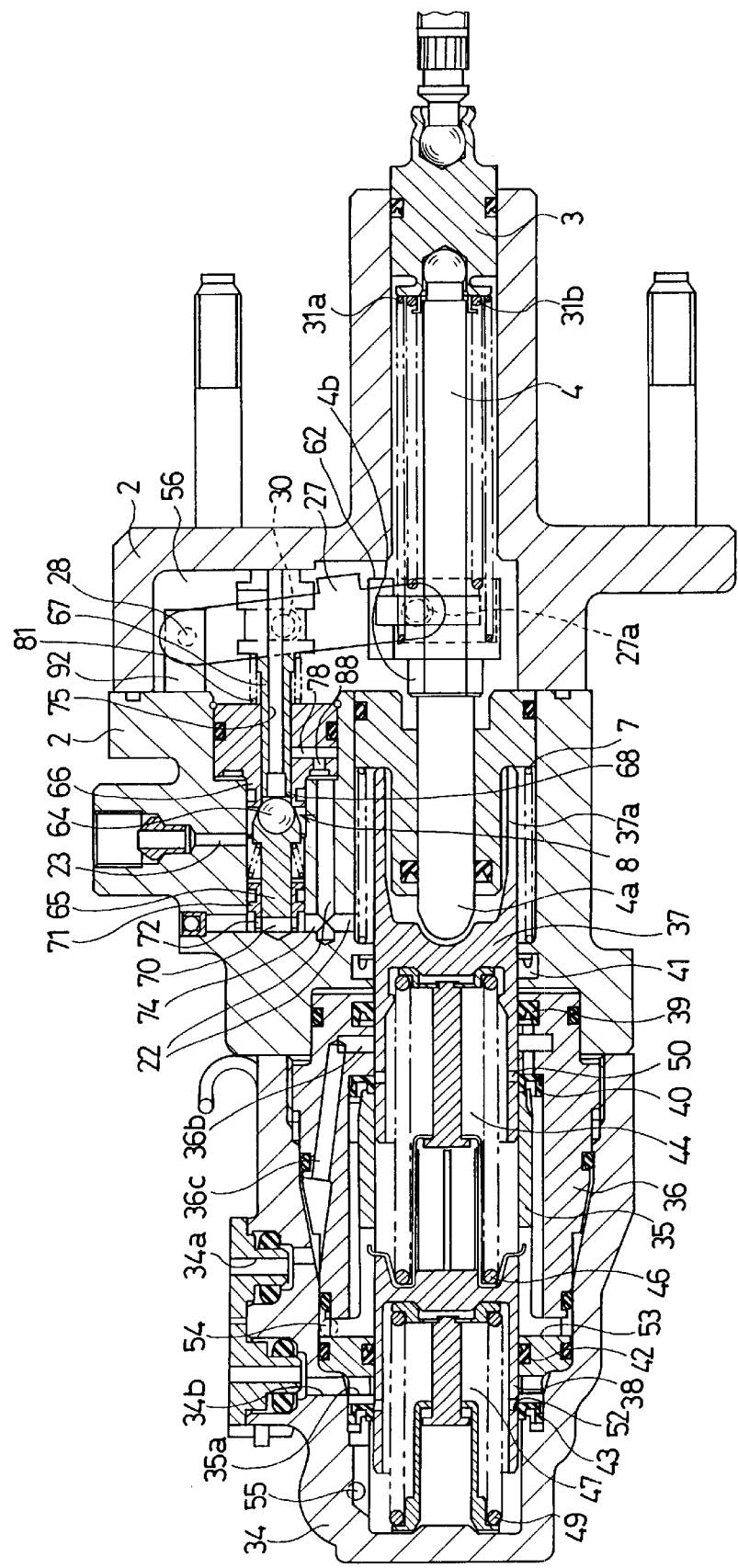
FIG. 12 is a sectional view showing an eighth embodiment of the present invention.

FIG. 12 is a partially sectional view similar to FIG. 1 showing the eighth embodiment of the present invention.

Unlike the aforementioned sixth embodiment shown in FIG. 8 and FIG. 9, the valve actuating member 67 is slidably supported in the first valve seat 66 and is directly connected to the lever 27 without the press member 82, the guide shaft 83, and the slide lubricating member 84 of the sixth embodiment in the brake fluid pressure boosting device 1 of the eighth embodiment as shown in FIG. 12. The axial hole 75 formed in the valve actuating member 67 directly communicates with the chamber 56 without the radial hole 76.

In the eighth embodiment, the valve sleeve 9 is not provided just like the seventh embodiment and the slide lubricating member 63 is also not provided.

While the lever 27 is pivotally supported by the first supporting pin 28 to the power piston 5 i.e. the pivot point (the first supporting pin 28) of the lever 27 is positioned at the input shaft 4 side in the aforementioned embodiments, the lever 27 is pivotally supported by the first supporting pin 28 to a lever supporting member 92 fixed to the housing 2 at the control valve 8 side i.e. the pivot point (the first supporting pin 28) of the lever 27 is positioned at the control valve 8 side.

In this manner, since the pivot point of the lever 27 is positioned at the control valve 8 side, the travel of the valve actuating member 67 is decreased relative to the travel to the input shaft 4 by a lever ratio of the lever 27 while the force to be applied to the valve actuating member 67 is increased relative to the input of the input shaft 4 by the lever ratio. In case of the valve ball 64, significantly large force of the valve actuating member 67 is required to start the actuation of the valve ball 64 because the idle travel is smaller than that of the spool valve used in the first embodiment through the fifth embodiment and the force should be exerted against the spring force of the valve spring 80. Therefore, the design that the pivot point of the lever 27 is positioned at the control valve side is quite suitable for the case using the valve ball 64. The same is true for the case using the valve cone 85 of the seventh embodiment.

The other structure, actions and effects of this brake fluid pressure boosting device 1 and the structure, actions and effects of the master cylinder 33 of the eighth embodiment are substantially the same as those of the sixth embodiment.

Figure 13:
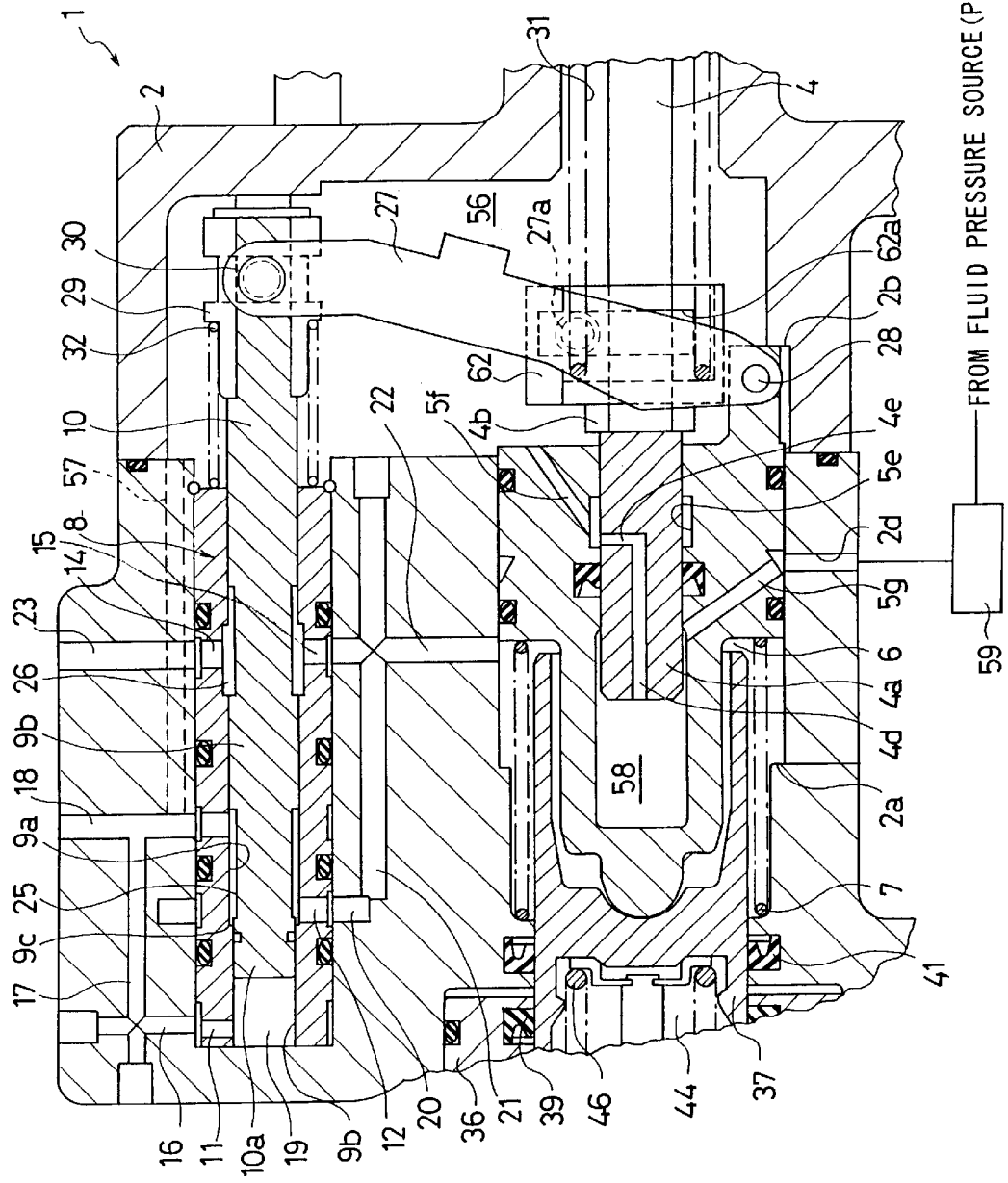
FIG. 13 is a partially sectional view showing a ninth embodiment of the present invention.

FIG. 13 is a partially sectional view similar to FIG. 5 showing the ninth embodiment of the present invention.

While the control valve 8 is of a normally closed type in any one of the aforementioned embodiments, the control valve 8 is of a normally open type in a brake fluid pressure boosting device 1 of the ninth embodiment. Unlike the fourth and fifth radial holes 14, 15 of the valve sleeve 9 in the aforementioned third embodiment shown in FIG. 5, the fourth and fifth radial holes 14, 15 are formed at the same position in the longitudinal direction of the valve sleeve 9 as shown in FIG. 13 in this ninth embodiment. The second annular groove 26 is always connected not only to the fifth radial hole 15 but also to the fourth radial hole 14. Further, in this ninth embodiment, the accumulator as the fluid pressure source is not employed, but only a pump not shown is employed. Therefore, when the control valve 8 is inoperative, the power chamber 6 is connected not only to the booster reservoir but also to the pump. That is, the control valve 8 is of a normal open type. Further, the third radial hole 13 of the valve sleeve 9 and the first annular groove 25 are connected to each other in the inoperative state with relatively large passage area as compared to that of the third embodiment.

When the input shaft 4 is inoperative, the reaction chamber 58 is connected to the chamber 56 through an axial hole 4d and a radial hole 4e formed in the front end portion 4a of the input shaft 4 and an annular groove 5e and an inclined hole 5f formed in the power piston 5. When the input shaft 4 moves forward, the radial hole 4e and the annular groove 5e are shut off so that the reaction chamber 58 is shut off from the chamber 56. Furthermore, similarly to the embodiment shown in FIG. 6, the reaction chamber 58 is connected to the pressure control valve 59 through an inclined hole 5g formed in the power piston 5 and the passage 2d of the housing 2. Thus, introduced into the reaction chamber 58 is pressure controlled by the pressure control valve 59.

In the ninth embodiment, similarly to the first embodiment, one return spring 31 is compressed between the input piston 3 and the retainer 62.

The other structure of the brake fluid pressure boosting device 1 and the structure of the master cylinder 33 of the ninth embodiment are the same as those of the third embodiment.

In the brake fluid pressure boosting device 1 of the ninth embodiment structured as mentioned above, as the pump is driven in the inoperative state of the brakes, the pumped fluid from the booster reservoir cycles or returns to the booster reservoir through the passage 23, the fourth radial hole 14, the second annular groove 26, the passage 22, the passage 21, the passage 20, the second radial hole 12, the first annular groove 25, the third radial hole 13, and the passage 18. At this point, since the first annular groove 25 and the third radial passage 13 are connected to each other with a large passage area, the cycling pumped fluid is not throttled at all so as to develop no fluid pressure.

As the input shaft 4 moves forward in the operative state of the brakes, the lever 27 rotates in the counterclockwise direction just like the aforementioned embodiments so as to move the valve spool 10 forward. Then, the passage area between the annular groove 25 and the third radial passage 13 is gradually reduced whereby the cycling pumped fluid is throttled so as to develop fluid pressure in the first annular groove 25. As the fluid pressure is also introduced into the power chamber 6 so as to move the primary piston 37 so that the master cylinder 33 develops master cylinder pressure, thereby actuating the brakes of two circuits, similarly to the aforementioned third embodiment. At this point, the fluid pressure in the first annular groove 25 acts on the valve spool 10 in the same manner as the third embodiment. Because of the difference between the pressure receiving areas, the valve spool 10 is subjected to rightward force by the fluid pressure. In the same manner as the third embodiment, the fluid pressure of the power chamber 6 is controlled in such a manner that the spring force of the return spring 31 corresponding to the input, the force produced by the fluid pressure of the first annular groove 25, and the spring force of the spool return spring 32 balance whereby the fluid pressure in the power chamber 6 corresponds to the input.

Since one return spring 31 is employed, the input-input stroke characteristic in the ninth embodiment is indicated by one straight line with a predetermined inclination, just like the aforementioned first embodiment.

By further forward movement of the input shaft 4, the radial hole 4e and the annular groove 5e are shut off so that the reaction chamber 58 is shut off from the chamber 56 i.e. from the booster reservoir and the fluid pressure controlled by the pressure control valve is introduced into the reaction chamber 58. The fluid pressure in the reaction chamber 58 acts on the input shaft 4 so that reaction force is exerted to the input shaft 4 and transmitted to the driver.

As the brake pedal is released, the fluid pressure controlled by the pressure control valve is not introduced into the reaction chamber 58 any more and the input shaft 4 and the valve spool 10 move backwards so as to gradually increase the passage area between the first annular groove 25 and the third radial passage 13 whereby the cycling pumped fluid is not throttled any more and the fluid pressure in the first annular groove 25 thus dies, in the same manner as the aforementioned embodiments. Therefore, the fluid pressure introduced into the power chamber 6 is discharged to cancel the output of the brake fluid pressure boosting device 1 so that the pistons 37, 38 of the master cylinder 33 are returned to their inoperative positions, thereby canceling the brakes.

By the backward movement of the input shaft 4, the communication between the radial hole 4e and the annular groove 5e is allowed again so that the pressurized fluid introduced into the reaction chamber 58 is introduced into the chamber 56 through the axial hole 4d, the radial hole 4e, the annular groove 5e, and the inclined hole 5f and is further discharged to the booster reservoir through the passage 57 and the passage 18.

The other actions and effects of this brake fluid pressure boosting device 1 and the actions and effects of the master cylinder 33 of the ninth embodiment are the same as those of the third embodiment.

Figure 14:
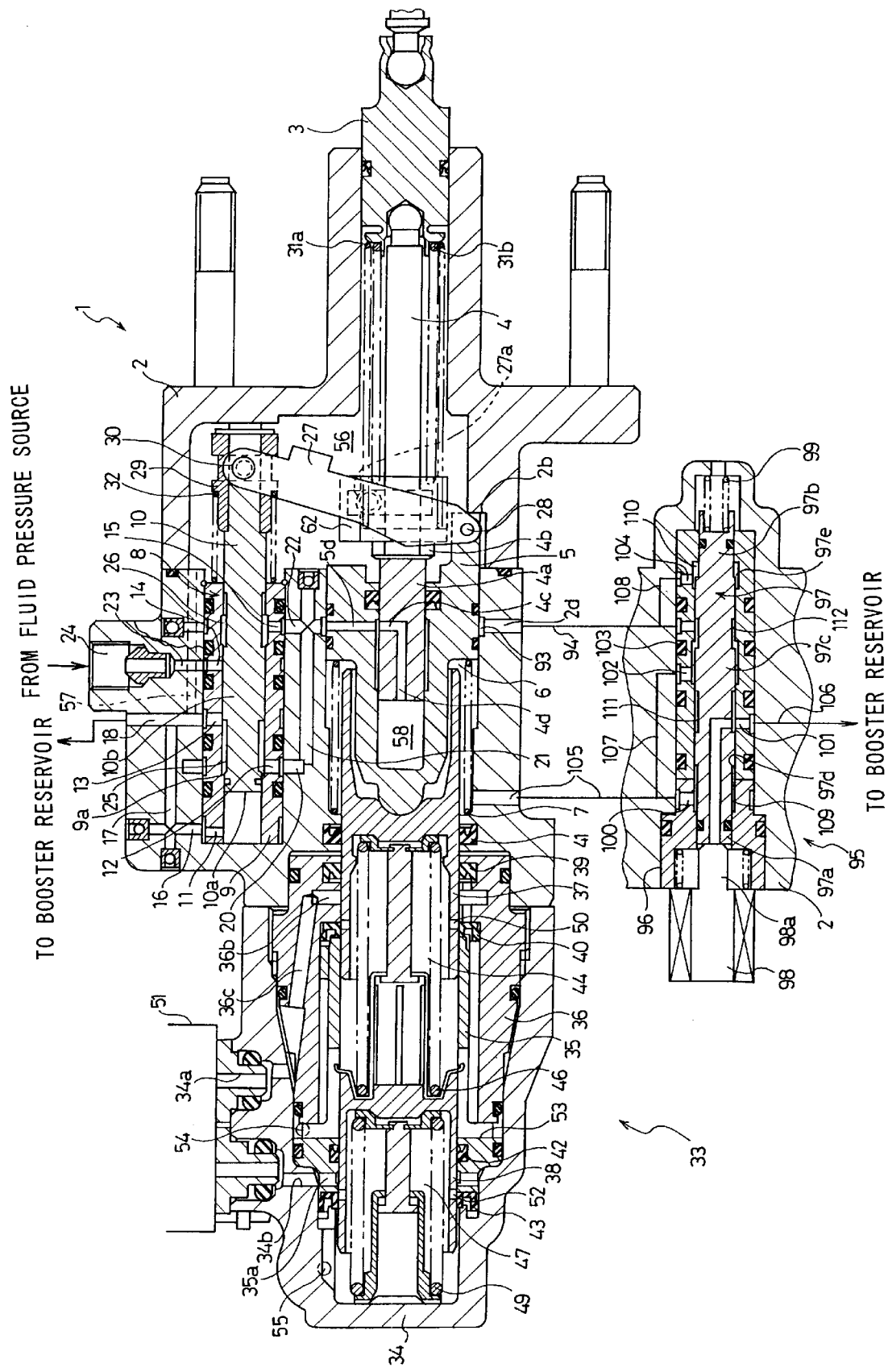
FIG. 14 is a partially sectional view showing a tenth embodiment of the present invention.
Figure 15:
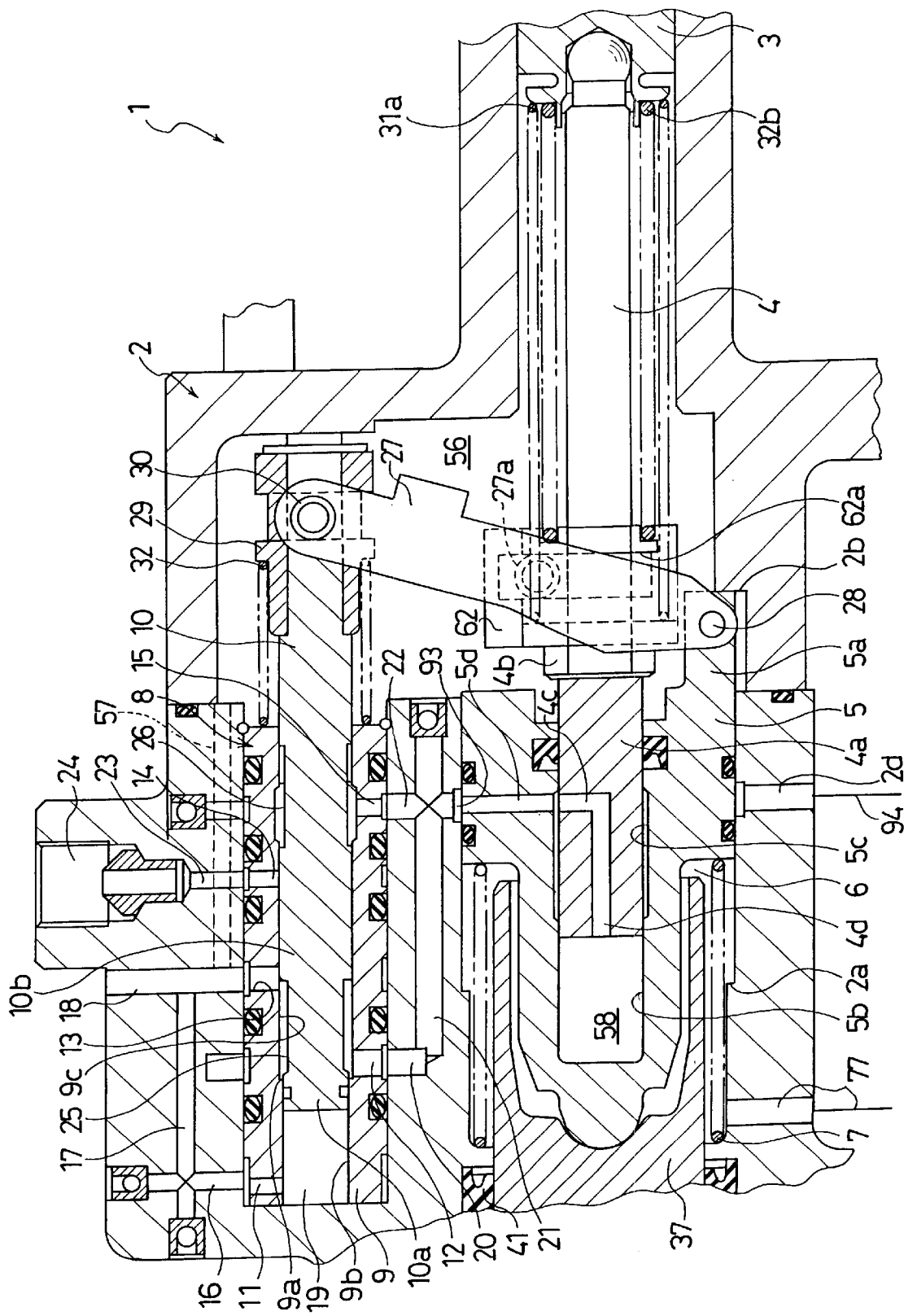
FIG. 15 is a partially enlarged sectional view showing a section around a control valve and a lever of the brake fluid pressure boosting device shown in FIG. 14.

FIG. 14 is a sectional view similar to FIG. 1 showing the tenth embodiment of the present invention and FIG. 15 is a partially enlarged sectional view similar to FIG. 5 showing a section around the control valve and the lever of the brake fluid pressure boosting device shown in FIG. 14.

While the power chamber 6 directly communicates with the passage 22 in the aforementioned third embodiment shown in FIG. 5, the power chamber 6 communicates with the passage 22 through a passage 105 formed in the housing 2, an electromagnetic pressure control valve 95, a passage 94 formed in the housing 2, a radial hole 2d formed in the housing 2, and an annular groove 93 in the tenth embodiment.

The electromagnetic pressure control valve 95 comprises a valve sleeve 96 fluid-tightly fitted in the housing 2, a valve spool 97 slidably fitted in the valve sleeve 96, an electromagnetic solenoid 98 for controlling the operation of the valve spool 97, and the return spring 99 always biasing the valve spool 97 in the inoperative direction.

The valve sleeve 96 is provided with, from the front side, sixth through tenth redial holes 100, 101, 102, 103, 104 formed therein.

The sixth radial hole 100 is always connected to the power chamber 6 through the passage 105 of the housing 2. The seventh radial hole 101 is always connected to the booster reservoir through a passage 106 of the housing 2. The eighth radial hole 102 is always connected to the power chamber 6 through a passage 107 and the passage 105 of the housing 2. Further, the ninth radial hole 103 is always connected to the annular groove 93 through the passage 94 and the tenth radial hole 104 is always connected to the annular groove 93 through a passage 108 and the passage 94 of the housing 2.

The valve spool 97 is formed with stepped portions in its outer surface so that it is composed of small-diameter spool portions 97a, 97b at both ends and a large-diameter spool portion 97c at the middle. In this case, the small-diameter spool portions 97a, 97b are fluid-tightly and slidably fitted in small-diameter cylinder portions of the valve sleeve 96 and the large-diameter spool portion 97c is slidably fitted in a large-diameter cylinder portion of the valve sleeve 96.

Formed between the inner surface of the valve sleeve 96 and the outer surface of the valve spool 97 are an annular chamber 109 which faces a step 97d between the small-diameter spool portion 97a and the large-diameter spool portion 97c of the valve spool 97 and is always connected to the sixth radial hole 100 and an annular chamber 110 which faces a step 97e between the small-diameter spool portion 97b and the large-diameter spool portion 97c of the valve spool 97 and is always connected to the tenth radial hole 104.

Formed in the large-diameter spool portion 97c are third and fourth annular grooves 111, 112. The third annular groove 111 is always connected to the seventh radial hole 101. The third annular groove 111 is shut off from the eighth radial hole 102 when the valve spool 97 is inoperative and is connected to the eighth hole 102 when the valve spool 97 is operative. The fourth annular groove 112 is always connected to the ninth radial hole 103. The fourth annular groove 112 is connected to the eighth radial hole 102 when the valve spool 97 is inoperative and is shut off from the eighth radial hole 102 when the valve spool 97 is operative.

Therefore, the electromagnetic pressure control valve 95 in the inoperative state allows the power chamber 6 to communicate with the reaction chamber 58 through the passage 105, the passage 107, the eighth radial hole 102, the fourth annular groove 112, the ninth radial hole 103, the passage 94, the passage 2d, the annular groove 93, the radial hole 5d, the annular groove 5c, the radial hole 4c, and the axial hole 4d, further to communicate with the fifth radial hole 15 through the annular groove 93 and the passage 22, and further to communicate with the second radial hole 12 through the passage 22, the passage 21, and the passage 20. The electromagnetic pressure control valve 95 in the operative state allows the power chamber 6 to communicate with the booster reservoir through the passage 105, the passage 107, the eighth radial hole 102, the third annular groove 111, and the seventh radial hole 101.

While the reaction chamber 58 disposed between the power piston 5 and the front end portion 4a of the input shaft 4 always communicates with the power chamber 6 through the radial hole 5d formed in the power piston 5 in the third embodiment shown in FIG. 5, the reaction chamber 58 always communicates with the passage 22 through the axial hole 4d and the radial hole 4c of the input shaft 4, the annular groove 5c and the radial hole 5d of the power piston 5, and the annular groove 93 of the housing 2 in the brake fluid pressure boosting device 1 of the tenth embodiment. Therefore, in the tenth embodiment, the fluid pressure controlled by the control valve 8 is directly introduced into the reaction chamber 58 without passing through the power chamber 6.

The other structure of the brake fluid pressure boosting device 1 and the structure of the master cylinder 33 of the tenth embodiment are the same as those of the third embodiment shown in FIG. 5.

Hereinafter, the action of the brake fluid pressure boosting device 1 of the tenth embodiment structured as mentioned above will be described. While fluid pressure controlled by the control valve 8 is introduced into the reaction chamber 58 through the power chamber 6 so that the fluid pressure introduced into the reaction chamber 58 acts as reaction force on the input shaft 4 in the brake fluid pressure boosting device 1 of the third embodiment shown in FIG. 5, fluid pressure controlled by the control valve 8 is introduced directly into the reaction chamber 58 and the fluid pressure introduced into the reaction chamber 58 acts as reaction force on the input shaft 4 in the brake fluid pressure boosting device 1 of the tenth embodiment.

While fluid pressure controlled by the control valve 8 is introduced directly into the power chamber 6 and the fluid pressure introduced into the power chamber 6 acts on the primary piston 37 in the brake fluid pressure boosting device 1 of the third embodiment, fluid pressure controlled by the control valve 8 is introduced directly into the power chamber 6 and the fluid pressure introduced into the power chamber 6 acts on the primary piston 37 similarly to the third embodiment, and further the fluid pressure in the power chamber 6 is controlled by the electromagnetic pressure control valve 95 in the brake fluid pressure boosting device 1 of the tenth embodiment.

The action of the electromagnetic pressure control valve 95 will now be described in detail.

When the brake fluid pressure boosting device 1 is inoperative, the control valve 8 and the electromagnetic pressure control valve 95 are both in the inoperative positions as shown where the power chamber 6 is connected to the second and the fifth radial holes 12, 15 as described above. Therefore, the power chamber 6 is shut off from the accumulator and communicates with the booster reservoir so that the fluid pressure of the accumulator is not supplied into the power chamber 6.

During the normal braking by depression of the brake pedal, the fluid pressure from the accumulator is controlled by the control valve 8 according to the pedal pressure on the brake pedal and the controlled fluid pressure is supplied directly to the reaction chamber 58. At this point, since the electromagnetic pressure control valve 95 is still at its inoperative position, the fluid pressure controlled by the control valve 8 is also supplied to the power chamber 6 through the electromagnetic pressure control valve 95 at the same time.

Since the fluid pressure supplied to the power chamber 6 acts on the rear end of the primary piston 37, the brakes of two circuits are actuated similarly to the third embodiment. The fluid pressure in the power chamber 6 also acts on the steps 97*d*, 97*e* of the valve spool 97 through the sixth and tenth radial holes 100, 104 of the electromagnetic pressure control valve 95.

However, since the pressure receiving areas of the steps 97*d*, 97*e* are equal to each other and the fluid pressures to act on the steps 97*d*, 97*e* are also equal to each other, the valve spool 97 is not actuated.

As the brake pedal is released to cancel the braking action, pressurized fluid in the power chamber 6 flows to the passage 22 through the electromagnetic pressure control valve 95, the passage 2*d*, and the annular groove 93 because the electromagnetic pressure control valve 95 is in the inoperative state and is then discharged to the booster reservoir, decreasing the fluid pressure in the power chamber 6, similarly to the third embodiment shown in FIG. 5. At the same time, pressurized fluid in the reaction chamber 58 is also discharged to the booster reservoir through the fluid discharge valve, thereby quickly canceling the brakes of both circuits, similarly to the third embodiment.

By the way, in the brake fluid pressure boosting device 1 of the tenth embodiment, the fluid pressure in the power chamber 6 can be controlled regardless of the input by the operation of the electromagnetic pressure control valve 95 during the normal braking. That is, as an electromagnetic solenoid 98 is excited during the normal braking, a movable plunger 98*a* of the electromagnetic solenoid 98 moves to press the valve spool 97 whereby the valve spool 97 moves to the right. Then, the fourth annular groove 112 blocks the communication between the eighth radial hole 102 and the ninth radial hole 103 and the third annular groove 111 allows the communication between the eighth radial hole 102 and the seventh radial hole 101. Therefore, the power chamber 6 is shut off from the reaction chamber 58 and is allowed to communicate with the booster reservoir, thereby decreasing the fluid pressure in the power chamber 6. At this point, the fluid pressure in the reaction chamber 58 is not decreased and is held at the same value as that in its operative state. Accordingly, the force pressing the primary piston 37 by the fluid pressure of the power chamber 6 is also decreased, thus decreasing the master cylinder pressure generated by the master cylinder 33.

At this point, further, the fluid pressure of the power chamber 6 is exerted rightward to the step 97*d* of the valve spool 97 and the fluid pressure of the reaction chamber 58 is exerted leftward to the step 97*e* of the valve spool 97 wherein the pressure receiving areas of the steps 97*d*, 97*e* are equal to each other. In this case, since the fluid pressure of the power chamber 6 was decreased, the fluid pressure of the reaction chamber 58 is higher than the fluid pressure of the power chamber 6. The difference between the fluid pressures develops thrust pressing the valve spool 97 to the left against electromagnetic force of the electromagnetic solenoid 98. The fluid pressure of the power chamber 6 is controlled such that the thrust and the electromagnetic force of the electromagnetic solenoid 98 balance. Therefore, by controlling the current to be supplied to the electromagnetic solenoid 98, the fluid pressure of the power chamber 6 can be controlled, that is, the master cylinder pressure can be controlled according to the supplied current.

Because of this pressure control, the power piston 5 is structured not to move so that the fluid pressure of the reaction chamber 58 is not changed even when the fluid pressure of the power chamber 6 is changed. Therefore, the reaction force to the input 4 is not changed and thus the travel of the input shaft 4 is also not changed.

In this manner, according to the brake fluid pressure boosting device 1 of the tenth embodiment, in the normal state of the fluid pressure source, the primary piston 37 of the master cylinder 33 is operated directly by the working fluid pressure controlled to correspond to the input of the input piston 3 by the control valve 8. In addition, the valve spool 10 is controlled such that the spring force of the return spring 31 or the input exerted on the input piston 3, the spring force of the spool return spring 32, and the biasing force of the valve spool 10 by the fluid pressure of the first annular groove 25 balance in the state that the position of the pivot of the lever 27 is fixed, thereby exhibiting the function as a stroke simulator. Therefore, the input side and the output side of the brake fluid pressure boosting device 1 can be separately operated. Moreover, the stroke characteristics of the input side can be changed by changing the setting of the difference between the pressure receiving areas of the small-diameter spool portion 10*a* and the large-diameter spool portion 10*b* of the valve spool 10 and the setting of the spring force of the spool return spring 32, without affecting the output side of the brake fluid pressure boosting device 1.

By controlling the current to be supplied to the electromagnetic pressure control valve 95, the fluid pressure of the power chamber 6 in the operative state or the master cylinder pressure can be controlled to be decreased according to the supplied current. This means that the master cylinder pressure can be freely controlled by suitably setting the supplied current.

Since the return spring 31, the spool return spring 32, and the small-diameter spool portion 10*a* and the large-diameter spool portion 10*b* of the valve spool 10 are built in the brake fluid pressure boosting device 1, not attaching a separately prepared stroke simulator to the brake fluid pressure boosting device 1, the fluid pressure boosting device 1 is allowed to be compact.

Since the brake fluid pressure boosting device 1 of the invention is made by adding the function of a stroke simulator to a conventional lever-type brake fluid pressure boosting device, there is no necessity to provide a specific stroke simulator and only simple modification on the conventional lever-type brake fluid pressure boosting device is required, thereby simplifying the conventional lever-type brake fluid pressure boosting device and also decreasing the cost.

The other actions and effects of the brake fluid pressure boosting device 1 and the actions and effects of the master cylinder 33 of the tenth embodiment are the same as those of the third embodiment shown in FIG. 5.

Figure 16:
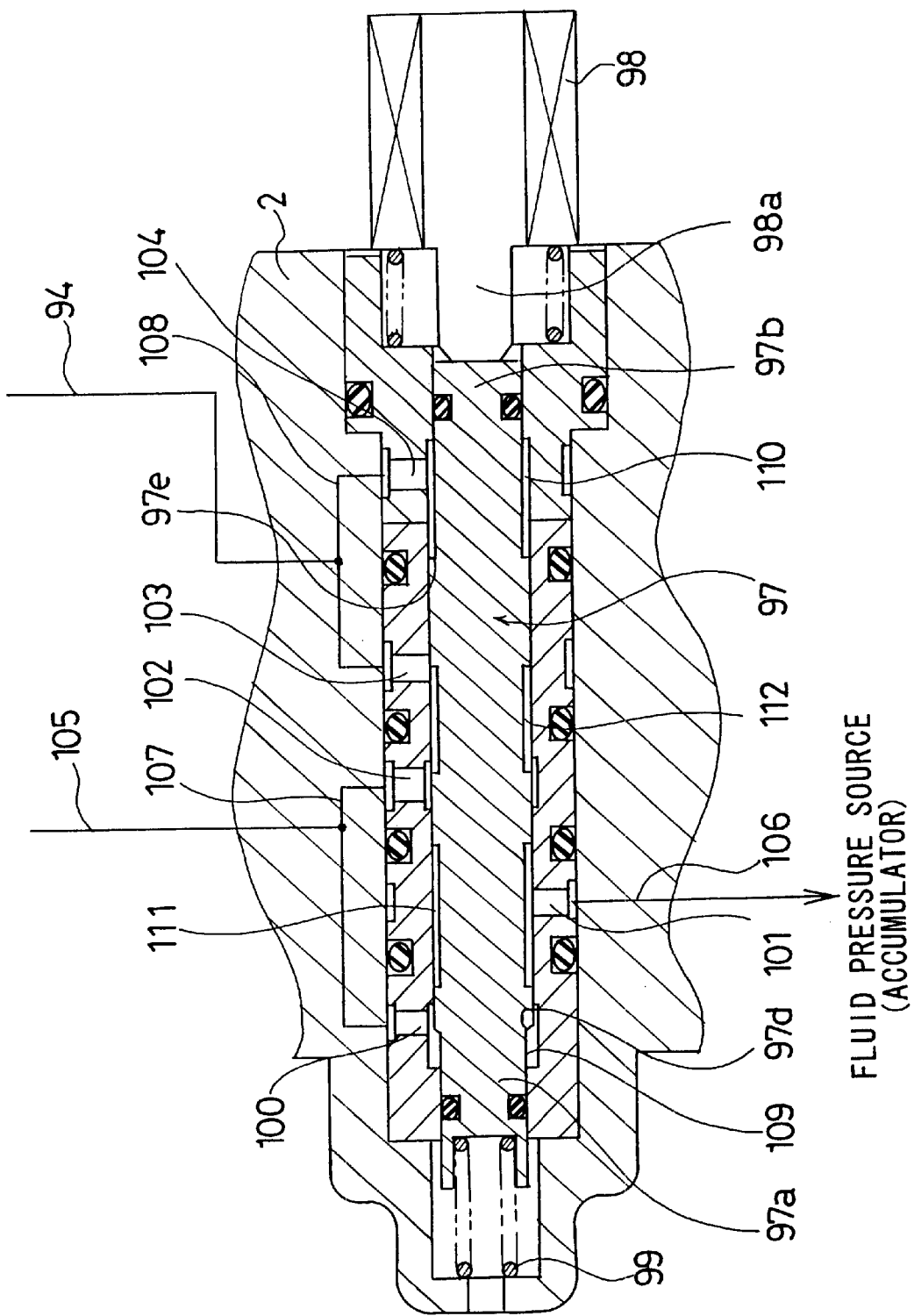
FIG. 16 is a partially sectional view showing an eleventh embodiment of the present invention.

FIG. 16 is a sectional view of an electromagnetic pressure control valve used in the eleventh embodiment of the present invention.

The electromagnetic pressure control valve 95 of the aforementioned tenth embodiment, in the inoperative state, connects the power chamber 6 to the reaction chamber 58 and, in the operative state, shuts off the power chamber 6 from the reaction chamber 58 and connects the power chamber 6 to the booster reservoir to decrease the master cylinder pressure for controlling the master cylinder pressure during the operation of the brake fluid pressure boosting device. However, the electromagnetic pressure control valve 95 of the eleventh embodiment, in the inoperative state, connects the power chamber 6 to the reaction chamber 58 and, in the operative state, shuts off the power chamber 6 from the reaction chamber 58 and connects the power chamber 6 to the accumulator as a fluid pressure source to increase the master cylinder pressure for controlling the master cylinder pressure during the operation of the brake fluid pressure boosting device 1.

That is, as shown in FIG. 16, in the electromagnetic pressure control valve 95 of the eleventh embodiment, the seventh radial hole 101 is always connected to the accumulator as a fluid pressure source through the passage 106 of the housing 2.

Further, the third annular groove 111 of the valve spool 97 is always connected to the seventh radial hole 101. The annular groove 111 is shut off from the sixth radial hole 100 when the valve spool 97 is inoperative and is connected to the sixth radial hole 100 when the valve spool 97 is operative. The fourth annular groove 112 is always connected to the eighth radial hole 102. The fourth annular groove 112 is connected to the ninth radial hole 103 when the valve spool 97 is inoperative and is shut off from the ninth radial hole 103 when the valve spool 97 is operative.

Therefore, the electromagnetic pressure control valve 95 in the inoperative state allows the power chamber 6 to communicate with the reaction chamber 58 and to communicate with the second and fifth radial holes 12, 15 in the same manner as the aforementioned tenth embodiment. On the other hand, the electromagnetic pressure control valve 95 in the operative state allows the power chamber 6 to communicate with the accumulator through the passage 105, the passage 107, the sixth radial hole 100, the third annular groove 111, the seventh radial hole 101.

The other structure of the brake fluid pressure boosting device 1 and the structure of the master cylinder 33 of the eleventh embodiment are the same as those of the tenth embodiment.

In the brake fluid pressure boosting device 1 of the eleventh embodiment structured as mentioned above, as the electromagnetic solenoid 98 is excited during the normal braking, the valve spool 97 moves to the left because of the electromagnetic force of the electromagnetic solenoid 98. Then, the fourth annular groove 112 blocks the communication between the eighth radial hole 102 and the ninth radial hole 103 and the third annular groove 111 allows the communication between the seventh radial hole 101 and the sixth radial hole 100. Therefore, the power chamber 6 is shut off from the reaction chamber 58 and is allowed to communicate with the accumulator, thereby increasing the fluid pressure in the power chamber 6 because of the fluid pressure of the accumulator. At this point, the fluid pressure in the reaction chamber 58 is not increased and is held at the same value as that in its operative state. Accordingly, the force pressing the primary piston 37 by the fluid pressure of the power chamber 6 is also increased, thus increasing the master cylinder pressure generated by the master cylinder 33.

At this point, further, the fluid pressure of the power chamber 6 is exerted rightward to the step 97*d* of the valve spool 97 and the fluid pressure of the reaction chamber 58 is exerted leftward to the step 97*e* of the valve spool 97 wherein the pressure receiving areas of the steps 97*d*, 97*e* are equal to each other. In this case, since the fluid pressure of the power chamber 6 was increased, the fluid pressure of the power chamber 6 is higher than the fluid pressure of the reaction chamber 58. The difference between the fluid pressures develops thrust pressing the valve spool 97 to the right against electromagnetic force. The fluid pressure of the power chamber 6 is controlled such that the thrust and the electromagnetic force of the electromagnetic solenoid 98 balance. Therefore, by controlling the current to be supplied to the electromagnetic solenoid 98, the fluid pressure of the power chamber 6 can be controlled, that is, the master cylinder pressure can be controlled according to the supplied current.

Because of this pressure control, the power piston 5 is structured not to move so that the fluid pressure of the reaction chamber 58 is not changed even when the fluid pressure of the power chamber 6 is changed. Therefore, the reaction force to the input shaft 4 is not changed and thus the travel of the input shaft 4 is also not changed.

When no pressure is exerted on the brake pedal i.e. the brakes are inoperative, as the electromagnetic pressure control valve 95 is actuated by exciting the electromagnetic solenoid 98, fluid pressure is introduced from the accumulator as the fluid pressure source to the power chamber 6, thereby automatically actuating the brake fluid pressure boosting device 1. In this manner, automatic braking is possible.

The other actions and effects of the brake fluid pressure boosting device 1 and the actions and effects of the master cylinder 33 of the eleventh embodiment are the same as those of the tenth embodiment.

Figure 17:
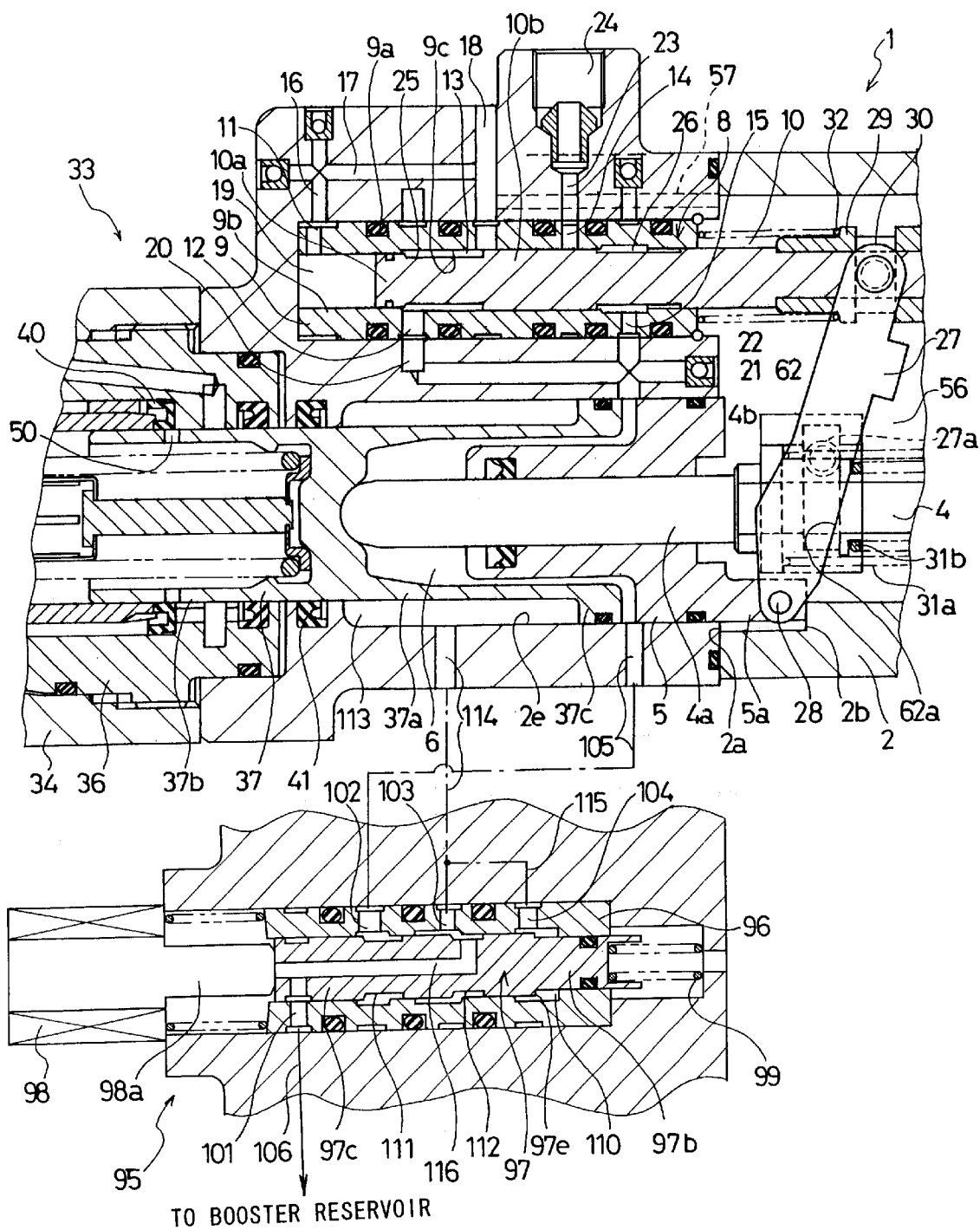
FIG. 17 is a partially sectional view showing a twelfth embodiment of the present invention.

FIG. 17 is a partially sectional view showing the twelfth embodiment of the present invention.

In the aforementioned tenth and eleventh embodiments, the front end portion 4*a* of the input shaft 4 is fluid-tightly and slidably fitted in the axial hole 5*b* of the power piston 5, the reaction chamber 58 is provided in the axial hole 5*b* between the front end portion 4*a* and the power piston 5, and in the inoperative state, the front end of the power piston 5 is brought in contact with the primary piston 37. In a brake fluid pressure boosting device 1 of the twelfth embodiment, however, there is no reaction chamber 58 and the front end portion 4*a* of the input shaft 4 is fluid-tightly and slidably inserted through the power piston 5 to extend in the power chamber 6 so that the front end is in contact with the primary piston 37.

While the power piston 5 is movable in the axial direction in the tenth and eleventh embodiment, the power piston 5 is fixed and thus is not movable in this twelfth embodiment, but not clearly shown in the figure.

The primary piston 37 is provided with a piston portion 37*b* which passes through the second cup sealing member 40 and a piston portion 37*c* of which diameter is larger than that of the piston portion 37*b*. The piston portion 37*c* is fluid-tightly and slidably inserted into an axial hole 2*e* of the housing 2 into which the power piston 5 is fluid-tightly inserted. The power chamber 6 is formed between the primary piston 37 and the power piston 5 and an annular pressure control chamber 113 is formed in the axial hole 2*e* in front of the piston portion 37*c* of the primary piston 37.

In the electromagnetic pressure control valve 95 of the twelfth embodiment, the seventh radial hole 101 is always connected to the booster reservoir through the passage 106 and the eighth radial hole 102 is always connected to the power chamber 6 through the passage 105. Further, the ninth radial hole 103 is always connected to the pressure control chamber 113 through a passage 114 of the housing 2 and the tenth radial hole 104 is always connected to the pressure control chamber 113 through a passage 115 and the passage 114.

The third annular groove 111 of the valve spool 97 shuts off the eighth radial hole 102 from the ninth radial hole 103 when the valve spool 97 is inoperative and connects the eighth radial hole 102 to the ninth radial hole 103 when the valve spool 97 is operative. The fourth annular groove 112 is always connected to the seventh radial hole 101 through a passage 116 of the valve spool 97. The fourth annular groove 112 is connected to the ninth radial hole 103 when the valve spool 97 is inoperative and is shut off from the ninth radial hole 103 when the valve spool 97 is operative.

Accordingly, the electromagnetic pressure control valve 95 in the inoperative state blocks the communication between the power chamber 6 and the pressure control chamber 113 and allows the communication between the pressure control chamber 113 and the booster reservoir. The electromagnetic pressure control valve 95 in the operative state blocks the communication between the pressure control chamber 113 and the booster reservoir and allows the communication from the power chamber 6 to the pressure control chamber 113.

The other structure of the brake fluid pressure boosting device 1 and the structure of the master cylinder 33 of the twelfth embodiment are the same as those of the tenth embodiment.

In the brake fluid pressure boosting device 1 of the twelfth embodiment structured as mentioned above, during the normal braking, fluid pressure corresponding to the pedal pressure controlled by the control valve 8 passes through the passage 22 and is introduced directly into the power chamber 6 without passing through the electromagnetic pressure control valve 95. Since the fluid pressure of the power chamber 6 acts on the front end portion 4a of the input shaft 4, reaction force is exerted to the input shaft 4 and is then transmitted to the driver.

As the electromagnetic solenoid 98 is excited during the normal braking, the valve spool 97 moves to the right because of the electromagnetic force of the electromagnetic solenoid 98. Then, the fourth annular groove 112 is shut off from the ninth radial hole 103 and the third annular groove 111 allows the communication between the eighth radial hole 102 and the ninth radial hole 103. Therefore, the power chamber 6 is allowed to communicate with the pressure control chamber 113 so that fluid pressure of the power chamber 6 is introduced into the pressure control chamber 113. The fluid pressure introduced to the pressure control chamber 113 is exerted to the piston portion 37c in the backward direction. Accordingly, the force pressing the primary piston 37 by the fluid pressure of the power chamber 6 is decreased, thus decreasing the master cylinder pressure generated by the master cylinder 33.

At this point, further, the fluid pressure of the power chamber 6 is also introduced to the tenth radial hole 104 through the passage 115 and is exerted leftward to the step 97e of the valve spool 97. Because of the fluid pressure of the power chamber 6, thrust pressing the valve spool 97 to the left against electromagnetic force of the electromagnetic solenoid 98 is developed. The fluid pressure of the pressure control chamber 113 is controlled such that the thrust and the electromagnetic force of the electromagnetic solenoid 98 balance. Therefore, by controlling the current to be supplied to the electromagnetic solenoid 98, the fluid pressure introduced into the pressure control chamber 113 is controlled according to the supplied current whereby the master cylinder pressure can be controlled.

Because of this pressure control, the fluid pressure of the power chamber 6 is not changed even when the force pressing the primary piston 37 is changed. Therefore, the reaction force to the input shaft 4 is not changed and thus the travel of the input shaft 4 is also not changed.

The other actions and effects of the brake fluid pressure boosting device 1 and the actions and effects of the master cylinder 33 of the twelfth embodiment are the same as those of the tenth embodiment.

Though, in the twelfth embodiment, the pressure control chamber 113 is connected to the power chamber 6 to introduce the fluid pressure of the power chamber 6 into the pressure control chamber 113 in the operative state, the pressure control chamber 113 may be connected to the accumulator to introduce the fluid pressure of the accumulator into the pressure control chamber 113, thereby widening the range of decreasing the master cylinder pressure. In addition, the range of decreasing the master cylinder pressure can be freely set by controlling the fluid pressure of the accumulator to a desired value by the pressure control valve and introducing the controlled pressure into the pressure control chamber 113.

Figure 18:
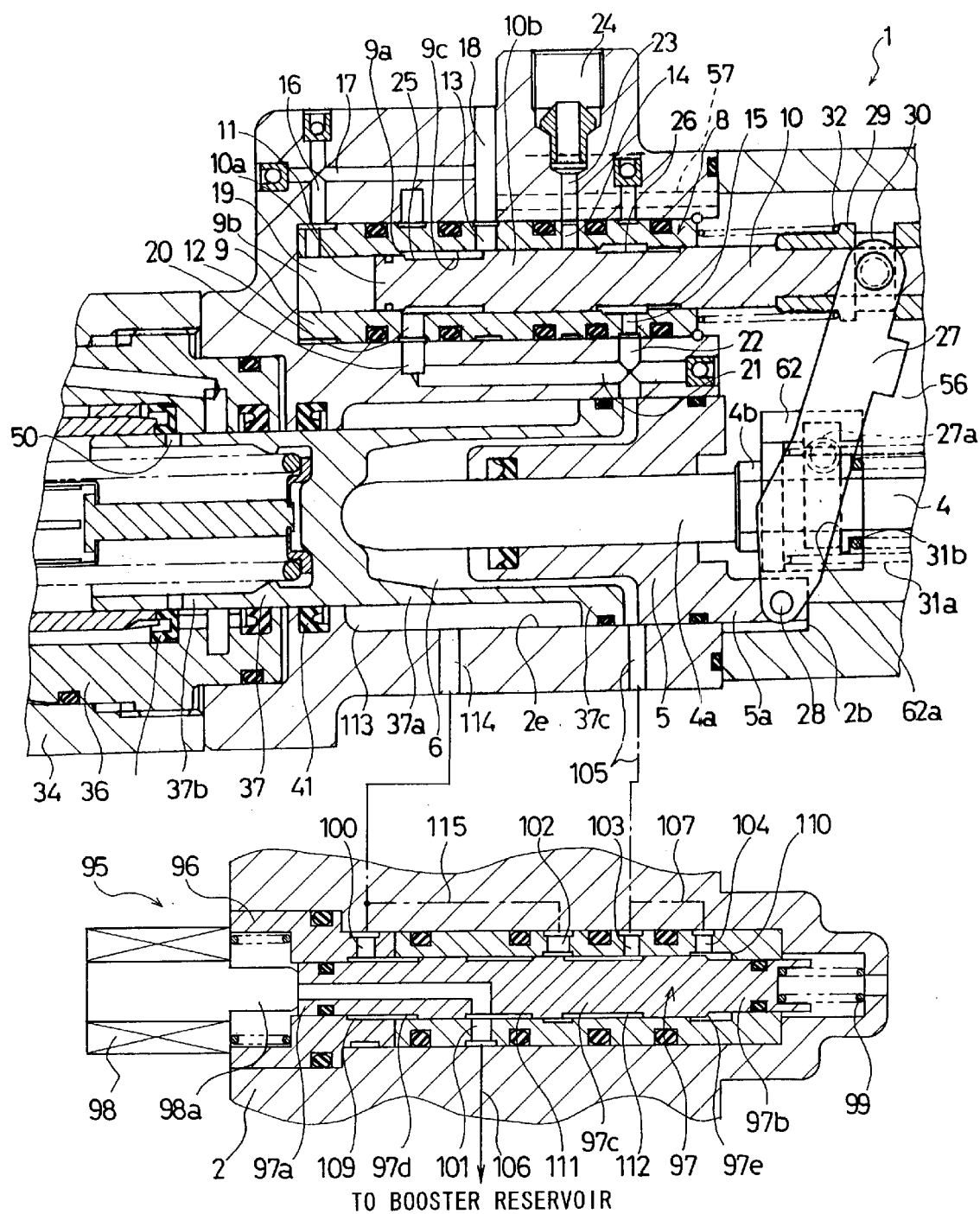
FIG. 18 is a partially sectional view showing a thirteenth embodiment of the present invention.

FIG. 18 is a partially sectional view showing the thirteenth embodiment of the present invention.

A brake fluid pressure boosting device 1 of the thirteenth embodiment is the same as that of the twelfth embodiment but the structure of the electromagnetic pressure control valve 95.

As shown in FIG. 18, in the electromagnetic pressure control valve 95 of the thirteenth embodiment, the sixth radial hole 100 is always connected to the pressure control chamber 113 through the passage 114. The seventh radial hole 101 is always connected to the booster reservoir through the passage 106 and the eighth radial hole 102 is always connected to the pressure control chamber 113 through the passage 1115 and the passage 114. Further, the ninth radial hole 103 is always connected to the power chamber 6 through the passage 105 and the tenth radial hole 104 is always connected to the power chamber 6 through the passage 107 and the passage 105.

The third annular groove 111 of the valve spool 97 is always connected to the seventh radial hole 101. The third annular groove 111 is shut off from the eighth radial hole 102 when the valve spool 97 is inoperative and is connected to the eighth radial hole 102 to allow the communication between the eighth radial hole 102 and the seventh radial hole 101 when the valve spool 97 is operative. Furthermore, the fourth annular groove 112 is always connected to the ninth radial hole 103. The fourth annular groove 112 is connected to the eighth radial hole 102 to allow the communication between the eighth radial hole 102 and the ninth radial hole 103 when the valve spool 97 is inoperative and is shut off from the eighth radial hole 102 to block the communication between the eighth radial hole 102 and the ninth radial hole 103 when the valve spool 97 is operative.

Therefore, the electromagnetic pressure control valve 95 in the inoperative state allows the communication between the power chamber 6 and the pressure control chamber 113. The electromagnetic pressure control valve 95 in the operative state blocks the communication between the pressure control chamber 113 and the power chamber 6 and allows the communication between the pressure control chamber 113 and the booster reservoir.

The other structure of the brake fluid pressure boosting device 1 and the structure of the master cylinder 33 of the thirteenth embodiment are the same as those of the twelfth embodiment.

In the brake fluid pressure boosting device 1 of the thirteenth embodiment structured as mentioned above, when the electromagnetic pressure control valve 95 is inoperative during the normal braking, fluid pressure is introduced into the power chamber 6 and also introduced into the pressure control chamber 113. Therefore, the primary piston 37 is pressed forward by the fluid pressure of the power chamber 6 and is pressed backward by the fluid pressure of the pressure control chamber 113. At this point, the pressure receiving area for the fluid pressure of the power chamber 6 is larger than the pressure receiving area for the fluid pressure of the pressure control chamber 113. This difference between the pressure receiving areas develops force pressing the primary piston 37 so that the primary piston 37 moves forward and the master cylinder 33 thereby develops master cylinder pressure.

As the electromagnetic solenoid 98 is excited during the normal braking, the valve spool 97 moves to the right because of the electromagnetic force of the electromagnetic solenoid 98. Then, the fourth annular groove 112 is shut off from the eighth radial hole 102 and the third annular groove 111 allows the communication between the seventh radial hole 101 and the eighth radial hole 102. Therefore, the pressure control chamber 113 is shut off from the power chamber 6 and is connected to the booster reservoir, thereby decreasing the fluid pressure of the pressure control chamber 113. Accordingly, the force pressing the primary piston 37 forward is increased, thus increasing the master cylinder pressure.

The fluid of the power chamber 6 passes through the passage 107 and the tenth radial hole 104 and is exerted leftward to the step 97$3$ of the valve spool 97. The fluid pressure of the pressure control chamber 113 passes through the passage 114 and the sixth radial hole 100 and is exerted rightward to the step 97$d$ of the valve spool 97. Since the fluid pressure of the pressure control chamber 113 is decreased, the fluid pressure of the power chamber 6 is higher than the fluid pressure of the pressure control chamber 113. The difference between the fluid pressure develops thrust pressing the valve spool 97 to the left against electromagnetic force of the electromagnetic solenoid 98. The fluid pressure of the pressure control chamber 113 is controlled such that the thrust and the electromagnetic force of the electromagnetic solenoid 98 balance. Therefore, by controlling the current to be supplied to the electromagnetic solenoid 98, the fluid pressure introduced into the pressure control chamber 113 is controlled according to the supplied current whereby the master cylinder pressure can be controlled.

Because of this pressure control, the fluid pressure of the power chamber 6 is not changed even when the force pressing the primary piston 37 is changed. Therefore, the reaction force to the input shaft 4 is not changed and thus the travel of the input shaft 4 is also not changed.

The other actions and effects of the brake fluid pressure boosting device 1 and the actions and effects of the master cylinder 33 of the thirteenth embodiment are the same as those of the twelfth embodiment.

Figure 19:
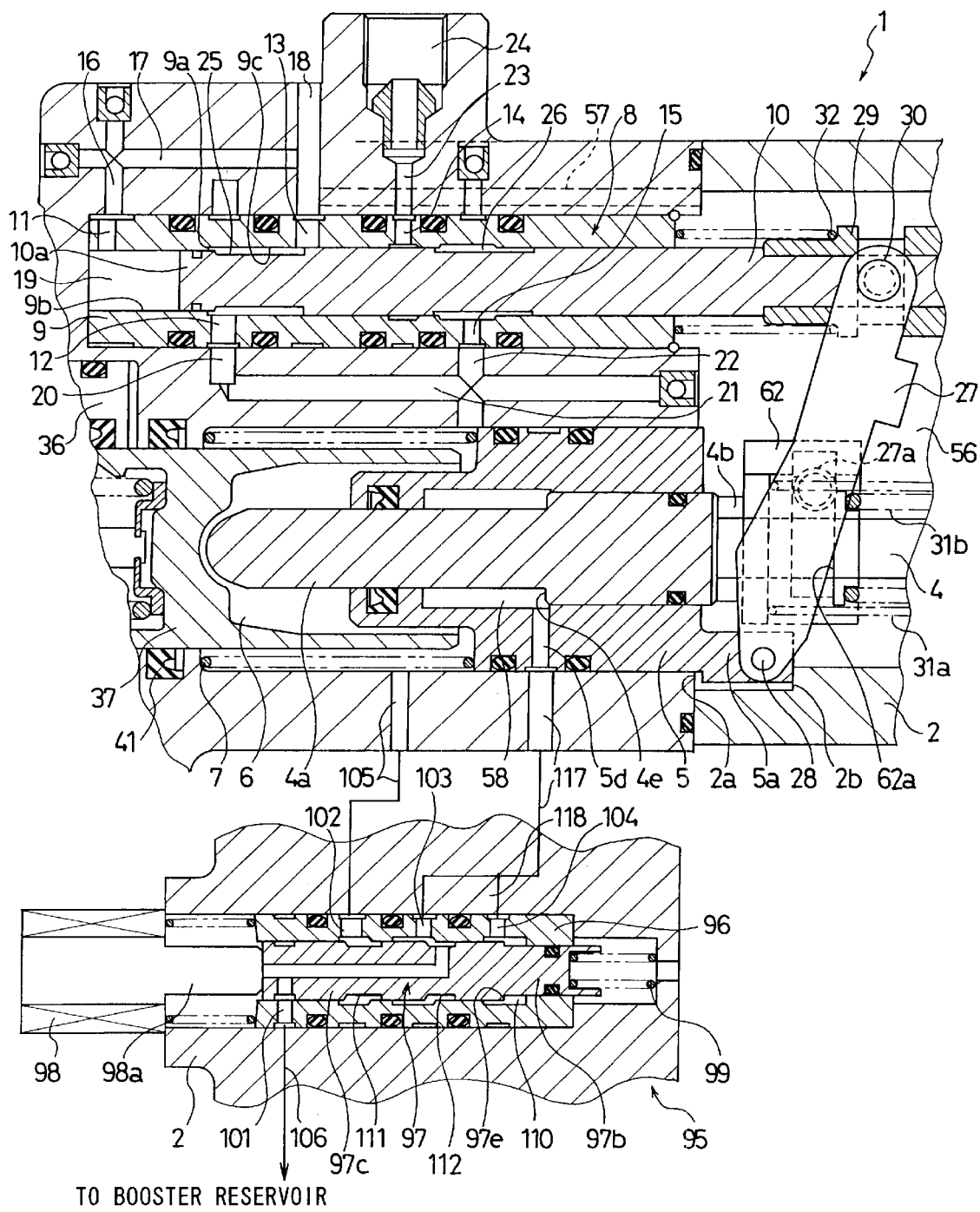
FIG. 19 is a partially sectional view showing a fourteenth embodiment of the present invention.

FIG. 19 is a partially sectional view showing the fourteenth embodiment of the pressure invention.

A brake fluid pressure boosting device 1 of the fourteenth. embodiment is different from the twelfth embodiment shown in FIG. 17 as follows.

As shown in FIG. 19, in the brake fluid pressure boosting device 1 of the fourteenth embodiment, the piston portion 37$c$ of the twelfth embodiment is not provided to the primary piston 37 and therefore the control pressure chamber 113 is not formed. The front end portion 4$a$ of the input shaft 4 has a step 4$e$ and the annular reaction chamber 58 is defined between the outer surface of the front end portion 4$a$ and the inner surface of the power piston 5. As fluid pressure is introduced into the reaction chamber 58, the fluid pressure acts on the step 4$e$ of the front end portion 4$a$ of the input shaft 4 to apply reaction force to the input shaft 4.

While the pressure control chamber 113 is always connected to the ninth radial hole 103 and the tenth radial hole 104 of the electromagnetic pressure control valve 95 in the twelfth embodiment, the reaction chamber 58 is always connected to the ninth radial hole 103 through the passage 117 of the housing 2 and is always connected to the tenth radial hole 104 through the passage 117 and the passage 118 of the housing 2.

The other structure of the brake fluid pressure boosting device 1 and the structure of the master cylinder 33 of the fourteenth embodiment are the same as those of the twelfth embodiment.

Therefore, the electromagnetic pressure control valve 95 in the inoperative state blocks the communication between the power chamber 6 and the reaction chamber 58 and allows the communication between the reaction chamber 58 and the booster reservoir. The electromagnetic pressure control valve 95 in the operative state blocks the communication between the reaction chamber 58 and the booster reservoir and allows the communication between the reaction chamber 58 and the power chamber 6.

In the brake fluid pressure boosting device 1 of the fourteenth embodiment structured as mentioned above, during the normal braking, fluid pressure introduced into the power chamber 6 acts on the front end of the front end portion 4$a$ of the input shaft 4 whereby reaction force is applied to the input shaft 4 and is then transmitted to the driver. Since the reaction chamber 58 is shut off from the power chamber 6, fluid pressure of the power chamber 6 is not introduced into the reaction chamber 58.

As the electromagnetic solenoid 98 is excited during the normal braking, the fourth annular groove 112 is shut off from the ninth radial hole 103 in the same manner as the twelfth embodiment and the third annular groove 111 allows the communication between the eighth radial hole 102 and the ninth radial hole 103. Therefore, the power chamber 6 is connected to the reaction chamber 58 so that the fluid pressure of the power chamber 6 is introduced into the reaction chamber 58. The fluid pressure introduced into the reaction chamber 58 acts on the step 4$e$ of the front end portion 4$a$ of the input shaft 4 to apply the reaction force to the front end portion 4$a$, thereby increasing the reaction force applied on the input shaft 4 as mentioned above. Accordingly, the input shaft 4 is pressed backward, thus reducing the biasing force of the first return spring 31$a$ to the lever 27 and the biasing forces of the first and second return springs 31$a$, 31$b$. That is, the reaction force by the fluid pressure of the power chamber 6, the reaction force by the fluid pressure of the reaction chamber 58, and the spring force of the first return spring 31$a$ or the resultant spring force of the first and second return springs 31$a$, 31$b$, and the input applied to the input piston 3 balance. In this case, the input travel of the input piston 3 and the input travel of the input shaft 4 are changed because of the backward movement of the input shaft 4, but input to be applied is not changed.

As the biasing force of the return spring is decreased, the lever 27 rotates about the first supporting pin 28 in the clockwise direction so as to move the valve spool 10 backwards, thereby decreasing the output pressure of the control valve 8. The decrease in the output pressure of the control valve 8 decreases the fluid pressure of the power chamber 6 so that the force pressing the primary piston 37 is decreased, thereby decreasing the master cylinder pressure.

At this point, the fluid pressure of the power chamber 6 is introduced into the tenth radial hole 104 through the passage 115 and acts on the step 97e of the valve spool 97 leftward. Therefore, the fluid pressure of the power chamber 6 develops thrust pressing the valve spool 97 to the left against electromagnetic force of the electromagnetic solenoid 98. The fluid pressure of the reaction chamber 58 is controlled such that the thrust and the electromagnetic force of the electromagnetic solenoid 98 balance. Therefore, by controlling the current to be supplied to the electromagnetic solenoid 98, the fluid pressure introduced into the reaction chamber 58 is controlled according to the supplied current whereby the master cylinder pressure can be controlled.

The other actions and effects of the brake fluid pressure boosting device 1 and the actions and effects of the master cylinder 33 of the fourteenth embodiment are the same as those of the twelfth embodiment.

Though, in the fourteenth embodiment, the reaction chamber 58 is connected to the power chamber 6 to introduce the fluid pressure of the power chamber 6 into the reaction chamber 58 in the operative state, the reaction chamber 58 may be connected to the accumulator to introduce the fluid pressure of the accumulator into the reaction chamber 58. As a result, the reaction force on the input shaft 4 is increased, thereby widening the range of decreasing the master cylinder pressure. In addition, the range of decreasing the master cylinder pressure can be freely set by controlling the fluid pressure of the accumulator to a desired value by the pressure control valve and introducing the controlled pressure into the reaction chamber 58.

Figure 20:
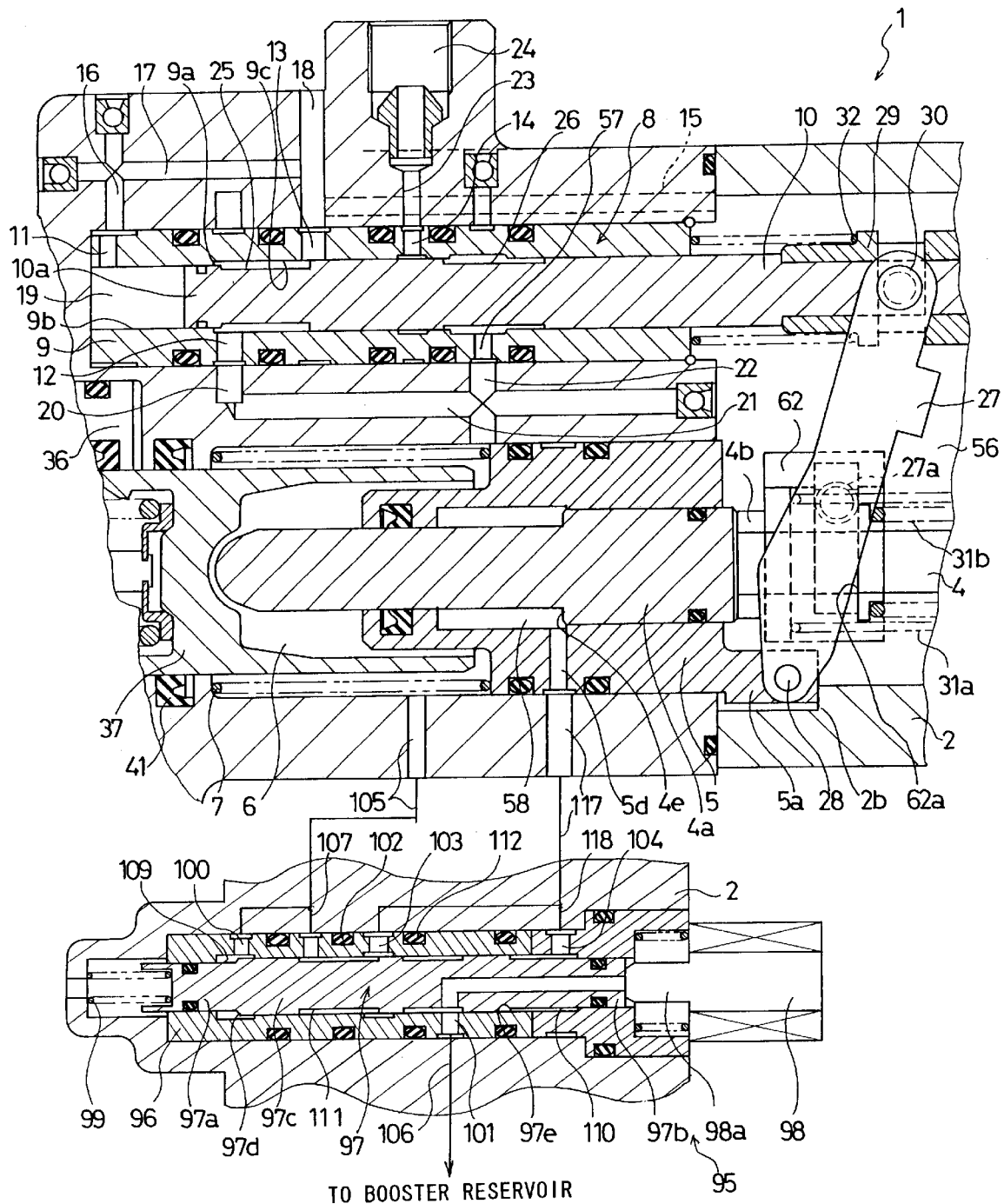
FIG. 20 is a partially sectional view showing a fifteenth embodiment of the present invention.

FIG. 20 is a partially sectional view showing the fifteenth embodiment of the present invention.

A brake fluid pressure boosting device 1 of the fifteenth embodiment is the same as that of the fourteenth embodiment except the structure of the electromagnetic pressure control valve 95.

As shown in FIG. 20, in the electromagnetic pressure control valve 95 of the fifteenth embodiment, the sixth radial hole 100 is always connected to the power chamber 6 through the passage 105 and the eighth radial hole 102 is always connected to the power chamber 6 through the passage 107 and the passage 105. Further, the ninth radial hole 103 is always connected to the reaction chamber 58 through the passage 117 and the tenth radial hole 104 is always connected to the reaction chamber 58 through the passage 118 and the passage 117.

The third annular groove 111 of the valve spool 97 is always connected to the eighth radial hole 102. When the valve spool 97 is inoperative, the third annular groove 111 is connected to the ninth radial hole 103 to allow the communication between the eighth radial hole 102 and the ninth radial hole 103. When the valve spool 97 is operative, the third annular groove 111 is shut off from the ninth radial hole 103 to block the communication between the eighth radial hole 102 and the ninth radial hole 103. The fourth annular groove 112 is always connected to the seventh radial hole 101. When the valve spool 97 is inoperative, the fourth annular groove 112 is shut off from the ninth radial hole 103 to block the communication between the seventh radial hole 101 and the ninth radial hole 103. When the valve spool 97 is operative, the fourth annular groove 112 is connected to the ninth radial hole 103 to allow the communication between the seventh radial hole 101 and the ninth radial hole 103.

Therefore, the electromagnetic pressure control valve 95 in the inoperative state allows the communication between the power chamber 6 and the reaction chamber 58. The electromagnetic pressure control valve 95 in the operative state blocks the communication between the reaction chamber 58 and the power chamber 6 and allows the communication between the reaction chamber 58 and the booster reservoir.

The other structure of the brake fluid pressure boosting device 1 and the structure of the master cylinder 33 of the fifteenth embodiment are the same as those of the fourteenth embodiment.

In the brake fluid pressure boosting device 1 of the fifteenth embodiment structured as mentioned above, when the electromagnetic pressure control valve 95 is inoperative, as fluid pressure is introduced into the power chamber 6 during the normal braking, the fluid pressure is also introduced into the reaction chamber 58. The reaction force applied to the input shaft 4 is resultant force of reaction generated by fluid pressure of the power chamber 6 acting on the front end of the input shaft 4 and reaction generated by fluid pressure of the reaction chamber 58 acting on the step 4e of the input shaft 4. Accordingly, relatively large reaction force is applied to the input shaft 4.

As the electromagnetic solenoid 98 is excited during the normal braking, the valve spool 97 is moved to the left by the electromagnetic force of the electromagnetic solenoid 98. Then the third annular groove 111 is shut off from the ninth radial hole 103 and the fourth annular groove 112 allows the communication between the seventh radial hole 101 and the ninth radial hole 103. Therefore, the reaction chamber 58 is shut off from the power chamber 6 and is connected to the booster reservoir. The fluid pressure of the reaction chamber 58 is decreased so as to decrease the reaction force applied to the input shaft 4. Then, the input shaft 4 moves forward to increase the biasing force of the first return spring 31a applied to the lever 27 or the biasing force of the first and second return springs 31a, 31b. That is, the reaction force by the fluid pressure of the power chamber 6, the reaction force by the fluid pressure of the reaction chamber 58, and the spring force of the first return spring 31a or the resultant spring force of the first and second return springs 31a, 31b, and the input applied to the input piston 3 balance. In this case, the input travel of the input piston 3 and the input travel of the input shaft 4 are changed because of the forward movement of the input shaft 4, but input to be applied is not changed.

As the biasing force of the return spring is increased, the lever 27 rotates about the first supporting pin 28 in the counterclockwise direction so as to move the valve spool 10 forward, thereby increasing the output pressure of the control valve 8. The increase in the output pressure of the control valve 8 increases the fluid pressure of the power chamber 6 so that the force pressing the primary piston 37 is increased, thereby increasing the master cylinder pressure.

At this point, the fluid pressure of the power chamber 6 passes through the sixth radial hole 100 and acts on the step 97d of the valve spool 97 rightward. Therefore, the fluid pressure of the reaction chamber 58 passes through the passage 118 and the tenth radial hole 104 and acts on the step 97e of the valve spool 97 leftward. Since the fluid pressure of the reaction chamber 58 is decreased at this point, the fluid pressure of the power chamber 6 develops thrust pressing the valve spool 97 to the right against electromagnetic force of the electromagnetic solenoid 98. The fluid pressure of the reaction chamber 58 is controlled such that the thrust and the electromagnetic force of the electromagnetic solenoid 98 balance. Therefore, by controlling the current to be supplied to the electromagnetic solenoid 98, the fluid pressure introduced into the reaction chamber 58 is controlled according to the supplied current whereby the master cylinder pressure can be controlled.

The other actions and effects of the brake fluid pressure boosting device 1 and the actions and effects of the master cylinder 33 of the fifteenth embodiment are the same as those of the fourteenth embodiment.

Figure 21:
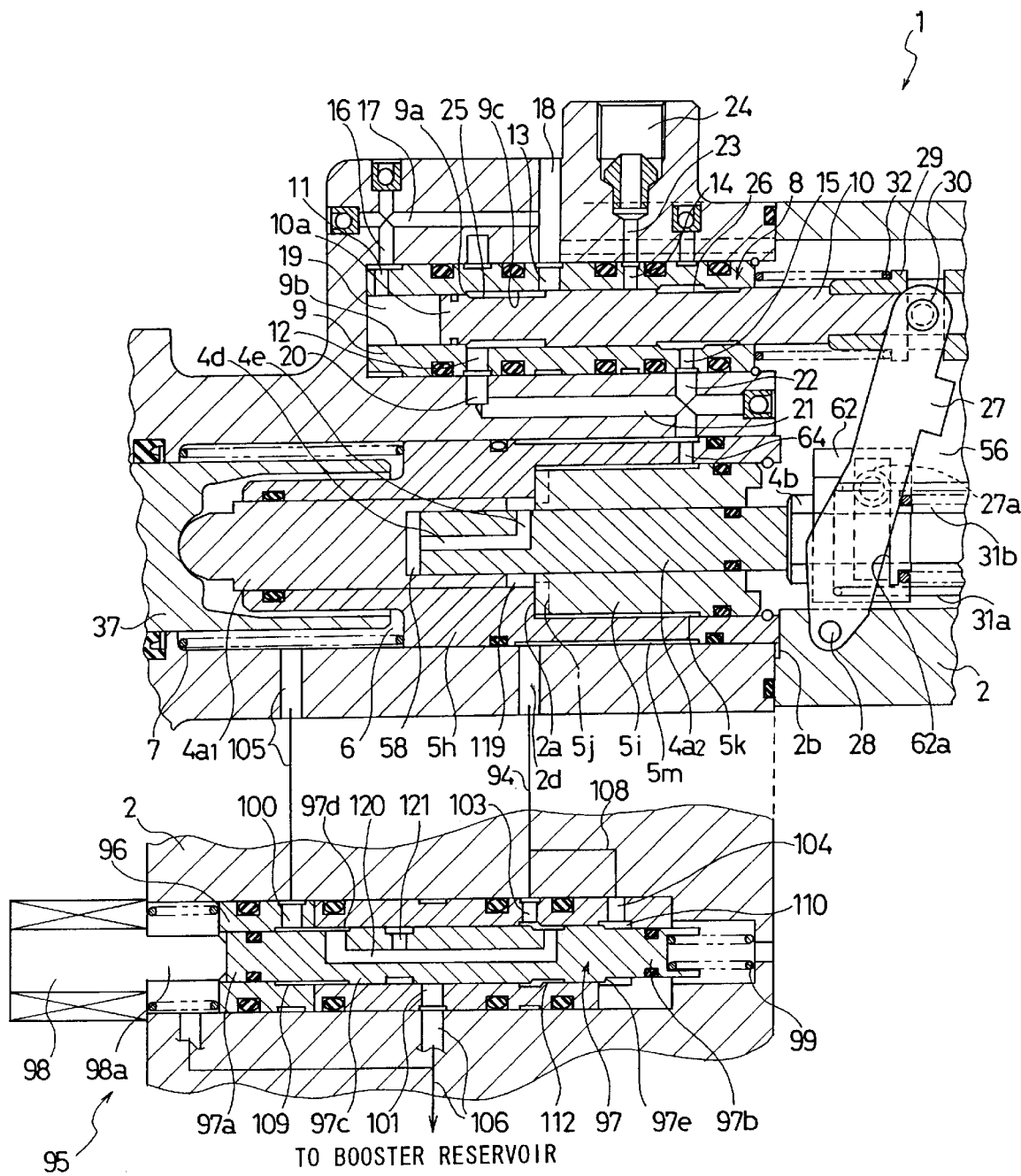
FIG. 21 is a partially sectional view showing a sixteenth embodiment of the present invention.

FIG. 21 is a partially sectional view showing the sixteenth embodiment of the present invention.

A brake fluid pressure boosting device 1 of the sixteenth embodiment is different from the tenth embodiment shown in FIG. 14 by the following structure.

While the front end portion 4a of the input shaft 4 does not extend through the power piston 5 in the tenth embodiment, the front end portion 4a extends through the power piston 5 into the power chamber 6 similarly to the cases of the twelfth through fifteenth embodiments and the front end of the input shaft 4 is in contact with the primary piston 37 in the brake fluid pressure boosting device 1 of the sixteenth embodiment as shown in FIG. 21.

Further, the power piston 5 is composed of two parts: a first piston portion 5h defining the power chamber 6 and a second piston portion 5i fixed and fitted in the first piston portion 5h. Similarly, the front end portion 4a of the input shaft 4 is composed of two parts: a first shaft portion 4a1 extending in the power chamber 6 and being in contact with the primary piston 37 and a second shaft portion 4a2 slidably fitted in the first shaft portion 4a1. The reaction chamber 58 is formed between the first shaft portion 4a1 and the second shaft portion 4a2. The reaction chamber 58 is always connected to the passage 22 through the axial hole 4d and the radial hole 4c formed in the second shaft portion 4a2, an annular space 119 between the first shaft portion 4a1 and the second piston portion 5i, a radial groove 5j and an axial groove 5k formed in the second piston portion 5i, the radial hole 5d, an annular groove 5m formed in the first piston portion 5h. Furthermore, the annular groove 5m of the first piston portion 5h is connected to the electromagnetic pressure control valve 95 through the passage 94.

The electromagnetic pressure control valve 95 of the sixteenth embodiment is not provided with the eighth radial hole 102 and the third annular groove 111 which are used in the tenth embodiment. Further, the fourth annular groove 112 is connected to the ninth radial hole 103 when the valve spool 97 is inoperative and is shut off from the ninth radial hole 103 when the valve spool 97 is operative. The fourth annular groove 112 is always connected to the annular chamber 109 through the passage 120 formed in the valve spool 97. Furthermore, the passage 120 is shut off from the seventh radial hole 101 when the valve spool 97 is inoperative and is connected to the seventh radial hole 101 through a passage 121 formed in the valve spool 97 when the valve spool 97 is operative.

Therefore, the electromagnetic pressure control valve 95 in the inoperative state allows the communication between the power chamber 6 and the reaction chamber 58. The electromagnetic pressure control valve 95 in the operative state blocks the communication between the power chamber 6 and the reaction chamber 58 and allows the communication between the power chamber 6 and the booster reservoir.

The other structure of the brake fluid pressure boosting device 1 and the structure of the master cylinder 33 of the sixteenth embodiment are the same as those of the tenth embodiment.

In the brake fluid pressure boosting device 1 of the sixteenth embodiment structured as mentioned above, during the normal braking, the fluid pressure controlled by the control valve 8 according to the input passes through the passage 22, the annular groove 5m, and the passage 94 and is introduced into the power chamber 6 through the electromagnetic pressure control valve 95 similarly to the tenth embodiment so that the primary piston 37 is actuated to develop master cylinder pressure. In addition, the fluid pressure controlled by the control valve 8 is introduced into the reaction chamber 58 through the passage 22, the radial hole 5d, the axial groove 5k, the radial groove 5j, the annular space 119, the radial hole 4e, and the axial hole 4d. The fluid pressure introduced into the reaction chamber 58 develops reaction force to the input shaft 4.

As the electromagnetic solenoid 98 is excited during the normal braking, the valve spool 97 is moved to the right by the electromagnetic force of the electromagnetic solenoid 98. Then the fourth annular groove 112 is shut off from the ninth radial hole 103 and the passage 121 is connected to the seventh radial hole 101. As a result, the power chamber 6 is shut off from the reaction chamber 58 and is connected to the booster reservoir, thereby decreasing the fluid pressure of the power chamber 6. Therefore, the force pressing the primary piston 37 forward is decreased so as to decrease the master cylinder pressure.

In the same manner as the tenth embodiment, the difference between the fluid pressure of the reaction chamber 58 and the fluid pressure of the power chamber 6 develops thrust pressing the valve spool 97 to the left against electromagnetic force of the electromagnetic solenoid 98. The fluid pressure of the power chamber 6 is controlled such that the thrust and the electromagnetic force of the electromagnetic solenoid 98 balance. Therefore, by controlling the current to be supplied to the electromagnetic solenoid 98, the fluid pressure introduced into the power chamber 6 is controlled according to the supplied current whereby the master cylinder pressure can be controlled.

The other actions and effects of the brake fluid pressure boosting device 1 and the actions and effects of the master cylinder 33 of the sixteenth embodiment are the same as those of the tenth embodiment.

Figure 22:
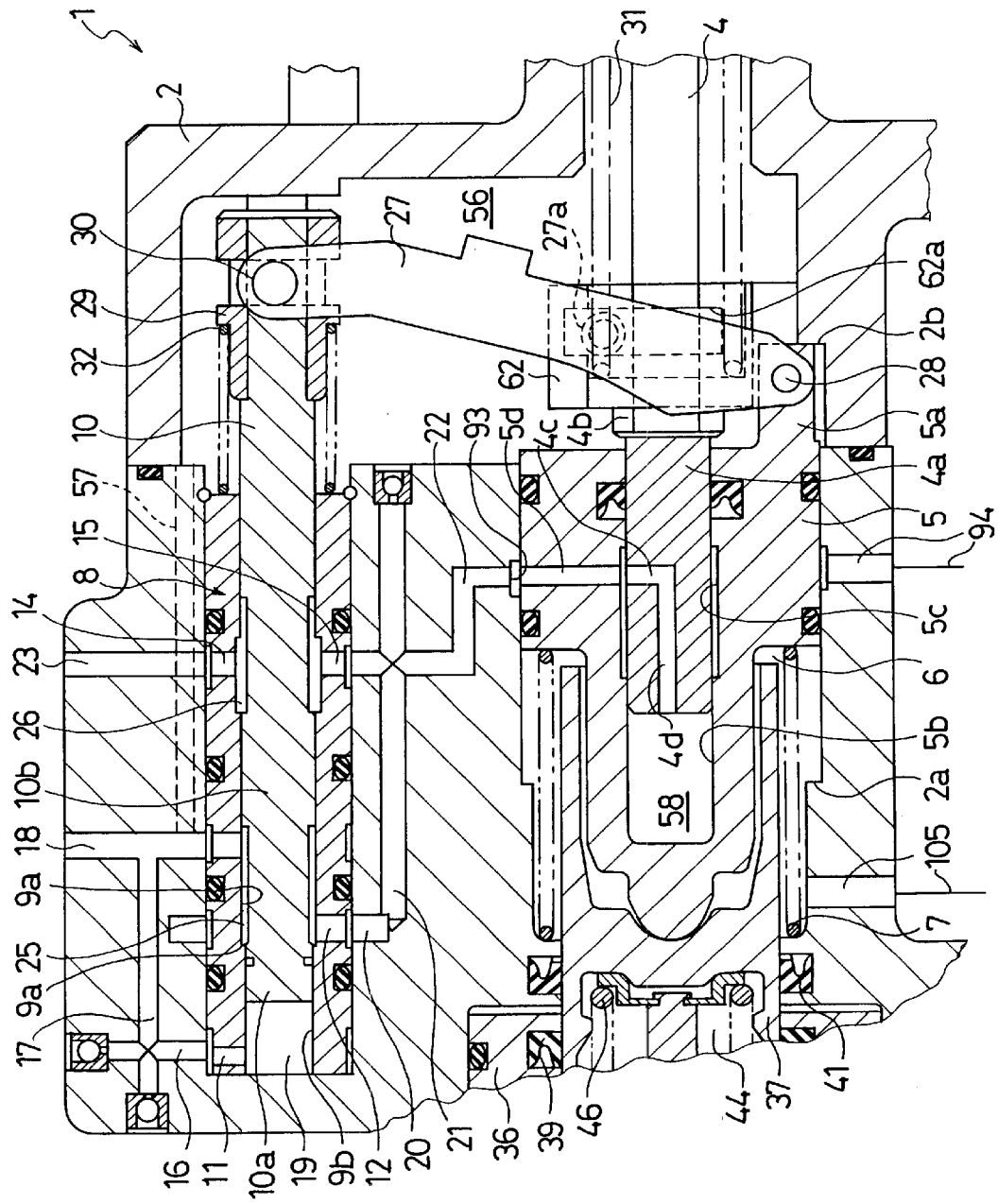
FIG. 22 is a partially sectional view showing a seventeenth embodiment of the present invention.

FIG. 22 is a partially sectional view similar to the FIG. 15 but showing the seventeenth embodiment of the present invention.

While the control valve 8 is of a normally closed type in any one of the aforementioned embodiments, the control valve 8 is of a normally open type which is open when it is inoperative in a brake fluid pressure boosting device 1 of the seventeenth embodiment. Unlike the fourth and fifth radial holes 14, 15 of the valve sleeve 9 in the tenth embodiment shown in FIG. 14 and FIG. 15, the fourth and fifth radial holes 14, 15 are formed at the same position in the longitudinal direction of the valve sleeve 9 as shown in FIG. 22 in this seventeenth embodiment. The second annular groove 26 is always connected not only to the fifth radial hole 15 but also to the fourth radial hole 14. Further, the third radial hole 13 of the valve sleeve 9 and the first annular groove 25 are connected to each other in the inoperative state with relatively large passage area as compared to that of the tenth embodiment. Employed as a fluid pressure source of the seventeenth embodiment is only a pump not shown, not the accumulator.

In the seventeenth embodiment, one return spring 31 is compressed between the input piston 3 and the retainer 62, so the input-input stroke characteristic of the brake fluid pressure boosting device 1 is indicated by one straight line with a predetermined inclination, not a two-stage characteristic as the aforementioned embodiments.

The other structure of the brake fluid pressure boosting device 1 and the structure of the master cylinder 33 of the seventeenth embodiment are the same as those of the tenth embodiment. Therefore, when the control valve 8 is inoperative, the power chamber 6 is connected not only to the booster reservoir but also to the pump, so the control valve 8 is of a normally open type.

In the brake fluid pressure boosting device 1 of the seventeenth embodiment structured as mentioned above, as the pump is driven in the inoperative state of the brakes, the pumped fluid from the booster reservoir cycles or returns to the booster reservoir through the passage 23, the fourth radial hole 14, the second annular groove 26, the passage 22, the passage 21, the passage 20, the second radial hole 12, the first annular groove 25, the third radial hole 13, and the passage 18. At this point, since the first annular groove 25 and the third radial passage 13 are connected to each other with a large passage area, the cycling pumped fluid is not throttled at all so as to develop no fluid pressure.

As the input shaft 4 moves forward in the operative state of the brakes, the lever 27 rotates in the counterclockwise direction just like the aforementioned embodiments so as to move the valve spool 10 forward. Then, the passage area between the first annular groove 25 and the third radial passage 13 is gradually reduced whereby the cycling pumped fluid is throttled so as to develop fluid pressure in the first annular groove 25. As the fluid pressure is also introduced into the passage 22 and thus is introduced into the power chamber 6 and the reaction chamber 58 similarly to the tenth embodiment.

The other actions and effects of the brake fluid pressure boosting device 1 and the actions and effects of the master cylinder 33 of the seventeenth embodiment are the same as those of the tenth embodiment.

Though the control valve of a normally open type is employed for the brake fluid pressure boosting device 1 of the seventeenth embodiment, the control valve of a normally open type can be applied to the brake fluid pressure boosting device of any of the other embodiments.

Figure 23:
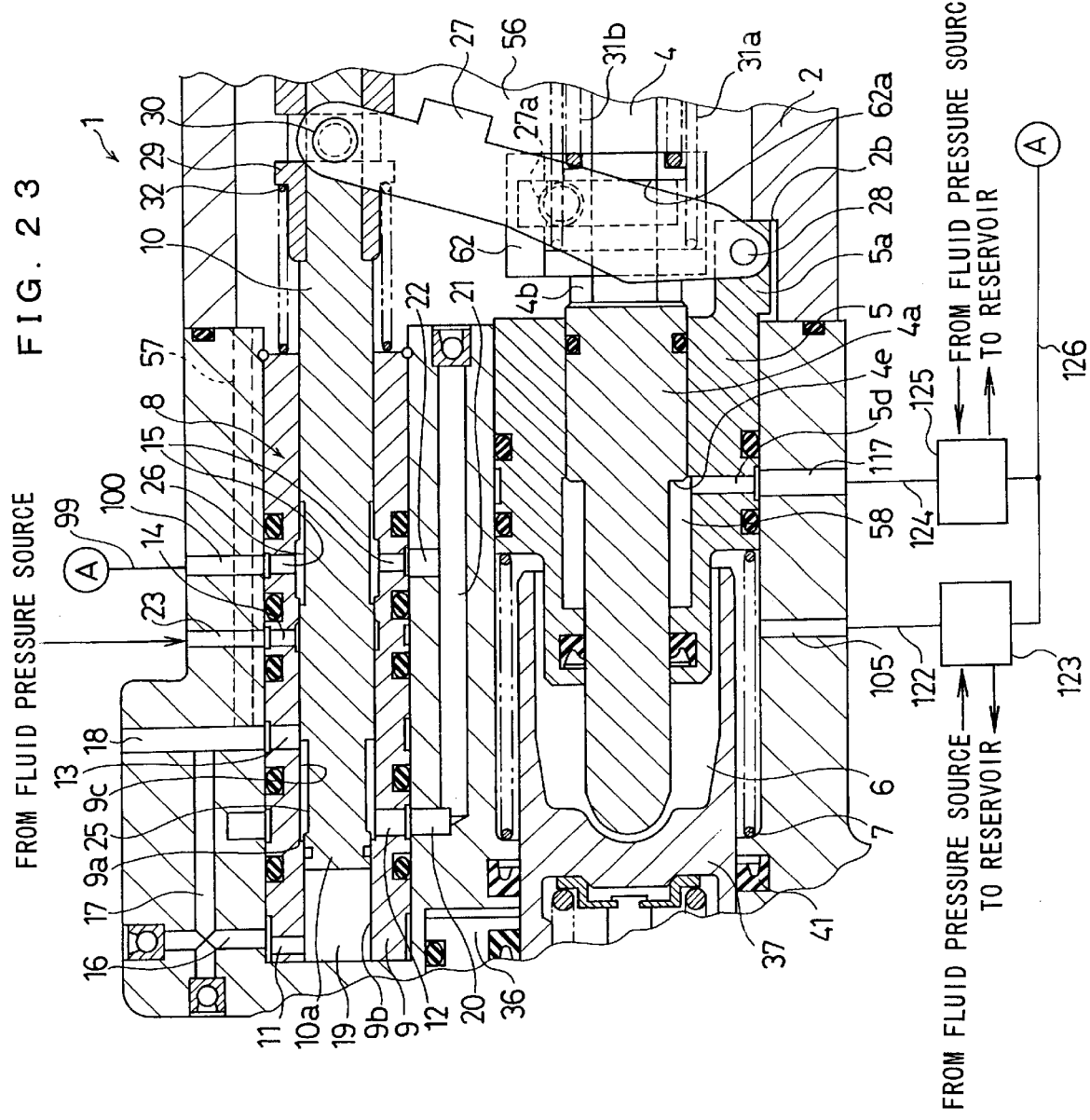
FIG. 23 is a partially sectional view showing an eighteenth embodiment of the present invention.

FIG. 23 is a partially sectional view similar to the FIG. 15 but showing the eighteenth embodiment of the present invention.

A brake fluid pressure boosting device 1 of the eighteenth embodiment is different from the aforementioned fourteenth embodiment shown in FIG. 19 by the following structure.

As shown in FIG. 23, the brake fluid pressure boosting device 1 of the eighteenth embodiment is not provided with the electromagnetic pressure control valve 95 employed in the fourteenth embodiment, but is provided with a first pressure control valve 123 connected to the power chamber 6 through a path 122 and the passage 105 and a second pressure control valve 125 connected to the power chamber 6 through a path 124 and the passage 117. The first and second pressure control valves 123, 125 are connected to the fifth radial hole 15 of the valve sleeve 9 through a path 126 and a passage 127 of the housing 2. Further, the first and second pressure control valves 123, 125 are both connected to the accumulator as a fluid pressure source and to the booster reservoir. The first and second pressure control valves 123, 125 which may be electromagnetic selector valves of conventionally known type, normally connect the path 126 to the path 122 and the path 124, respectively and, when an external signal is inputted, connect the path 122 and the path 124 to the accumulator or the booster reservoir, respectively, according to respective external signals.

While the passage 22 of the housing 2 communicates with the power chamber 6 and the second radial hole 12 in the fourteenth embodiment, the passage 22 of the housing 2 communicates only with the second radial hole 12 and not with the power chamber 6 in the eighteenth embodiment.

The other structure of the brake fluid pressure boosting device 1 and the structure of the master cylinder 33 of the eighteenth embodiment are the same as those of the fourteenth embodiment.

In the brake fluid boosting device 1 of the eighteenth embodiment structured as mentioned above, when the first and second pressure control valves 123, 125 are inoperative and during the normal braking, the output fluid pressure of the control valve 8 controlled according to the pedal pressure is introduced into the power chamber 6 through the fifth radial hole 15, the passage 127, the path 126, the first pressure control valve 123, the path 122, and the passage 105 and introduced into the reaction chamber 58 through the path 126, the second pressure control valve 125, the path 124, and the passage 117. Thus, reaction force applied to the input shaft 4 is composed of reaction force generated by the fluid pressure of the power chamber 6 acting on the front end of the input shaft 4 and reaction force generated by the fluid pressure of the reaction chamber 58 acting on the step 4e of the input shaft 4 and is therefore relatively large.

As an external control signal is inputted into the first pressure control valve 123 during the normal braking, the first pressure control valve 123 blocks the communication between the path 126 and the path 122 and selectively allows the communication between the path 122 and the accumulator as the fluid pressure source or the booster reservoir according to the external control signal. As the communication between the path 122 and the accumulator as the fluid pressure source is allowed, accumulator pressure produced according to the external control signal is introduced into the power chamber 6 to increase the fluid pressure of the power chamber 6. As a result of the increase in the fluid pressure of the power chamber 6, the master cylinder pressure is increased, the brake pressures are increased, and the reaction force applied to the input shaft 4 is increased. In this case, since the accumulator pressure is introduced into the power chamber 6, the fluid pressure of the power chamber 6 can be larger than the case that the output pressure of the control valve 8 is introduced. On the other hand, as the communication between the path 122 and the booster reservoir is allowed, the fluid pressure of the power chamber 6 is decreased. As a result of the decrease in the fluid pressure of the power chamber 6, the master cylinder pressure is decreased, the brake pressures are decreased, and the reaction force is also decreased.

As an external control signal is inputted into the second pressure control valve 125 during the normal braking, the second pressure control valve 125 blocks the communication between the path 126 and the path 124 and selectively allows the communication between the path 124 and the accumulator as the fluid pressure source or the booster reservoir according to the external control signal. As the communication between the path 124 and the accumulator as the fluid pressure source is allowed, accumulator pressure produced according to the external control signal is introduced into the reaction chamber 58 to increase the fluid pressure of the reaction chamber 58, thus increasing the reaction force. In this case, since the accumulator pressure is introduced into the reaction chamber 58, the fluid pressure of the reaction chamber 58 can be larger than the case that the output pressure of the control valve 8 is introduced. On the other hand, as the communication between the path 124 and the booster reservoir is allowed, the fluid pressure of the reaction chamber 58 is decreased, thus decreasing the reaction force.

In this manner, the first pressure control valve 123 is controlled by an external signal so as to control to decrease or increase the fluid pressure of the power chamber 6 according to the external control signal, thereby controlling the master cylinder pressure and controlling the reaction force. The second pressure control valve 125 is controlled by an external signal so as to control to decrease or increase the fluid pressure of the reaction chamber 58 according to the external control signal, thereby controlling the reaction force.

When the brake pedal is not depressed and the brakes are thus inoperative, similarly to the eleventh embodiment shown in FIG. 16, automatic braking can be conducted by actuating the first pressure control valve 123.

The other actions and effects of the brake fluid pressure boosting device 1 and the actions and effects of the master cylinder 33 of the eighteenth embodiment are the same as those of the fourteenth embodiment.

Though the first and second pressure control valve 123, 125 supply the fluid pressures into the power chamber 6 and the reaction chamber 58 after controlling the fluid pressures, respectively, the output pressure of the control valve 8 supplied to the power chamber 6 and the reaction chamber 58 may be controlled. In this case, the pressure control is conducted only by reduction.

Figure 24:
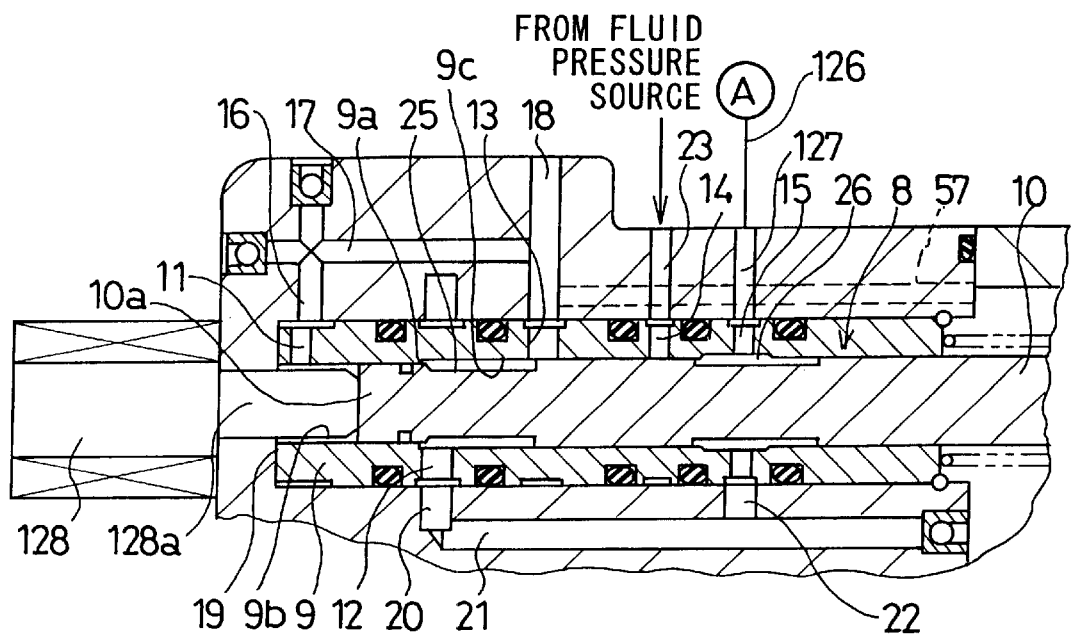
FIG. 24 is a partially sectional view showing an nineteenth embodiment of the present invention.

FIG. 24 is a partially sectional view showing the nineteenth embodiment of the present invention.

A brake fluid pressure boosting device 1 of the nineteenth embodiment is different from the eighteenth embodiment shown in FIG. 23 by the following structure.

While the first and second pressure control valves 123, 125 are employed in the eighteenth embodiment, the first and second pressure control valves 123, 125 are not employed in the nineteenth embodiment and the paths 122, 124 are both connected directly to the path 126 in the brake fluid pressure boosting device 1 of the nineteenth embodiment.

As shown in FIG. 24, in the brake fluid pressure boosting device 1 of the nineteenth embodiment, an electromagnetic solenoid 128 is arranged in the housing 2 coaxially with the valve spool 10. As the electromagnetic solenoid 128 is excited, a movable plunger 128a thereof presses the valve spool 10 toward the inoperative position.

The other structure of the brake fluid pressure boosting device 1 and the structure of the master cylinder 33 of the nineteenth embodiment are the same as those of the eighteenth embodiment.

In the brake fluid pressure boosting device 1 of the nineteenth embodiment structured as mentioned above, during the normal braking, the valve spool 10 moves forward, pressing the movable plunger 128a of the electromagnetic solenoid 128. Since the electromagnetic solenoid 128 is not excited at this point, the movable plunger 128a is moved forward without any resistance. Therefore, during the normal braking, the brakes are operated without being affected by the electromagnetic solenoid 128.

By actuating the electromagnetic solenoid 128 during the normal braking, the fluid pressure of the power chamber 6 can be controlled regardless of the input. That is, as the electromagnetic solenoid 128 is excited during the normal braking, the movable plunger 128a of the electromagnetic solenoid 128 is actuated to press the valve spool 10 toward the inoperative position so that the valve spool 10 is returned to the inoperative position. Then, the first annular groove 25 is connected to the third radial hole 13, decreasing the fluid pressure of the power chamber 6 and thereby decreasing the master cylinder pressure.

The valve spool 10 is controlled in such a manner that resultant force of the force pressing the valve spool 10 toward the inoperative position by the fluid pressure of the first annular groove 25, the spring force of the spool return spring 32, and the electromagnetic force of the electromagnetic solenoid balances with the spring force of the return spring 31 corresponding to the travel of the input shaft 4. Therefore, the fluid pressure of the power chamber 6 is decreased because of the electromagnetic force of the electromagnetic solenoid 128 acting on the valve spool 10 toward the inoperative position. Consequently, the electromagnetic force can be freely set by controlling the current supplied to the electromagnetic solenoid 128, that is, the fluid pressure of the power chamber 6 and the master cylinder pressure can be freely controlled.

During this pressure control, since the spring force of the return spring 31 of the input shaft 4 is not changed, the input and the input travel of the input shaft 4 are not changed. As mentioned above, even when the fluid pressure of the power chamber 6 is controlled, the input side is not affected by the pressure control.

By controlling the current to be supplied to the electromagnetic pressure control valve 128, the fluid pressure of the power chamber 6 in the operative state i.e. the master cylinder pressure can be controlled to be decreased according to the supplied current. This means that the master cylinder pressure can be freely controlled by suitably setting the supplied current.

The actions and effects of the brake fluid pressure boosting device 1 and the actions and effects of the master cylinder 33 of the nineteenth embodiment are the same as those of the eighteenth embodiment.

Figure 25:
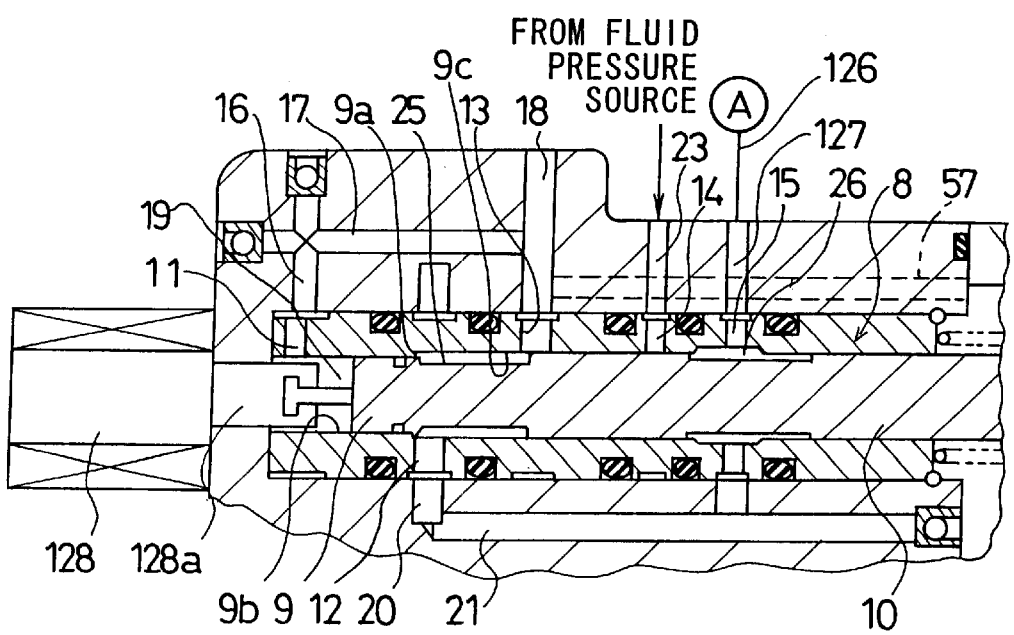
FIG. 25 is a partially sectional view showing a twentieth embodiment of the present invention.

FIG. 25 is a partially sectional view similar to FIG. 24 showing the twentieth embodiment.

While the valve spool 10 is pressed toward the inoperative position by the electromagnetic force of the electromagnetic solenoid 128 in the aforementioned nineteenth embodiment, the valve spool 10 is pulled toward the operative position by the electromagnetic force of the electromagnetic solenoid 128 in a brake fluid pressure boosting device 1 of the twentieth embodiment. For this, the moveable plunger 128a of the electromagnetic solenoid 128 and the valve spool 10 are arranged to be engaged in the pulling direction.

The other structure of the brake fluid pressure boosting device 1 and the structure of the master cylinder 33 of the twentieth embodiment are the same as those of the nineteenth embodiment.

In the brake fluid pressure boosting device 1 of the twentieth embodiment structured as mentioned above, as the electromagnetic solenoid 128 is excited during the normal braking, the movable plunger 128a pulls the valve spool 10 toward the operative direction. As a result, the valve spool 10 moves to the left, thereby increasing the output pressure of the control valve 8 and thus increasing the fluid pressure of the power chamber 6. Therefore, the master cylinder pressure is increased.

The valve spool 10 is controlled in such a manner that resultant force of the force pressing the valve spool 10 toward the inoperative position by the fluid pressure of the first annular groove 25 and the spring force of the spool return spring 32 balances with resultant force of the electromagnetic force of the electromagnetic solenoid and the spring force of the return spring 31 corresponding to the travel of the input shaft 4.

Therefore, the fluid pressure of the power chamber 6 is increased because of the electromagnetic force of the electromagnetic solenoid 128 acting on the valve spool 10 toward the operative position. Consequently, the electromagnetic force can be freely set by controlling the current supplied to the electromagnetic solenoid 128, that is, the fluid pressure of the power chamber 6 and the master cylinder pressure can be freely controlled.

During this pressure control, since the spring force of the return spring 31 of the input shaft 4 is not changed, the input and the input travel of the input shaft 4 are not changed. As mentioned above, even when the fluid pressure of the power chamber 6 is controlled, the input side is not affected by the pressure control.

When the service brake is not operated, as the electromagnetic solenoid 128 is excited, the movable plunger 128a pulls the valve spool 10 toward the operative position. As a result, the control valve 8 is actuated to develop output pressure corresponding to the electromagnetic force of the electromagnetic solenoid 128. The output pressure is supplied to the power chamber 6 so that the master cylinder 33 is actuated to develop master cylinder pressure, thereby actuating the brakes. In this manner, automatic braking can be conducted by exciting the electromagnetic solenoid 128 when the service brake is not operated.

The actions and effects of the brake fluid pressure boosting device 1 and the actions and effects of the master cylinder 33 of the twentieth embodiment are the same as those of the nineteenth embodiment.

Figure 26:
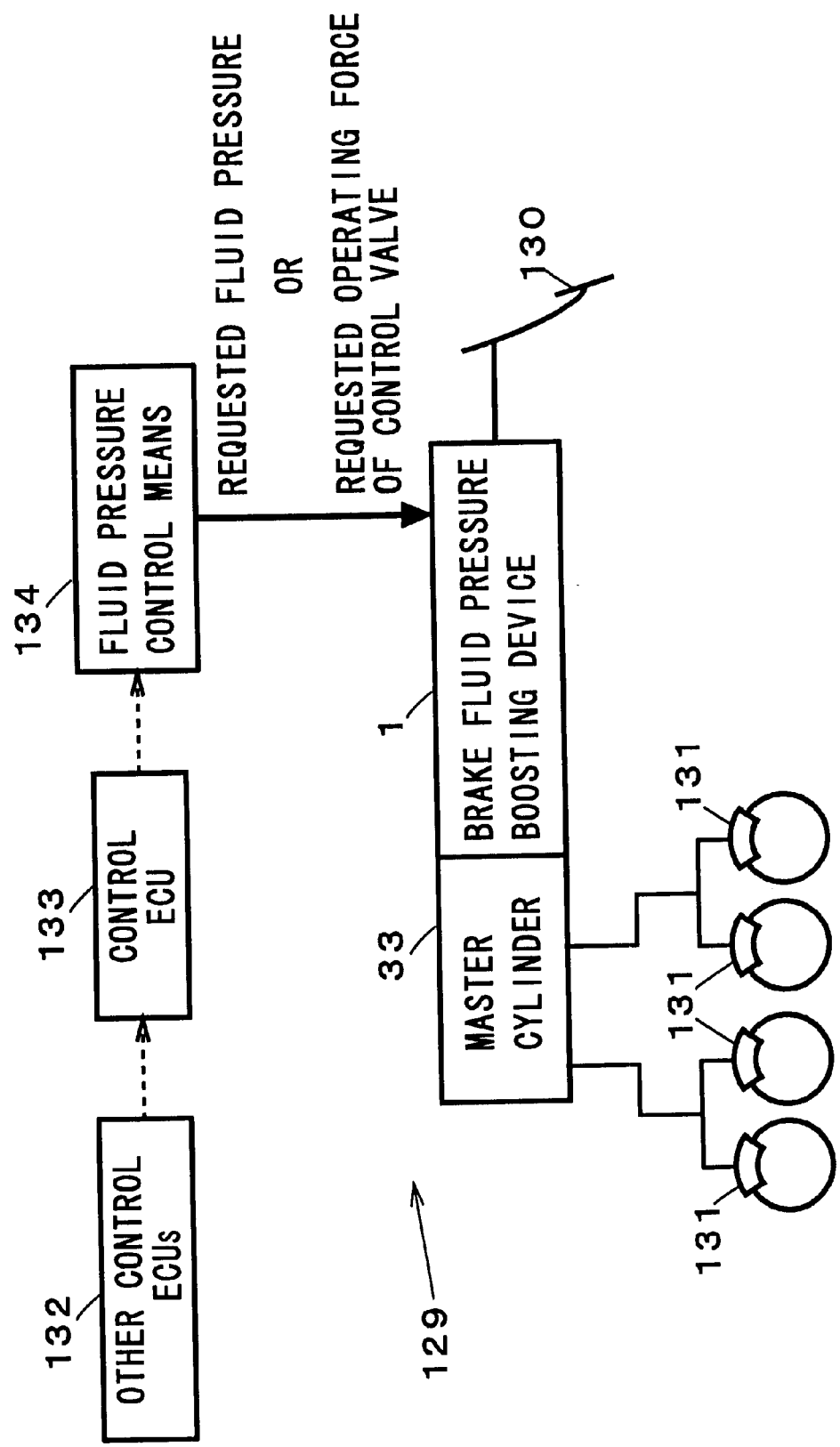
FIG. 26 is a diagram schematically illustrating a brake system of a twenty-first embodiment of the present invention.
Figure 27:
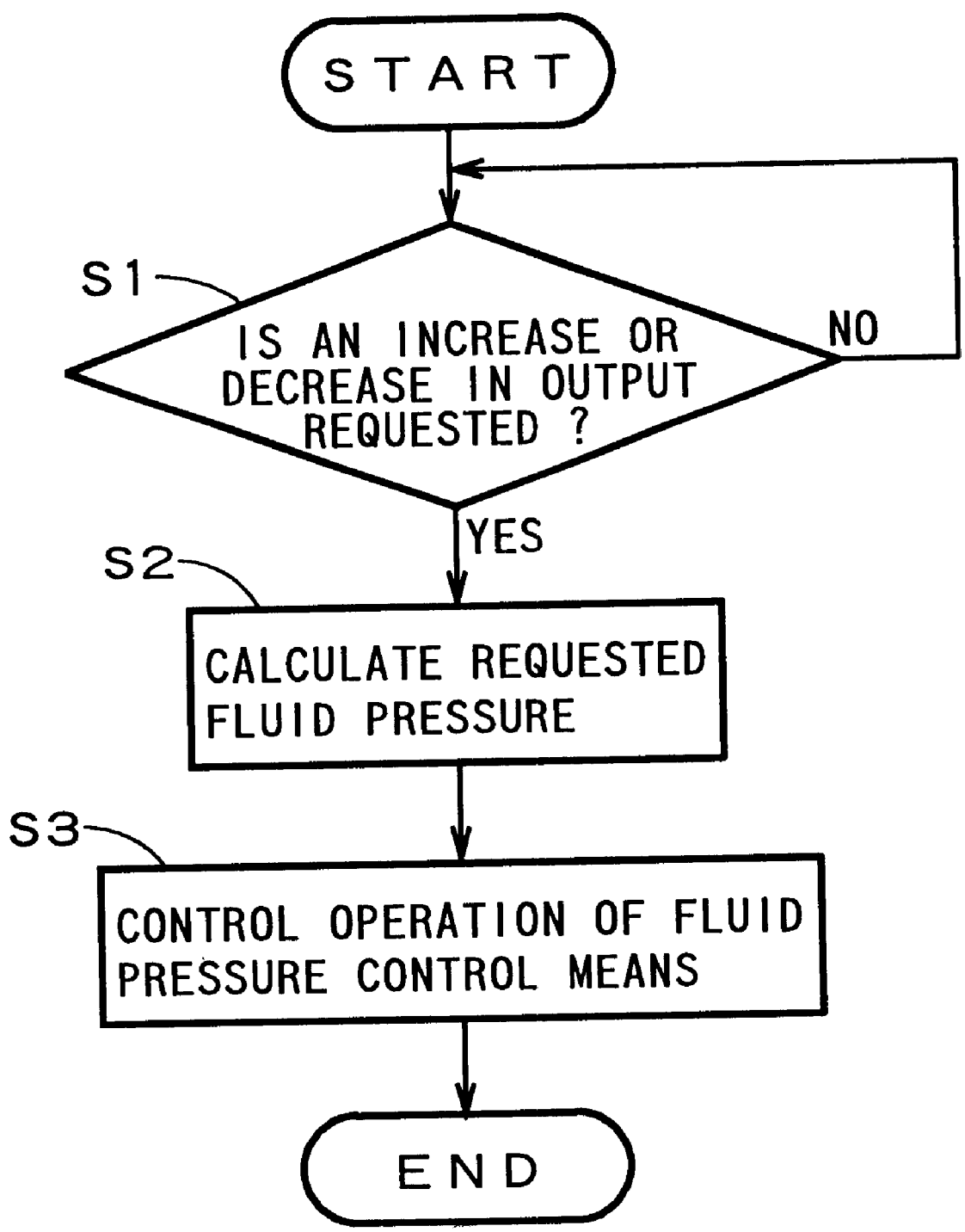
FIG. 27 is a flow chart for controlling the output of a brake fluid pressure boosting device in the brake system shown in FIG. 26.

FIG. 26 is a diagram schematically illustrating a brake system of a twenty-first embodiment of the present invention; and FIG. 27 is a flow chart for controlling the output of a brake fluid pressure boosting device in the brake system shown in FIG. 26.

When brake force larger than that for the normal braking (service braking) is required, for example, for brake assist control, brake control during running on a downward slope, or brake control during running with a full load capacity, a control ECU conducts the aforementioned controls by controlling the fluid pressure control means such as the electromagnetic pressure control valve 95, the first and second pressure control valves 123, 125, or the electromagnetic solenoid 128. Thus, the control ECU is requested to increase the output of a brake fluid pressure boosting device 1 according to the amount of a requested increase in the braking force regardless of the input or pedal force on the brake pedal. The requested increase is requested by one of other controllers (control ECUs) than the aforementioned control ECU. When braking force smaller than that for the normal braking (service braking) is required, for example, for regenerative brake coordination control, engine brake control, or exhaust brake control, the control ECU is required to decrease the output of the brake fluid pressure boosting device 1 according to the amount of a requested decrease in the braking force regardless of the pedal force on the brake pedal. The requested decrease is requested by one of the other ECUs.

The brake system of the twenty-first embodiment can control the increase and decrease in the braking pressure by controlling the output in response to a request signal requesting an increase or decrease in the output from one of the other control ECUs, regardless of the input of the brake fluid pressure boosting device 1 depending on the pedal force on the brake pedal during the operation of the brake fluid pressure boosting device 1 of any one of the aforementioned embodiments.

That is, as shown in FIG. 26, the brake system 129 of the twenty-first embodiment comprises a brake pedal 130, a brake fluid pressure boosting device 1 of any one of the aforementioned tenth through twentieth embodiments, the master cylinder 33 which is operated with the output of the brake fluid pressure boosting device 1 to develop master cylinder pressure, wheel cylinders 131 to which the master cylinder pressure is supplied and which thus generate braking force, the other control ECUs 132 for outputting a request signal requesting an increase or decrease in the braking force at the wheel cylinders 131, the control ECU 133 for the brake fluid pressure boosting device 1 and which calculates the required fluid pressure for the wheel cylinders 131 to generate the requested braking force, i.e. for the brake fluid pressure boosting device 1 to output the requested output depending on the amount of the increase or decrease in the braking force requested by one of the other control ECUs 132 and according to the boosting characteristic of the brake fluid pressure boosting device, also calculates the control amount for controlling a fluid pressure control means 134 (described later) corresponding to the required fluid pressure, and outputs a signal indicating the control amount above calculated, and the fluid pressure control means 134, for example the electromagnetic pressure control valve 95, the first pressure control valve 123, the second pressure control valve 125, or the electromagnetic solenoid 128 of any one of the brake fluid pressure boosting devices 1 of the aforementioned first through eleventh embodiments, for controlling the fluid pressure of the brake fluid pressure boosting device 1 to be the required value regardless of the input depending on the signal indicating the control amount outputted by the control ECU 133.

The fluid pressure control means 134 controls the fluid pressure in the power chamber 6 of the brake fluid pressure boosting device 1 to be the requested fluid pressure depending on the signal indicating the amount of controlling from the control ECU 133 by controlling the inner pressure, i.e. the fluid pressure, of the power chamber 6 of the brake fluid pressure boosting device 1, controlling the inner pressure of the control pressure chamber 113, or controlling the inner pressure of the reaction chamber 58.

For controlling the inner pressure of the power chamber, the control ECU 133 calculates the difference in master cylinder pressure between a case of corresponding to the amount of increase or decrease in the braking force and the case of the normal braking (service braking), calculates, as the aforementioned control amount, the adjustment amount for the inner pressure of the power chamber for establishing a difference in the output of the brake fluid pressure boosting device 1 corresponding to the difference in the master cylinder pressure, and supplies electric current corresponding to the adjustment amount to an electromagnetic solenoid of the control valve for controlling the inner pressure of the power chamber 6, for example, the electromagnetic solenoid 98 of the electromagnetic pressure control valve 95, the electromagnetic solenoid (not shown) of the first and second pressure control valves 123, 125, or the electromagnetic solenoid 128.

For controlling the inner pressure of the control pressure chamber, the control ECU 133 calculates the difference in master cylinder pressure between a case of corresponding to the amount of increase or decrease in the braking force and the case of the normal braking (service braking), calculates, as the aforementioned control amount, the adjustment amount for the inner pressure of the control pressure chamber for establishing a difference in the output of the brake fluid pressure boosting device 1 corresponding to the difference in the master cylinder pressure, and supplies electric current corresponding to the adjustment amount to an electromagnetic solenoid of the control valve controlling the inner pressure of the control pressure chamber 113, for example, the electromagnetic solenoid 98 of the electromagnetic pressure control valve 95.

For controlling the inner pressure of the reaction chamber, the control ECU 133 calculates the difference in master cylinder pressure between a case of corresponding to the amount of increase or decrease in the braking force and the case of the normal braking (service braking), calculates, as the aforementioned control amount, the adjustment amount for the inner pressure of the reaction chamber for establishing a difference in the output of the brake fluid pressure boosting device 1 corresponding to the difference in the master cylinder pressure, and supplies electric current corresponding to the adjustment amount to an electromagnetic solenoid of the control valve controlling the inner pressure of the reaction chamber 58, for example, the electromagnetic solenoid 98 of the electromagnetic pressure control valve 95, or the electromagnetic solenoid of the first and second pressure control valves 123, 125.

According to the flow shown in FIG. 27, the fluid pressure of the brake fluid pressure boosting device 1 is controlled in response to a request signal requesting an increase or decrease in the braking force, i.e. a request signal requesting an increase or decrease in the output of the brake fluid pressure boosting device 1, from one or more of the other control ECUs 132.

That is, in Step S1, the control ECU 133 judges whether or not there is a request signal requesting an increase or decrease in the output of the brake fluid pressure boosting device 1 from one or more of the other control ECUs 132. When the control ECU 133 judges that there is not a request signal, the judgement action in Step S1 is repeated. When the control ECU 133 judges that there is a request signal requesting an increase or decrease in the output, the control ECU 133 calculates the requested fluid pressure of the brake fluid pressure boosting device 1 as mentioned above in Step S2, and controls the operation of the fluid pressure control means 134 to obtain the calculated requested fluid pressure in Step S3.

In this manner, according to the brake system of the twenty-first embodiment, the braking force can be controlled in response to the request signal requesting an increase or decrease in the braking force from one or more of the other control ECUs 132, regardless of the input of the input member during operation, employing the fluid pressure boosting device of any one of the aforementioned tenth through twentieth embodiments.

Though any of the embodiments of the present invention has been described by reference to a fluid pressure boosting device of a lever type using a lever, the present invention can be applied to a fluid pressure boosting device without using a lever.

Further, though the fluid pressure boosting devices of the embodiments of the present invention have been described as brake fluid pressure boosting devices, the fluid pressure boosting device of the present invention can be adapted as another fluid pressure boosting device not for brakes.

As apparent from the above description, according to the fluid pressure boosting device of the present invention, the control valve is operated according to the input in such a manner that the force in the inoperative direction produced by the working fluid pressure balances with the force in the operative direction produced by the elastic member, thereby exhibiting the function as a stroke simulator.

Therefore, the input side and the output side of the fluid pressure boosting device can be separately operated. In this case, since the fluid pressure boosting device can exhibit the function as a stroke simulator, the travel of the input member can be ensured and the input travel of the input member can be freely set without affecting the output side after the working unit.

Since the working fluid pressure for operating the working unit is controlled by the working fluid pressure control means regardless of the input of the input member during the operation of the fluid pressure boosting device, the fluid pressure boosting device of the present invention can easily and flexibly cope with such a system requiring to control the working fluid pressure regardless of the input of the input member during the operation of the fluid pressure boosting device. Therefore, for example, the working fluid pressure can be controlled or decreased for the regenerative braking operation by such a regenerative coordination brake system as mentioned above and the working fluid pressure can be controlled or increased for the brake assisting operation by the brake assist system also mentioned above.

Further, since the working fluid pressure for operating the working unit can be controlled when the input member is not operated by the fluid pressure control means regardless of the operation of the input member, the fluid pressure boosting device can easily and flexibly cope with such a system requiring automatic brake controls, for example, a brake control for controlling the distance from another vehicle, a brake control for avoiding a collision with an obstacle object, and a brake control for Traction Control (TRC).

Since a control valve and a lever of a conventional fluid pressure boosting device can be used as the control valve and the lever of the present invention without significant change, the fluid pressure boosting device of the present invention can be manufactured with easy structure and at a low cost without using special parts.

Since the working unit can be operated by forward movement of the input member in case of the fluid pressure source failure, the working unit can be securely operated even in case of the fluid pressure source failure.

According to the brake system of the present invention, the braking force can be controlled in response to the request signal requesting an increase or decrease in the braking force from one of the other controllers, regardless of the input of the input member during operation, employing the fluid pressure boosting device of the present invention. Therefore, when braking force larger than that for the normal braking (service braking) is required, for example, for brake assist control, brake control during running on a downward slope, or brake control during running with a full load capacity, or when braking force smaller than that for the normal braking (service braking) is required, for example, for regenerative brake coordination control, engine brake control, or exhaust brake control, the braking force can be controlled to securely correspond to these requirements.

What we claim is:

1. A fluid pressure boosting device comprising:
   a housing,
   an input member which is slidably moved in the housing by input applied at a time of an operation,
   a control valve which is provided in the housing and operated by the input member for controlling fluid pressure of a fluid pressure source according to a travel of said input member to develop working fluid pressure for operating a working unit so that said working fluid pressure acts on a surface of said control valve in an inoperative direction, and
   an elastic member disposed between said control valve and said input member for developing a force according to the travel of the input member relative to the housing so that the force by the elastic member acts on said control valve in an operative direction, said control valve being controlled according to said travel such that a force generated by said working fluid pressure balances with the force generated by said elastic member.

2. A fluid pressure boosting device as claimed in claim 1, wherein in case of a fluid pressure source failure, said working unit is operated by the travel of said input member.

3. A fluid pressure boosting device as claimed in claim 1 or 2, wherein said control valve is composed of a spool valve, said spool valve has a valve spool of which operation is controlled by the force of said elastic member acting in the operative direction and by said working fluid pressure acting in the inoperative direction, and the operation of said valve spool is controlled according to the input of said input member in such a manner that the force by said working fluid pressure acting on the valve spool balances with the force of said elastic member.

4. A fluid pressure boosting device as claimed in claim 3, wherein said spool valve comprises a first throttle valve and a second throttle valve, flow of hydraulic fluid is first throttled by said first throttle valve and then throttled by said second throttle valve to be throttled at two stages.

5. A fluid pressure boosting device as claimed in claim 1 or 2, wherein during an operation when said fluid pressure source is in a normal state, a position of said control valve is fixed regardless of the travel of said input member, and further comprising fluid pressure control means for controlling said working fluid pressure regardless of the input of said input member.

6. A fluid pressure boosting device as claimed in claim 5, further comprising a power chamber into which the working fluid pressure is introduced to produce an output for actuating said working unit, and a reaction chamber into which said working fluid pressure is introduced to apply reaction force to said input member, wherein said fluid pressure control means is a pressure control valve for controlling the working fluid pressure of at least one of said power chamber and said reaction chamber.

7. A fluid pressure boosting device as claimed in claim 6, wherein said pressure control valve controls said working fluid pressure or the fluid pressure of said fluid pressure source and supplies it into at least one of said power chamber and said reaction chamber.

8. A fluid pressure boosting device as claimed in claim 5, further comprising a power chamber into which the working fluid pressure is introduced to produce an output for actuating said working unit, and a pressure control chamber into which said working fluid pressure is introduced to control said output, wherein said fluid pressure control means is a pressure control valve for controlling the working fluid pressure of at least one of said power chamber and said pressure control chamber.

9. A fluid pressure boosting device as claimed in claim 8, wherein said pressure control valve controls said working fluid pressure or the fluid pressure of said fluid pressure source and supplies it into at least one of said power chamber and said pressure control chamber.

10. A fluid pressure boosting device as claimed in claim 5, wherein said fluid pressure control means is an electromagnetic solenoid which generates biasing force biasing said control valve in at least one of the operative direction and the inoperative direction.

11. A fluid pressure boosting device as claimed in claim 5, wherein said control valve comprises a valve spool of which operation is controlled by the force of said elastic member acting in the operative direction and by said working fluid pressure acting in the inoperative direction and a valve sleeve fixed to the housing of said fluid pressure boosting device, and wherein said valve spool is moved relative to said valve sleeve according to the input of said input member in such a manner that force by said working fluid pressure acting on the valve spool balances with the force of said elastic member.

12. A fluid pressure boosting device as claimed in claim 11, wherein said valve spool is formed with an annular groove into which said working fluid pressure is introduced during its operation, wherein a pressure receiving area of a pressure receiving surface of said annular groove which receives said working fluid pressure in the inoperative direction of said valve spool is set larger than a pressure receiving area of a pressure receiving surface of said annular groove which receives said working fluid pressure in the operative direction of said valve spool.

13. A fluid pressure boosting device as claimed in claim 5, further comprising a lever disposed between said elastic member and said control valve, wherein said lever is rotated by the force of said elastic member corresponding to the travel of said input member to act on said control valve in the operative direction, a position of a pivotal point of said lever is fixed regardless of the travel of said input member, and the operation of said control valve is controlled according to the input of said input member in such a manner that the force generated by said working fluid pressure balances with a force generated by rotation of said lever.

14. A fluid pressure boosting device as claimed in claim 1, wherein said elastic member is disposed coaxially with said input member, said control valve is disposed to have a predetermined space relative to said input shaft, and further comprising a lever disposed between said elastic member and said control valve wherein said lever is rotated by operation force of said elastic member to act on said control valve in the operative direction, a position of a pivotal point of said lever is fixed regardless of the travel of said input member, and the operation of said control valve is controlled according to the input of said input member in such a manner that the force generated by said working fluid pressure balances with the force generated by the rotation of said lever.

15. A fluid pressure boosting device as claimed in claim 14, wherein said input member is slidable relative to said lever and a slide lubricating member is provided at a sliding portion between said input member and said lever.

16. A fluid pressure boosting device as claimed in claim 15, wherein said slide lubricating member is a bush or a linear bearing.

17. A fluid pressure boosting device as claimed in claim 14, wherein the pivot point of said lever is positioned on an input member side or a control valve side.

18. A fluid pressure boosting device as claimed in claim 1, wherein said elastic member is formed of a plurality of springs or a non-linear spring.

19. A brake system comprising a brake fluid pressure boosting device to intensify an input, a master cylinder which is operated with an output of said brake fluid pressure boosting device to develop master cylinder pressure, and brakes which are operated with braking force generated by the master cylinder pressure, wherein said brake fluid pressure boosting device is the fluid pressure boosting device according to claim 1; and operation of working fluid pressure control means of the brake fluid pressure boosting device is controlled by a controller and that said controller controls an output of said brake fluid pressure boosting device to obtain a requested increase or decrease in the braking force by controlling the operation of said working fluid pressure control means, wherein said requested increase or decrease in the braking force is requested by one of other controllers other than said controller.

20. A brake system as claimed in claim 19, wherein said working fluid pressure control means has an electromagnetic solenoid for its operation, and said controller for controlling the operation of said working fluid pressure control means supplies electric current to said electromagnetic solenoid wherein said electric current corresponds to an amount of said requested increase or decrease in the braking force requested by said one of the other controllers.

21. A fluid pressure boosting device comprising:

a housing, an input member which is slidably moved in the housing by input applied at a time of an operation, a control valve which is provided in the housing and operated by the input member for controlling fluid pressure of a fluid pressure source according to a travel of said input member to develop working fluid pressure for operating a working unit so that said working fluid pressure acts on said control valve in an inoperative direction, and an elastic member dispersed between said control valve and said input member for developing a force according to a travel of the input member relative to the housing so that the force of the elastic member corresponding to the travel of said input member acts on said control valve in an operative direction, said control valve being controlled according to said travel such that a force generated by said working fluid pressure balances with the force generated by said elastic member, wherein said control valve is a ball valve or cone valve, the force of said elastic member acts on said ball valve or cone valve in the operative direction and said working fluid pressure acts on said ball valve or cone valve in the inoperative direction, and an operation of said ball valve or cone valve is controlled according to the input of said input member in such a manner that the force generated by said working fluid pressure balances with the force generated by said elastic member.

* * * * *